United States Patent
Nilsson et al.

(10) Patent No.: US 12,500,997 B2
(45) Date of Patent: Dec. 16, 2025

(54) METHOD AND DEVICE FOR PRODUCING A VIDEO STREAM

(71) Applicant: LIVEARENA TECHNOLOGIES AB, Täby (SE)

(72) Inventors: Anders Nilsson, Falköping (SE); Andreas Björkman, Täby (SE); Lars Erlman, Leksand (SE); Hans Almgren, Täby (SE)

(73) Assignee: LiveArena Technologies AB, Täby (SE)

( * ) Notice: Subject to any disclaimer, the term of this patent is extended or adjusted under 35 U.S.C. 154(b) by 0 days.

(21) Appl. No.: 19/058,031

(22) Filed: Feb. 20, 2025

(65) Prior Publication Data

US 2025/0247499 A1    Jul. 31, 2025

Related U.S. Application Data

(63) Continuation of application No. PCT/SE2025/050028, filed on Jan. 15, 2025.

(30) Foreign Application Priority Data

Jan. 31, 2024  (SE) .................... 2450103-3

(51) Int. Cl.
  *H04N 7/14*  (2006.01)
  *H04L 9/32*  (2006.01)
  *H04N 7/15*  (2006.01)

(52) U.S. Cl.
  CPC ........... *H04N 7/147* (2013.01); *H04L 9/3228* (2013.01); *H04N 7/155* (2013.01)

(58) Field of Classification Search
  CPC ....... H04N 7/147; H04N 7/155; H04L 9/3228
  See application file for complete search history.

(56) References Cited

U.S. PATENT DOCUMENTS

| 5,638,114 A | 6/1997 | Hatanaka et al. |
| 6,034,731 A | 3/2000 | Hurst, Jr. |

(Continued)

FOREIGN PATENT DOCUMENTS

| CA | 3164902 A1 | 7/2021 |
| CN | 109583187 B | 4/2019 |

(Continued)

OTHER PUBLICATIONS

European search report issued by the EPO on Feb. 24, 2025.
(Continued)

*Primary Examiner* — Stella L. Woo
(74) *Attorney, Agent, or Firm* — Noréns Patentbyrå AB

(57) ABSTRACT

Methods and systems for producing a video stream. A first user is authenticated. A first primary video stream is captured showing the first user and comprising a first primary authentication video part. A fourth primary video stream is captured, visually showing the first user from a different point of view, comprising a fourth primary authentication video part. One-way functions of the first and fourth primary video streams are calculated, each being calculated using the respective primary authentication video part. The produced video stream is automatically produced based on the first primary video stream. For each of the one-way function outputs, the output is embedded into a least one of the video streams so that the embedding depends on content in a video stream which is not the same as the video stream into which the embedding is made. The output is stored and/or publicly published.

20 Claims, 8 Drawing Sheets

(56) References Cited

U.S. PATENT DOCUMENTS

| | | | |
|---|---|---|---|
| 6,148,135 | A | 11/2000 | Suzuki |
| 6,253,193 | B1 | 6/2001 | Ginter et al. |
| 6,272,127 | B1 | 8/2001 | Golden et al. |
| 7,143,432 | B1 | 11/2006 | Brooks et al. |
| 7,844,052 | B2 | 11/2010 | Tapson |
| 7,996,566 | B1 | 8/2011 | Sylvain et al. |
| 8,503,523 | B2 | 8/2013 | Williams et al. |
| 8,830,295 | B2 | 9/2014 | Vivekanandan et al. |
| 8,830,296 | B1 | 9/2014 | Vivekanandan et al. |
| 8,908,005 | B1 | 12/2014 | Leske et al. |
| 9,438,937 | B1 | 9/2016 | Buchheit |
| 9,445,051 | B1 | 9/2016 | Muthsandra Kantharaju et al. |
| 9,998,769 | B1 | 6/2018 | Fernandes |
| 10,070,154 | B2 | 9/2018 | Holzer et al. |
| 10,135,601 | B1 | 11/2018 | Beardsley et al. |
| 10,146,858 | B2 | 12/2018 | Byron et al. |
| 10,348,794 | B2 | 7/2019 | Hundemer |
| 10,679,428 | B1 | 6/2020 | Chen et al. |
| 10,713,391 | B2 | 7/2020 | Gonzalez-Banos et al. |
| 10,887,628 | B1 | 1/2021 | Flachsbart et al. |
| 11,082,467 | B1 | 8/2021 | Hartnett et al. |
| 11,184,560 | B1 | 11/2021 | Mese et al. |
| 11,277,620 | B1 | 3/2022 | Liu et al. |
| 11,349,893 | B1 | 5/2022 | Iyer et al. |
| 11,350,059 | B1 | 5/2022 | Swierk et al. |
| 11,374,988 | B1 | 6/2022 | Lanier |
| 11,601,698 | B2 | 3/2023 | Gramo et al. |
| 11,622,147 | B2 | 4/2023 | Pranger et al. |
| 11,882,345 | B2 | 1/2024 | Packard et al. |
| 11,922,977 | B2 | 3/2024 | Zaklad et al. |
| 12,008,332 | B1 | 6/2024 | Gardner et al. |
| 12,069,320 | B1 | 8/2024 | Danielson et al. |
| 12,069,406 | B2 | 8/2024 | Björkman et al. |
| 2003/0009670 | A1 | 1/2003 | Rhoads |
| 2003/0236792 | A1 | 12/2003 | Mangerie et al. |
| 2004/0103150 | A1 | 5/2004 | Ogdon et al. |
| 2005/0044499 | A1 | 2/2005 | Allen et al. |
| 2005/0190872 | A1 | 9/2005 | Seong et al. |
| 2005/0206720 | A1 | 9/2005 | Cheatle et al. |
| 2005/0289064 | A1 | 12/2005 | Lecomte et al. |
| 2006/0251382 | A1 | 11/2006 | Vronay et al. |
| 2007/0014485 | A1 | 1/2007 | Mcalpine et al. |
| 2007/0067480 | A1 | 3/2007 | Beek et al. |
| 2007/0279494 | A1 | 12/2007 | Aman et al. |
| 2008/0297587 | A1 | 12/2008 | Kurtz et al. |
| 2010/0104005 | A1 | 4/2010 | Amsterdam et al. |
| 2010/0220172 | A1 | 9/2010 | Michaelis |
| 2010/0238262 | A1 | 9/2010 | Kurtz |
| 2011/0217021 | A1 | 9/2011 | Dubin et al. |
| 2012/0069137 | A1 | 3/2012 | Thapa |
| 2012/0092443 | A1 | 4/2012 | Mauchly |
| 2012/0127262 | A1 | 5/2012 | Wu et al. |
| 2012/0140018 | A1 | 6/2012 | Pikin et al. |
| 2012/0236160 | A1 | 9/2012 | Rezek et al. |
| 2013/0064522 | A1 | 3/2013 | Touma |
| 2013/0135427 | A1 | 5/2013 | Wu et al. |
| 2013/0159822 | A1 | 6/2013 | Grossman et al. |
| 2013/0179911 | A1 | 7/2013 | Dang et al. |
| 2013/0216206 | A1 | 8/2013 | Dubin et al. |
| 2013/0259228 | A1* | 10/2013 | Ren ................... H04L 9/3236 |
| | | | 380/200 |
| 2014/0153909 | A1 | 6/2014 | MacInnis et al. |
| 2014/0168354 | A1 | 6/2014 | Clavel et al. |
| 2015/0003608 | A1* | 1/2015 | Ansari ................ H04N 7/147 |
| | | | 380/201 |
| 2015/0071612 | A1 | 3/2015 | Ruegg et al. |
| 2015/0172202 | A1 | 6/2015 | Zealey et al. |
| 2015/0215582 | A1 | 7/2015 | Leske et al. |
| 2015/0281586 | A1 | 10/2015 | Mate et al. |
| 2015/0312521 | A1 | 10/2015 | Bright-Thomas |
| 2016/0006990 | A1 | 1/2016 | Williamsson et al. |
| 2016/0066064 | A1 | 3/2016 | Chesluk et al. |
| 2016/0073058 | A1 | 3/2016 | Bader-Natal et al. |
| 2016/0148649 | A1 | 5/2016 | Rehn et al. |
| 2016/0286244 | A1 | 9/2016 | Chang et al. |
| 2016/0359941 | A1 | 12/2016 | Kvaal et al. |
| 2017/0026437 | A1 | 1/2017 | Wang |
| 2017/0034160 | A1 | 2/2017 | Brands et al. |
| 2017/0111674 | A1 | 4/2017 | Meredith et al. |
| 2017/0148488 | A1 | 5/2017 | Li et al. |
| 2017/0208292 | A1 | 7/2017 | Smits |
| 2017/0255826 | A1 | 9/2017 | Chang et al. |
| 2017/0264608 | A1* | 9/2017 | Moore .................. G07C 9/257 |
| 2017/0318261 | A1 | 11/2017 | Dalvi et al. |
| 2018/0012619 | A1 | 1/2018 | Ryan et al. |
| 2018/0077437 | A1 | 3/2018 | Hansen et al. |
| 2018/0098100 | A1 | 4/2018 | Turner |
| 2018/0132011 | A1 | 5/2018 | Shichman et al. |
| 2018/0192000 | A1 | 7/2018 | Mercredi et al. |
| 2018/0213288 | A1 | 7/2018 | Patry et al. |
| 2018/0310033 | A1 | 10/2018 | Johnson et al. |
| 2018/0322604 | A1 | 11/2018 | Zhao et al. |
| 2018/0337765 | A1 | 11/2018 | Beardsley et al. |
| 2018/0367757 | A1 | 12/2018 | Faulkner et al. |
| 2018/0375676 | A1 | 12/2018 | Bader-Natal et al. |
| 2019/0045001 | A1 | 2/2019 | Mankovskii |
| 2019/0058927 | A1 | 2/2019 | Lu et al. |
| 2019/0089996 | A1 | 3/2019 | Surcouf et al. |
| 2019/0132371 | A1 | 5/2019 | Bhat et al. |
| 2019/0166057 | A1 | 5/2019 | Gilson |
| 2019/0191226 | A1 | 6/2019 | Ni et al. |
| 2019/0215464 | A1 | 7/2019 | Kumar et al. |
| 2019/0230310 | A1* | 7/2019 | Faulkner .................. H04N 7/15 |
| 2019/0287685 | A1 | 9/2019 | Wu et al. |
| 2019/0340437 | A1 | 11/2019 | Smith, IV et al. |
| 2019/0342522 | A1 | 11/2019 | Garrido et al. |
| 2020/0104601 | A1 | 4/2020 | Karoui et al. |
| 2020/0110958 | A1 | 4/2020 | Hwang et al. |
| 2020/0267427 | A1 | 8/2020 | Rogers et al. |
| 2021/0027770 | A1 | 1/2021 | Olabiyi et al. |
| 2021/0073526 | A1 | 3/2021 | Zeng et al. |
| 2021/0076001 | A1 | 3/2021 | Periyannan et al. |
| 2021/0076080 | A1 | 3/2021 | Yoo et al. |
| 2021/0109752 | A1 | 4/2021 | Kang et al. |
| 2021/0127085 | A1 | 4/2021 | Greaves |
| 2021/0185276 | A1 | 6/2021 | Peters et al. |
| 2021/0200820 | A1 | 7/2021 | Rachamadugu |
| 2021/0203519 | A1 | 7/2021 | Sharma et al. |
| 2021/0219012 | A1 | 7/2021 | Maurice |
| 2021/0235040 | A1 | 7/2021 | Childress, Jr. et al. |
| 2021/0271890 | A1 | 9/2021 | Tsuchiya |
| 2021/0314238 | A1 | 10/2021 | Cioffi et al. |
| 2021/0329005 | A1 | 10/2021 | Locke |
| 2021/0337247 | A1 | 10/2021 | Van Veldhuisen et al. |
| 2021/0352359 | A1 | 11/2021 | Barvo et al. |
| 2021/0377631 | A1 | 12/2021 | Viswanathan |
| 2022/0007127 | A1 | 1/2022 | Thomas |
| 2022/0076100 | A1 | 3/2022 | Hori et al. |
| 2022/0150083 | A1 | 5/2022 | Faulkner |
| 2022/0174357 | A1 | 6/2022 | Zavesky et al. |
| 2022/0201312 | A1 | 6/2022 | Yuan et al. |
| 2022/0230267 | A1* | 7/2022 | Mei .................. G06V 40/20 |
| 2022/0284929 | A1 | 9/2022 | Zaklad et al. |
| 2022/0321933 | A1 | 10/2022 | Gramo et al. |
| 2022/0374585 | A1 | 11/2022 | Wang et al. |
| 2022/0400300 | A1 | 12/2022 | Blythe et al. |
| 2023/0066504 | A1 | 3/2023 | Daha et al. |
| 2023/0113491 | A1 | 4/2023 | Finley et al. |
| 2023/0133265 | A1 | 5/2023 | Springer |
| 2023/0230085 | A1* | 7/2023 | Turgeman .............. G06Q 20/10 |
| 2023/0370676 | A1 | 11/2023 | Li et al. |
| 2023/0385945 | A1 | 11/2023 | Wolf et al. |
| 2024/0086619 | A1 | 3/2024 | He et al. |
| 2024/0104944 | A1* | 3/2024 | Akimoto ................ B60R 25/25 |
| 2024/0119508 | A1 | 4/2024 | Lishner et al. |
| 2024/0160914 | A1 | 5/2024 | Kutt et al. |
| 2024/0177483 | A1 | 5/2024 | Danielson et al. |
| 2024/0177740 | A1 | 5/2024 | Danielson et al. |
| 2024/0179357 | A1 | 5/2024 | Björkman et al. |
| 2024/0193913 | A1 | 6/2024 | Saraee et al. |
| 2024/0212812 | A1 | 6/2024 | Vidyashankar Keresanthe et al. |
| 2024/0256592 | A1 | 8/2024 | O'Neill |

(56) References Cited

U.S. PATENT DOCUMENTS

| | | | |
|---|---|---|---|
| 2024/0267488 A1 | 8/2024 | Björkman et al. | |
| 2024/0303437 A1 | 9/2024 | Kraus et al. | |

FOREIGN PATENT DOCUMENTS

| | | | |
|---|---|---|---|
| CN | 110753202 | A | 2/2020 |
| CN | 112235607 | A | 1/2021 |
| CN | 112383737 | B | 2/2021 |
| CN | 114826601 | B | 7/2022 |
| CN | 115814407 | A | 3/2023 |
| CN | 116719919 | A | 9/2023 |
| CN | 117274868 | A | 12/2023 |
| CN | 117640958 | A | 3/2024 |
| CN | 117651146 | A | 3/2024 |
| CN | 118349987 | A | 7/2024 |
| CN | 118364059 | A | 7/2024 |
| CN | 118471533 | A | 8/2024 |
| EP | 1512307 | B1 | 3/2005 |
| EP | 2060104 | A1 | 5/2009 |
| EP | 2355496 | A1 | 8/2011 |
| EP | 2629512 | A1 | 8/2013 |
| EP | 3537319 | A1 | 9/2019 |
| EP | 3673387 | A1 | 7/2020 |
| EP | 3673387 | B1 | 7/2020 |
| EP | 3908006 | A2 | 11/2021 |
| KR | 20200027638 | A | 3/2020 |
| WO | 03096669 | A2 | 11/2003 |
| WO | 2016082277 | A1 | 6/2016 |
| WO | 2016207899 | A1 | 12/2016 |
| WO | 2019191082 | A2 | 10/2019 |
| WO | 2022020006 | A1 | 1/2022 |
| WO | 2023014237 | A1 | 2/2023 |

OTHER PUBLICATIONS

European search report issued on Feb. 7, 2025 by the European Patent Office.
Luca Di Liello—Structural self-supervised objectives for transformers.
Notice issued on Jan. 30, 2025 by the Swedish Intellectual Property Office.
Office action issued on Feb. 7, 2025 by the Swedish Intellectual Property Office.
Zhenyi et al—Who is looking at whom? Visualizing Gaze Awareness for Remote Small-Group Conversations.
3 Ways to share video files or YouTube videos in Zom meeting on phone & PC; Ritik Singh.
Extended European search report issued on Dec. 2, 2024 by the European Patent Office.
International Preliminary Examination Report issued on Sep. 18, 2024 by IPEA/SE.
International search report and written opinion issued by ISA/SE, Jan. 31, 2025.
International search report and written opinion issued on Jan. 30, 2025 by ISA/SE.
International search report issued by the Swedish Intellectual Property Office on Feb. 15, 2023.
International search report issued by the Swedish Intellectual Property Office on Nov. 7, 2022.
International search report issued on Dec. 21, 2022 by the Swedish Intellectual Property Office.
Lip Synchronization in Video Conferencing; Chapter 7.
Office action in "SE1" issued by SE PTO Sep. 3, 2024.
Office action issued by SE PTO on Sep. 3, 2024.
Office action issued in "SE2" by SE PTO Sep. 3, 2024.
Pablo Sendin-Rana et al: Emulating Access Grid features at Web endpoints: a developer's view; Published Feb. 11, 2008.
Swedish Search Report dated Nov. 8, 2023.
Barni Mauro Member, IEEE, Bartolini Franco Member IEEE, Checcacci Nicola—Watermarking of MPEG-4 Video Objects, IEEE Transactions on multimedia, vol. 7, No. 1, Feb. 7, 2005.
Elrowayati Ali A, Alrshah Mohamed A, Abdullah Mohammad Faiz Liew, Latip Rohaya—HEVC Watermarking Techiques for authentication and copyright applications—Challenges and opportunities, IEE Access Jun. 22, 2020.
Moktharian Kianoosh et al—Authentication of scalable video streams with low communication overhead.
Office action issued by the Swedish Intellectual Property Office on Jun. 12, 2025.
Office action issued on Aug. 27, 2025 by the Swedish Intellectual Property Office SE1.
Office action issued on Aug. 27, 2025 by the Swedish Intellectual Property Office SE2.
Office action issued on Aug. 28, 2025 by the Swedish Intellectual Property Office SE.
Songqing Chen et al—An application-level data transparent authentication scheme without communication overhead.
Sun Qibin et al, A secure and robust authentication scheme for video transcoding.

* cited by examiner

METHOD AND DEVICE FOR PRODUCING A VIDEO STREAM

TECHNICAL FIELD

The various embodiments of the invention described herein relate to producing a digital video stream, and in particular for producing a digital video stream based on digital input video streams.

BACKGROUND

There are many known digital video conference systems, such as Microsoft® Teams®, Zoom® and Google® Meet®, offering two or more participants to meet virtually using digital video and audio captured locally and broadcast to all participants to emulate a physical meeting.

Various digital video conference solutions provide various automatic and non-automated production functionality, for instance with respect to what video content is shown to what participant at what time, and via what distribution channels. Production decisions can be taken based on information such as a detected currently talking participant, screen sharing and interpretations of what various available video streams show. Such production can become relatively complex as the number of participants increase and available information is used in various ways, not least as various available information may have different formats so that conversions are required; various different types of hardware and/or software is involved in the solution; external information is fed into the solution; and information may be handled by more than one host.

In general, it is desired that latency in such solutions is low and quality is high in terms of frame rate, pixel resolution and pixel depth. Also, interacting users need to be time-synchronized in terms of video information being shared across such interacting users.

These problems are specifically present in a context where a number of participants participate in a video conference or similar, where either all participants are locally present in the same room or premise or where some participants are locally present and some participants participate remotely.

The corresponding problems arise in said other contexts where an output digital video stream is to be produced based on several input digital video streams, such as in digital video production systems for education and instruction.

In the various types of solutions described and referred to above, there is generally a problem for various users of the system, as well as external parties, to know who is participating as a user in the meeting or interaction.

SUMMARY

The various embodiments of the invention solve one or several of the above-described problems. The various embodiments of the invention described herein relate to producing a digital video stream, and in particular for producing a digital video stream based on digital input video streams. In some embodiments, the digital video stream is produced in the context of a digital video conference or meeting system, particularly involving a plurality of different concurrent users. The produced digital video stream may be published externally or within a digital video conference or digital video conference system. The system can be interactive in the sense that it allows participant users to interact in real-time or near real-time, for instance by a second user viewing a video of the first user as a part of a first produced video stream, and the first user simultaneously viewing the second user as a part of a second produced video stream that can be the same or different from the first produced video stream.

In other embodiments, the present invention is applied in contexts that are not digital video conferences, but where several digital video input streams are handled concurrently and combined into a produced digital video stream in other ways. For instance, such contexts may be educational or instructional.

Hence, in one aspect the invention relates to a method for producing a video stream, comprising the steps:
authenticating a first user;
capturing a first primary video stream visually showing the first user, wherein the first primary video stream comprises a first primary authentication video part, the first primary authentication video part visually showing the step of authenticating and/or comprising information visually and/or audibly representing a first authentication token resulting from the step of authentication;
capturing a fourth primary video stream visually showing the first user from a different point of view than the first primary video stream, wherein the fourth primary video stream comprises a fourth primary authentication video part, the fourth primary authentication video part visually showing the step of authenticating and/or comprising information visually and/or audibly representing the first authentication token; and calculating an output of a first one-way function using as direct or derivative input the first primary video stream and calculating an output of a fourth one-way function using as direct or derivative input the fourth primary video stream, the output of the first one-way function being calculated using the first primary authentication video part as direct or derivative input and the output of the fourth one-way function being calculated using the fourth primary authentication video part as direct or derivative input.

In some embodiments, the method comprises the additional step of automatically producing the produced video stream based on the first primary video stream.

In some embodiments, the produced video stream is provided to a recipient user.

The method can further comprise, for each of a respective piece of information representing a direct or derivative output of the first one-way function and/or the fourth one-way function, performing at least one of:
embedding a visual and/or audible representation of the piece of information into a least one of the first primary video stream, the second primary video stream and a produced video stream so that the embedding depends on content in a video stream which is not the same as the video stream into which the embedding is made, said produced video stream being produced based on the first primary video stream;
storing the piece of information; and
publicly publishing the piece of information.

In some examples, the piece of information representing a direct or derivative output of the first one-way function or the fourth one-way function can be referred to as a "first piece of information" or a "fourth piece of information", respectively.

In another aspect, the invention relates to another method for producing a produced video stream, the method comprising the steps:

capturing a first primary video stream visually showing a first user and a second primary video stream, the second primary video stream optionally visually showing a second user;

automatically producing the produced video stream based on the first primary video stream and the second primary video stream, the automatic producing being based on automatic production decisions in turn being based on at least one of defined parameters; automatic image processing of the first and/or second primary video streams; and automatic audio processing of the first and/or second primary video streams;

down sampling the first primary video stream and the second video stream, thereby achieving a first shadow primary video stream and a second shadow primary video stream;

automatically producing a produced shadow video stream based on the first shadow primary video stream and the second shadow primary video stream, the automatic producing being based on the corresponding automatic production decisions as used to produce the produced video stream; and storing the first shadow primary video stream, the second shadow primary video stream, the produced shadow video stream as well as information identifying the automatic production decisions.

In yet another aspect, the invention relates to another method for producing a produced video stream, the method comprising the steps:

capturing a first primary video stream visually showing a first user and a second primary video stream, the second primary video stream optionally visually showing a second user;

automatically producing the produced video stream based on the first primary video stream and the second primary video stream, the automatic producing being based on automatic production decisions in turn being based on at least one of defined parameters; automatic image processing of the first and/or second primary video streams; and automatic audio processing of the first and/or second primary video streams;

down sampling the first primary video stream and the second video stream, thereby achieving a first shadow primary video stream and a second shadow primary video stream;

optionally storing at least one piece of context-relevant information about the first primary video stream and/or the second primary video stream, the context-relevant information not being derivable from the first shadow primary video or the second shadow primary video;

at a later point in time, using the context-relevant information stored in step d) or other available information, up-sampling at least one of the first primary video stream and the second primary video stream, thereby achieving a first enhanced primary video stream and/or a second enhanced primary video stream, the up-sampling resulting in the addition of information to the up-sampled primary shadow video stream, such added information not being deducible from the up-sampled primary shadow video stream itself; and automatically producing an enhanced produced video stream based on the first enhanced primary video stream and/or the second enhanced primary video stream.

In some embodiments, the context-relevant information comprises metadata descriptive of at least one of:

one or several events or patterns detectable in the first and/or second primary video stream; and one or several things, persons or phenomena being visually shown and/or audibly heard in the first and/or second primary video stream, such as an identity of a user being visible or talking in the first and/or second primary video stream or a facial expression of such a user.

In one aspect, the invention also relates to another method for producing a produced video stream, the method comprising the steps:

authenticating a first user;

capturing a first primary video stream visually showing the first user, wherein the first primary video stream comprises a first primary authentication video part, the first primary authentication video part visually showing the step of authenticating and/or comprising information visually and/or audibly representing a first authentication token resulting from the step of authentication;

calculating an output of a first one-way function using as direct or derivative input the first primary authentication video part;

automatically producing the produced video stream based on the first primary video stream, the automatic producing being based on automatic production decisions in turn being based on at least one of defined parameters; automatic image processing of the first primary video stream; and automatic audio processing of the first primary video stream; and providing the produced video stream to a recipient user, such as a second or third user.

The method further comprises, for a piece of information representing a direct or derivative output of the first one-way function, performing at least one of embedding into the produced video stream a visual and/or audible representation of the piece of information; storing the piece of information; and publicly publishing the piece of information.

In some examples, the piece of information representing a direct or derivative output of the first one-way function can be referred to as a "first piece of information".

In some embodiments, capturing a primary video stream further comprises capturing a second primary video stream visually showing a second user; and automatically producing the produced video stream further comprises automatically producing the produced video stream based on the second primary video stream. The automatic producing can be based on automatic image processing of the second primary video stream. The automatic producing can be based on automatic audio processing of the second primary video stream.

In some embodiments, the method further comprises:

calculating an output of a second one-way function using as direct or derivative input the second primary video stream, and for a piece of information representing a direct or derivative output of the second one-way function, performing at least one of embedding into the produced video stream a visual and/or audible representation of the piece of information; storing the piece of information; and publicly publishing the piece of information.

In some examples, the piece of information representing a direct or derivative output of the second one-way function can be referred to as a "second piece of information".

In some embodiments, the method further comprises:

providing to the first user at least one of the produced video stream; or a different video stream having been automatically produced based on the first primary video stream and the second primary video stream, the automatic producing being based on automatic production decisions in turn being based on at least one of defined parameters; automatic image processing of the first and/or second primary video streams; and automatic audio processing of the first and/or second primary video streams.

In some embodiments, the provision of the respective produced video streams to the first and second users is made in the context of, and forming part of, an interactive video communication having the first user and the second user as participants.

In some embodiments, the authentication in step a comprises capturing an image showing both the first us-er and a camera used to capture the first primary video stream.

In some embodiments, the authentication comprises providing a one-time password to the first user, and the first user audibly and/or visually providing the one-time password so that it forms part of the first primary authentication video part.

In some embodiments, the first primary authentication video part is a part of the first primary video stream which is before a part of the primary video stream that is used for the automatic production of the produced video stream.

In some embodiments, the method further comprises:
associating with the first primary video stream and/or the produced video stream, and storing, a set of metadata comprising information of at least one of the first authentication token; and a current authentication status of the first user.

In some embodiments, the method further comprises:
performing a continuity surveillance, based at least on automatic image and/or audio processing of the first primary video stream, to determine whether the first user has been continuously visible in the first primary video stream since the step of authenticating.

In some embodiments, the continuity surveillance is performed in a central server based on the first primary video stream as provided, in raw or pre-processed format, to the central server from a hardware entity, the hardware entity being separate from the central server and configured to continuously capture the first primary video stream using a camera; and/or the continuity surveillance is performed by the hardware entity.

In some embodiments, the method further comprises:
detecting an interruption of a communication connection between the central server and the hardware entity.

In some embodiments, the method further comprises:
as a result of the detecting, switching from performing the continuity surveillance by the central server to performing the continuity surveillance by the hardware entity;
regaining the communication connection; and
as a result of the regaining of the communication connection, switching from per-forming the continuity surveillance by the hardware entity back to performing the continuity surveillance by the central server.

In some embodiments, the method further comprises:
as a result of the detecting of the interruption, pausing the performing of the continuity surveillance by the central server;
detecting a regaining the communication connection;
as a result of the detection of the regaining, the central server catching up a reception of the primary video stream;

the central server performing the continuity surveillance retroactively of caught-up parts of the first primary video stream; and
the central server continuing to perform the continuity surveillance of the primary stream being provided to the central server.

In some embodiments, the method further comprises:
calculating a continuity score, based at least on said automatic image and/or audio processing of the first primary video stream, to determine the continuity score as, or based on, a trustworthiness measure regarding to what extent the first user has been continuously visibly and/or audibly present in the first primary video stream since the step of authenticating.

In some embodiments, the method further comprises:
in case the continuity score falls into a predetermined interval, repeating steps a and b, to produce an updated first primary authentication video part, and then repeating step c using the updated first primary authentication video part as the first primary authentication video part.

In some embodiments, the continuity score is determined based on at least one of a visual appearance of the first user; a voice fingerprint of the first user; a level of activity of the first user; a current meeting role of the first user; an interaction between the first user and the second or a third user, that are also visible in the first, second or a third primary video stream, in particular an acknowledgement by the second or third user as to the authenticity of the first user; a video quality and/or continuity of the first primary video stream; a change of primary video stream showing the first user; and a time elapsed since the first authentication video part, in terms of a timeline of the first primary video stream.

In some embodiments, the method further comprises:
detecting that the first user and a third user are both visible in the first primary stream; and
increasing the continuity score regarding the first user as a result of the detecting of the first and third users both being visible, and optionally also a detection of an active confirmation by the third user that the first user is authentic.

In some embodiments, the method further comprises:
the authentication when repeating the authentication step is a different type of authentication than an authentication performed in the previous iteration of the authentication step.

In some embodiments, the method further comprises:
showing, in the produced video stream, a representation of the continuity score.

In some embodiments, the method further comprises:
sampling a publicly available information source and calculating an output of a first source one-way function using the sampling as input;
calculating an output of a first joint one-way function using as input a direct or derivative output of the first source one-way function and a direct or derivative output of the first one-way function; and
publicly publishing a direct or derivative output of the first joint one-way function.

In some embodiments, outputs of the first joint one-way function are iteratively calculated further using as input a direct or derivative updated output of a second one-way function, in turn calculated using as direct or derivative input the second primary video stream.

In some embodiments, outputs of the first joint one-way function are iteratively calculated, using as input a direct or derivative updated output of the first source one-function, a direct or derivative updated output of the first one-way function and a direct or derivative of a previous-iteration first joint one-way function.

In some embodiments, the output of the first joint one-way function is calculated further using as direct or derivative input at least one of the first primary authentication video part; the first authentication token; an updated continuity score; an output of a third one-way function calculated using as direct or derivative input the produced video stream; and a set of metadata describing a complete set of production steps used to produce the produced video stream based on the first primary video stream and the second video stream.

In some embodiments, the method further comprises:
visually and/or audibly embedding a piece of information representing a direct or derivative output of the first joint one-way function into at least one of the first primary video stream before it is used to produce the produced video stream; the second primary video stream before it is used to produce the produced video stream; and the produced video stream.

In some embodiments, the calculating of the output of the first joint one-way function and the embedding of the piece of information into at least one of the first primary video stream, the second primary video stream and the produced video stream is performed repeatedly over time, with respect to different parts or frames of the first primary video stream, the second primary video stream and the produced video stream, respectively.

In some embodiments, said embedding is in the form of at least one of a visual representation, such as alphanumeric information, a QR code or a bar code; a visual watermark; and an audible watermark.

In some embodiments, the first authentication is performed by the first user in relation to a third party, the first authentication as an output producing the first authentication token.

In some embodiments, step b comprises embedding said information representing the token represented as a visual and/or audible part of the first primary video stream within a defined time period from the first authentication, such as at the most 10 seconds, the time period being defined in terms of a timeline of the primary video stream.

In some embodiments, the method further comprises:
down-sampling at least one of the first primary video stream and the second video stream, achieving a down-sampled first shadow primary video stream and/or a down-sampled second shadow primary video stream;
performing all method steps that are performed in relation to the first primary video stream, the second video stream and the produced video stream in a corresponding manner but instead using the corresponding first shadow primary video stream and/or second shadow primary video stream, whereby a corresponding produced shadow video stream is produced; and
storing the first shadow primary video stream and/or second shadow primary video stream as well as the produced shadow video stream.

In some embodiments, the method further comprises:
embedding into the produced shadow video stream metadata regarding the automatic production steps performed to produce the produced shadow video stream.

In some embodiments, the produced shadow video stream is not shown to the first or second user.

In some embodiments, the down-sampling is a down-sampling arranged to reduce a byte size at least 10 times.

In some embodiments, the down-sampling comprises at least one of decreasing, uniformly or selectively across an image plane of the shadow video stream in question, a pixel resolution of the shadow video stream as compared to the primary video stream in question; decreasing, uniformly or selectively across an image plane of the shadow video stream in question, a pixel depth of the shadow video stream as compared to the primary video stream in question; decreasing a frame rate of the shadow video stream in question as compared to the primary video stream in question; and incorporating a cropping of the shadow video stream in question as compared to the primary video stream in question.

In some embodiments, the down-sampling is performed without removing more information from the primary video stream than so that it is possible to visually identify the presence and identity of a user being visible in the primary video stream also in the shadow video stream.

In some embodiments, the down-sampling of the first primary video stream and/or the second primary video stream is dynamic in the sense that it takes into consideration one or several parameter values of the automatic production decisions so that the down-sampling is applied differently over time as viewed along a timeline of the primary video stream in question.

In some embodiments, the method further comprises:
discarding at least some of at least one of the first primary video stream, the second primary video stream and the produced video stream, the discarding taking place after providing the produced video stream to the first user.

In some embodiments, the production of the corresponding produced shadow video stream takes place with a time delay of at the most 10 seconds in relation to the production of the produced video stream.

In some embodiments, the method further comprises:
calculating an output of a first shadow one-way function using as direct or derivative input the first shadow primary video stream and calculating an output of a second shadow one-way function using as direct or derivative input the second shadow primary video stream, the output of the first shadow one-way function being calculated using as direct or derivative input a first shadow authentication video part of the first shadow primary video stream corresponding to the first primary authentication video part, showing the step of authenticating and/or a representation of said information representing the token.

In some embodiments, the method further comprises:
for each of a respective piece of information representing a direct or derivative output of the first shadow one-way function and the second shadow one-way function, performing at least one of embedding into the produced shadow video stream a visual and/or audible representation of the piece of information; storing the piece of information; and publicly publishing the piece of information.

In some examples, the piece of information representing a direct or derivative output of the first or second shadow one-way function can be referred to as "first shadow piece of information" or a "second shadow piece of information", respectively.

In some embodiments, the method further comprises:
sampling a publicly available information source and calculating an output of a second source one-way function using the sampling as input;

calculating an output of a second joint one-way function using as input a direct or derivative out-put of the second source one-way function, a direct or derivative output of the first shadow one-way function and a direct or derivative output of the second shadow one-way function; and publicly publishing a direct or derivative output of the second joint one-way function.

In some embodiments, the method further comprises:
embedding into the first primary video stream a direct or derivative output of the first shadow primary one-way function.

In some embodiments, the method further comprises:
embedding into the first shadow primary video stream a direct or derivative output of the first one-way function.

In some embodiments, the method further comprises:
automatically transforming the first shadow primary video stream, the second shadow primary video stream and/or the produced shadow video stream to achieve a transformed video stream; and
providing the transformed video stream to a user.

In some embodiments, the transforming includes at least one of increasing an audio bitrate, a pixel resolution, a pixel depth and/or a frame rate; introducing a de-cropping, an image element and/or an audio element; and partly or completely animating a participant showed in the transformed video stream, the transforming being based on previously stored metadata.

In some embodiments, the method further comprises:
determining the metadata based on at least one of the first primary video stream, the second primary video stream and the produced video stream.

In some embodiments, the metadata comprises externally provided information.

In some embodiments, the down-sampling is irreversible.

In some embodiments, the method further comprises:
capturing a fourth primary video stream visually showing the first user from a different point of view than the first primary video stream, wherein the fourth primary video stream comprises a fourth primary authentication video part, the fourth primary authentication video part visually showing the step of authenticating and/or comprising information visually and/or audibly representing the token; and
calculating an output of a fourth one-way function using as direct or derivative input the fourth primary authentication video part.

In some embodiments, the method further comprises:
sampling a publicly available information source and calculating an output of a third source one-way function using the sampling as input;
calculating an output of a third joint one-way function using as input a direct or derivative output of the third source one-way function and a direct or derivative output of the fourth one-way function; and
publicly publishing a direct or derivative output of the third joint one-way function.

In some embodiments, the automatic production of the produced video stream is further based on the fourth primary video stream.

In some embodiments, the automatic production of the produced video stream is not further based on the fourth primary video stream.

In some embodiments, the method further comprises:
embedding into the first primary video stream a direct or derivative output of the fourth one-way function.

In some embodiments, the method further comprises:
embedding into the fourth primary video stream a direct or derivative output of the first one-way function.

In another aspect, the invention relates to a system for producing a produced video stream, the system comprising a central server and a client, the system being arranged to perform a method of said type.

In another aspect, the invention relates to a computer program product for producing a produced video stream, the computer program product comprising instructions arranged to, when executed, perform a method of said type.

The computer program product can be implemented by a non-transitory computer-readable medium encoding instructions that cause one or more hardware processors located in at least one of computer hardware devices in the system to perform a method of said type.

BRIEF DESCRIPTION OF THE DRAWINGS

In the following, different aspects of the invention will be described in detail, with reference to exemplifying embodiments of the invention and to the enclosed drawings, wherein.

All Figures share reference numerals for the same or corresponding parts.

DETAILED DESCRIPTION

As noted above, the various embodiments of the present invention relate to a system, computer program product and method for producing a digital video stream, and in particular for producing a digital video stream based on digital input video streams. In some embodiments, the digital video stream is produced in the context of a digital video conference or meeting system, particularly involving a plurality of different concurrent users. The produced digital video stream may be published externally or within a digital video conference or digital video conference system. The system can be interactive in the sense that it allows participant users to interact in real-time or near real-time, for instance by a second user viewing a video of the first user as a part of a first produced video stream, and the first user simultaneously viewing the second user as a part of a second produced video stream that can be the same or different from the first produced video stream.

Other embodiments of the present invention are applied in contexts that are not digital video conferences, but where several digital video input streams are handled concurrently and combined into a produced digital video stream in other ways. For instance, such contexts may be educational or instructional.

Figure 1:
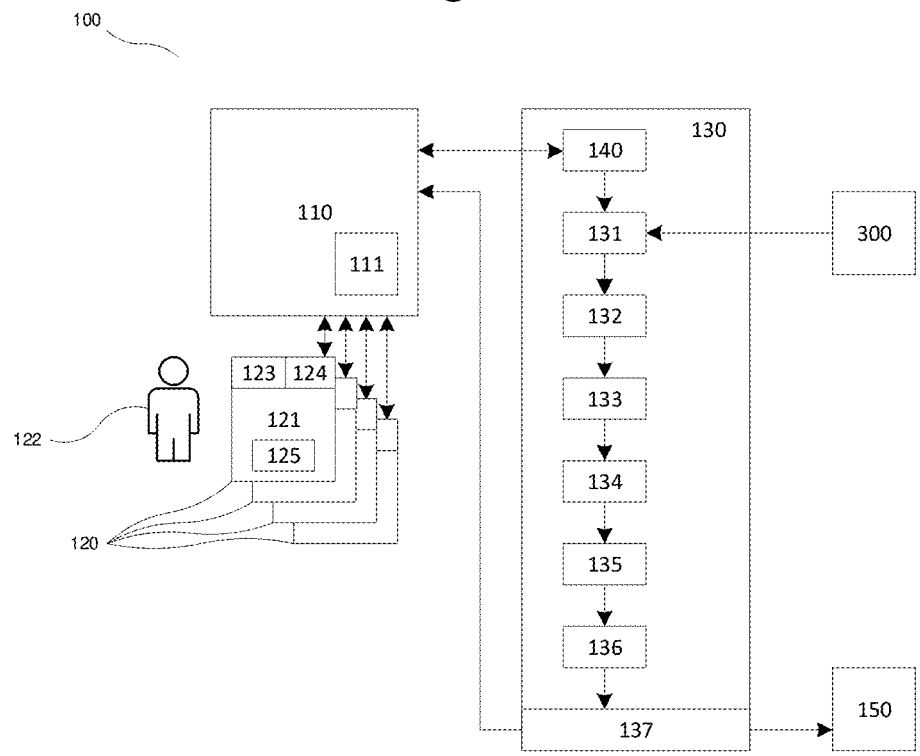
FIG. 1 illustrates a first system, in accordance with one embodiment.

FIG. 1 illustrates a system 100 according to an embodiment of the present invention, arranged to perform a method according to an embodiment of the invention for providing an output digital video stream, such as a shared digital video stream.

As the term is used herein, "video" and "video stream" includes image material, such as a sequence of image frames. A "video" or "video stream" can also include one or several corresponding audio information tracks.

The system 100 may comprise a video communication service 110, but the video communication service 110 may also be external to the system 100 in some embodiments. As will be discussed, there may be more than one video communication service 110.

The system 100 may comprise one or several participant clients 121, but one, some or all participant clients 121 may also be external to the system 100 in some embodiments.

The system 100 may comprise a central server 130.

As used herein, the term "central server" is a computer-implemented functionality that is arranged to be accessed in a logically centralised manner, such as via a well-defined API (Application Programming Interface). The functionality of such a central server may be implemented purely in computer software, or in a combination of software with virtual and/or physical hardware. It may be implemented on a standalone physical or virtual server computer or be distributed across several interconnected physical and/or virtual server computers.

As will be exemplified below, in some embodiments the central server 130 comprises or is in its entirety a piece of hardware that is locally arranged in relation to one or several of said participating clients 121. As used herein, that two entities are "locally arranged" in relation to each other means that they are arranged within the same premises, such as in the same building, for instance in the same room, and preferably interconnected for local communication using a dedicated cable or local area network connection, as opposed to via the open internet. As will be described below, each participating client 121 can be its own system (or "central server" as defined below) in terms of hardware and/or software.

The physical or virtual hardware that the central server 130 runs on, in other words that computer software defining the functionality of the central server 130 executes on, may comprise a per se conventional CPU, a per se conventional GPU, a per se conventional RAM/ROM memory, a per se conventional computer bus, and a per se conventional external communication functionality such as an internet connection.

Each video communication service 110, to the extent it is used, is also a central server in said sense, that may be a different central server than the central server 130 or a part of the central server 130. In particular, the video communication service 110, or each video communication service 110, may be locally arranged in relation to one, several or all of the participating clients 121.

Correspondingly, each of said participant clients 121 may be a central server in said sense, with the corresponding interpretation, and physical or virtual hardware that each participant client 121 runs on, in other words that computer software defining the functionality of the participant client 121 executes on, may also comprise a per se conventional CPU/GPU, a per se conventional RAM/ROM memory, a per se conventional computer bus, and a per se conventional external communication functionality such as an internet connection.

Each participant client 121 also typically comprises or is in communication with a computer screen, arranged to display video content provided to the participant client 121 as a part of an ongoing video communication; one or several loudspeakers, arranged to emit sound content provided to the participant client 121 as a part of said video communication; one or several video cameras; and one or several microphones, arranged to record sound locally to a human participant 122 to said video communication, the participant 122 using the participant client 121 in question to participate in said video communication.

In other words, a respective human-machine interface of each participant client 121 allows a respective participant 122 to interact with the client 121 in question, in a video communication, with other participants and/or audio/video streams provided by various sources.

In general, each of the participating clients 121 comprises a respective input means 123, that may comprise said video camera(s); said microphone(s); a keyboard; a computer mouse or trackpad; and/or an API to receive a digital video stream, a digital audio stream and/or other digital data. The input means 123 is specifically arranged to receive a video stream and/or an audio stream from a central server, such as the video communication service 110 and/or the central server 130, such a video stream and/or audio stream being provided as a part of a video communication and preferably being produced based on corresponding digital data input streams provided to said central server from at least two sources of such digital data input streams, for instance participant clients 121 and/or external sources (see below).

Further generally, each of the participating clients 121 comprises a respective output means 124, that may comprise said computer screen; said loudspeaker(s); and an API to emit a digital video and/or audio stream, such stream being representative of a captured video and/or audio locally to the participant 122 using the participant client 121 in question.

In practice, each participant client 121 may be a mobile device, such as a mobile phone, arranged with a screen, a loudspeaker, a microphone and an internet connection, the mobile device executing computer software locally or accessing remotely executed computer software to perform the functionality of the participant client 121 in question. Correspondingly, the participant client 121 may also be a thick or thin laptop or stationary computer, executing a locally installed application, using a remotely accessed functionality via a web browser, and so forth, as the case may be. Each participant client 121 can also comprise any peripherally connected equipment, such as any external cameras, microphones and/or loudspeakers.

There may be more than one, such as at least three or even at least four, participant clients 121 used in one and the same video communication of the present type.

There may be at least two different groups of participating clients. Each of the participating clients may be allocated to such a respective group. The groups may reflect different roles of the participating clients, different virtual or physical locations of the participating clients and/or different interaction rights of the participating clients.

Various available such roles may be, for instance, "leader", "conferencier", "speaker", "panel participant", "interacting audience", "remote listener", or the like.

Various available such physical locations may be, for instance, "physically in the room", "listening in remotely", "on the stage", "in the panel", "in the physically present audience", "in the physically remote audience", or the like.

A virtual location may be defined in terms of the physical location but may also involve a virtual grouping (such as a "breakout room", a common functionality in conventional video meeting solutions) that may partly overlap with said physical locations. For instance, a physically present audience may be divided into a first and a second virtual group, and some physically present audience participants may be grouped together with some physically distant audience participants in one and the same virtual group.

Various available such interaction rights may be, for instance, "full interaction" (no restrictions), "can talk but only after requesting the microphone" (such as raising a virtual hand in a video conference service), "cannot talk but write in common chat" or "view/listen only". Other examples of interaction rights that can be (or not be) conferred to various groups include the right to comment, vote or approve/disapprove on topics or issues.

In some instances, each role defined and/or physical/virtual location may be defined in terms of certain predetermined interaction rights. In other instances, all participants having the same interaction rights form a group. Hence, any defined roles, locations and/or interaction rights may reflect various group allocations, and different groups may be disjoint or overlapping, as the case may be.

The video communication may be provided at least partly by the video communication service 110 and at least partly by the central server 130, as will be described and exemplified herein.

As the term is used herein, a "video communication" is an interactive, digital communication session involving at least two, preferably at least three or even at least four, video streams, and preferably also matching audio streams that are used to produce one or several mixed or joint digital video/audio streams that in turn is or are consumed by one or several consumers (such as participant clients of the discussed type), that may or may not also be contributing to the video communication via video and/or audio. Such a video communication is real-time, with or without a certain latency or delay. At least one, preferably at least two, or even at least four, participants 122 to such a video communication is involved in the video communication in an interactive manner, both providing and consuming video/audio information.

At least one of the participant clients 121, or all of the participant clients 121, may comprise a local synchronisation software function 125, that will be described in closer detail below.

The video communication service 110 may comprise or have access to a common time reference, as will also be described in closer detail below.

Each of the at least one central server 130 may comprise a respective API 137, for digitally communicating with entities external to the central server 130 in question. Such communication may involve both input and output.

The system 100, such as said central server 130, may furthermore be arranged to digitally communicate with, and in particular to receive digital information, such as audio and/or video stream data, from an external information source 300, such as an externally provided video stream. That the information source 300 is "external" means that it is not provided from or as a part of the central server 130. Preferably, the digital data provided by the external information source 300 is independent of the central server 130, and the central server 130 cannot affect the information contents thereof. For instance, the external information source 300 may be live captured video and/or audio, such as of a public sporting event or an ongoing news event or reporting. The external information source 300 may also be captured by a web camera or similar, but not by any one of the participating clients 121. Such captured video may hence show the same locality as any one of the participant clients 121, but not be captured as a part of the activity of the participant client 121 per se. One possible difference between an externally provided information source 300 and an internally provided information source 120 is that internally provided information sources may be provided as, and in their capacity as, participants to a video communication of the above-defined type, whereas an externally provided information source 300 is not, but is instead provided as a part of a context that is external to said video conference. In other embodiments, one or several externally provided information sources 300 are in the form of a respective digital camera or a microphone, arranged to capture a respective digital image/video and/or audio stream in the same locality in which one or several of the participating clients 121 and/or the corresponding users 122 are present, and in a way which is controlled by the central server 130. Hence, the central server 130 may control an on/off state of such digital image/video/audio capturing device 300, and/or other capturing state such as a currently applied physical or virtual panning or zooming. The external information source 300 may also or alternatively provide non-video data, such as one or several still images, sound information, static digital information such as text and/or numbers, and so forth.

There may also be several external information sources 300, that provide digital information of said type, such as audio and/or video streams, to the central server 130 in parallel.

As shown in FIG. 1, each of the participating clients 121 may constitute the source of a respective information (video and/or audio) stream 120, provided to the video communication service 110 by the participant client 121 in question as described.

The system 100, such as the central server 130, may be further arranged to digitally communicate with, and in particular to emit digital information to, an external consumer 150. For instance, a digital video and/or audio stream produced by the central server 130 may be provided continuously, in real-time or near real-time, to one or several external consumers 150 via said API 137. Again, that the consumer 150 is "external" means that the consumer 150 is not provided as a part of the central server 130, and/or that it is not a party to the said video communication. "Not being party to the video communication" may mean that the consumer 150 only accepts input from the video communication, such as in the form of a provided produced video stream, but that cannot interactively provide such information into the video communication to achieve interactivity.

Unless not stated otherwise, all functionality and communication herein are provided digitally and electronically, effected by computer software executing on suitable computer hardware and communicated over a local or global digital communication network or channel such as the internet.

Hence, in the system 100 configuration illustrated in FIG. 1, a number of participant clients 121 take part in a digital video communication provided by the video communication service 110. Each participant client 121 may hence have an ongoing login, session or similar to the video communication service 110, and may take part in one and the same ongoing video communication provided by the video communication service 110. In other words, the video communication is "shared" among the participant clients 121 and therefore also by corresponding human participants 122.

In FIG. 1, the central server 130 comprises an automatic participant client 140, being an automated client corresponding to participant clients 121 but not associated with a human participant 122. Instead, the automatic participant client 140 is added as a participant client to the video communication service 110 to take part in the same shared video communication as participant clients 121. As such a participant client, the automatic participant client 140 is granted access to continuously produced digital video and/or audio stream(s) provided as a part of the ongoing video communication by the video communication service 110 and can be consumed by the central server 130 via the automatic participant client 140. Preferably, the automatic participant client 140 receives, from the video communication service 110, a common video and/or audio stream that is or may be distributed to one, several or each participant client 121; a respective video and/or audio stream provided to the video communication service 110 from each of one or several of the participant clients 121 and relayed, in raw or modified form, by the video communication service 110 to all or requesting participant clients 121; and/or a common time reference.

The central server 130 may comprise a collecting function 131 arranged to receive video and/or audio streams of said type from the automatic participant client 140, and possibly also from said external information source(s) 300, for processing as described below, and then to provide a produced, such as shared, video stream via the API 137. For instance, this produced video stream may be consumed by the external consumer 150 and/or by the video communication service 110 to in turn be distributed by the video communication service 110 to all or any requesting one of the participant clients 121.

Figure 2:
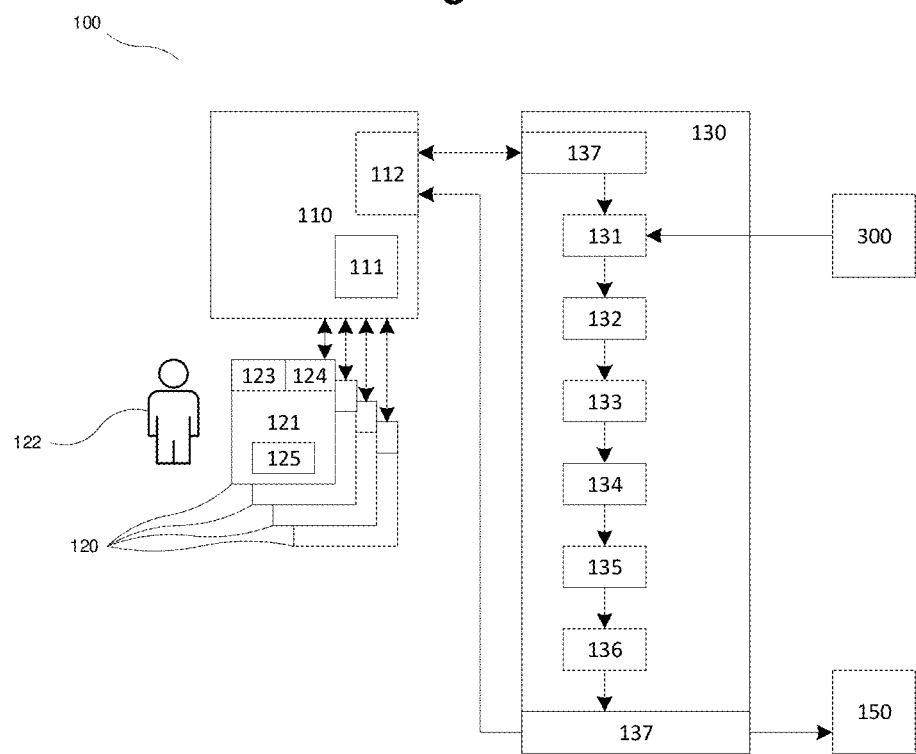
FIG. 2 illustrates a second system, in accordance with one embodiment.

FIG. 2 is similar to FIG. 1, but instead of using the automatic participant client 140 the central server 130 receives video and/or audio stream data from the ongoing video communication via an API 112 of the video communication service 110.

Figure 3:
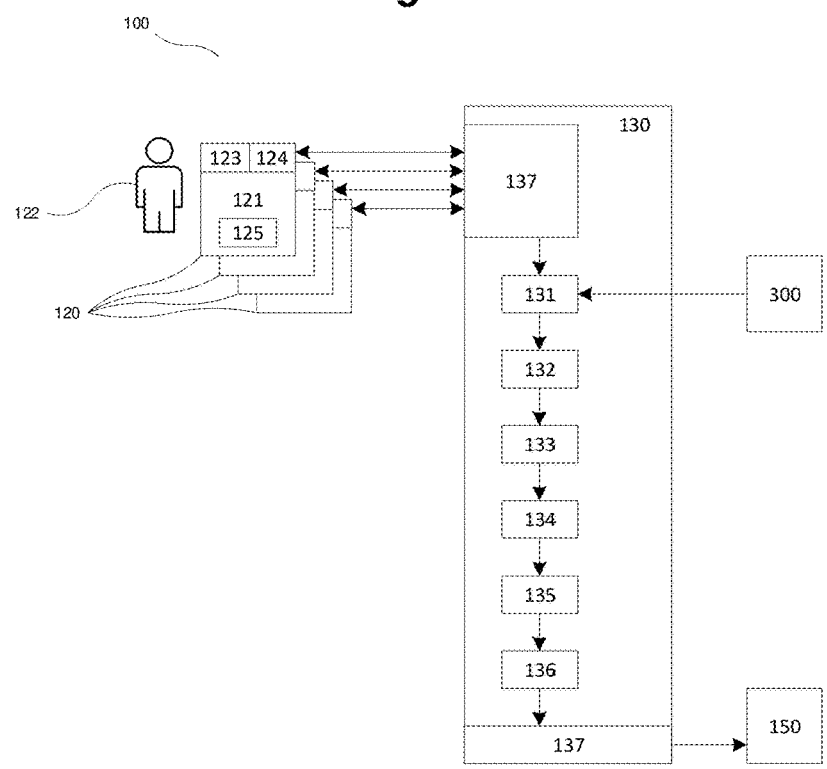
FIG. 3 illustrates a third system, in accordance with one embodiment.

FIG. 3 is also similar to FIG. 1 but shows no video communication service 110. In this case, the participant clients 121 communicate directly with the API 137 of the central server 130, for instance providing video and/or audio stream data to the central server 130 and/or receiving video and/or audio stream data from the central server 130. Then, the produced shared stream may be provided to the external consumer 150 and/or to one or several of the client participants 121.

Figure 4:
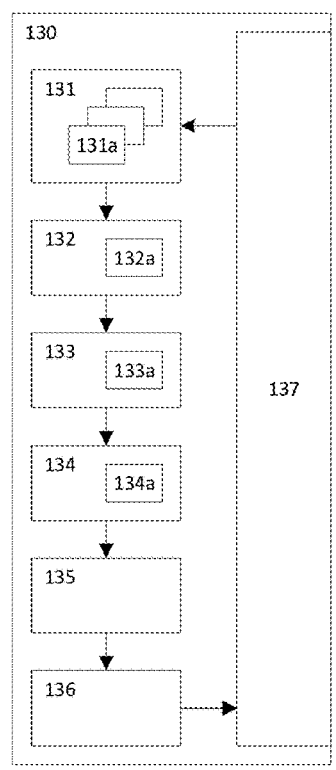
FIG. 4 illustrates a central server, in accordance with one embodiment.

FIG. 4 illustrates the central server 130 in closer detail. As illustrated, said collecting function 131 may comprise one or, preferably, several, format-specific collecting functions 131a. Each one among said format-specific collecting functions 131a may be arranged to receive a video and/or audio stream having a predetermined format, such as a predetermined binary encoding format and/or a predetermined stream data container and may be specifically arranged to parse binary video and/or audio data of said format into individual video frames, sequences of video frames and/or time slots.

The central server 130 may further comprise an event detection function 132, arranged to receive video and/or audio stream data, such as binary stream data, from the collecting function 131 and to perform a respective event detection on each individual one of the received data streams. The event detection function 132 may comprise an AI (Artificial Intelligence) component 132a for performing said event detection. The event detection may take place without first time-synchronising the individual collected streams.

The central server 130 further comprises a synchronising function 133, arranged to time-synchronise the data streams provided by the collecting function 131 and that may have been processed by the event detection function 132. The synchronising function 133 may comprise an AI component 133a for performing said time-synchronisation.

The central server 130 may further comprise a pattern detection function 134, arranged to perform a pattern detection based on the combination of at least one, but in many cases at least two, such as at least three or even at least four, such as all, of the received data streams. The pattern detection may be further based on one, or in some cases at least two or more, events detected for each individual one of said data streams by the event detection function 132. Such detected events taking into consideration by said pattern detection function 134 may be distributed across time with respect to each individual collected stream. The pattern detection function 134 may comprise an AI component 134a for performing said pattern detection. The pattern detection may further be based on the above-discussed grouping, and in particular be arranged to detect a particular pattern occurring only with respect to one group; with respect to only some but not all groups; or with respect to all groups.

The central server 130 further comprises a production function 135, arranged to produce a produced digital video stream, such as a shared digital video stream, based on the data stream or streams provided from the collecting function 131, and possibly further based on any detected events and/or patterns. Such a produced video stream may at least comprise a video stream produced to comprise one or several of video streams provided by the collecting function 131, raw, reformatted or transformed, and may also comprise corresponding audio stream data. As will be exemplified below, there may be several produced video streams, where one such produced video stream may be produced in the above-discussed way but further based on a another already produced video stream.

All produced video streams are preferably produced continuously, and preferably in near real-time (after discounting any latencies and delays of the types discussed hereinbelow).

The central server 130 may further comprise a publishing function 136, arranged to publish the produced digital video stream in question, such as via API 137 as described above.

It is noted that FIGS. 1, 2 and 3 illustrate three different examples of how the central server 130 can be used to implement the principles described herein, and in particular to provide a method according to an embodiment of the present invention, but that other configurations, with or without using one or several video communication services 110, are also possible.

Figure 5:
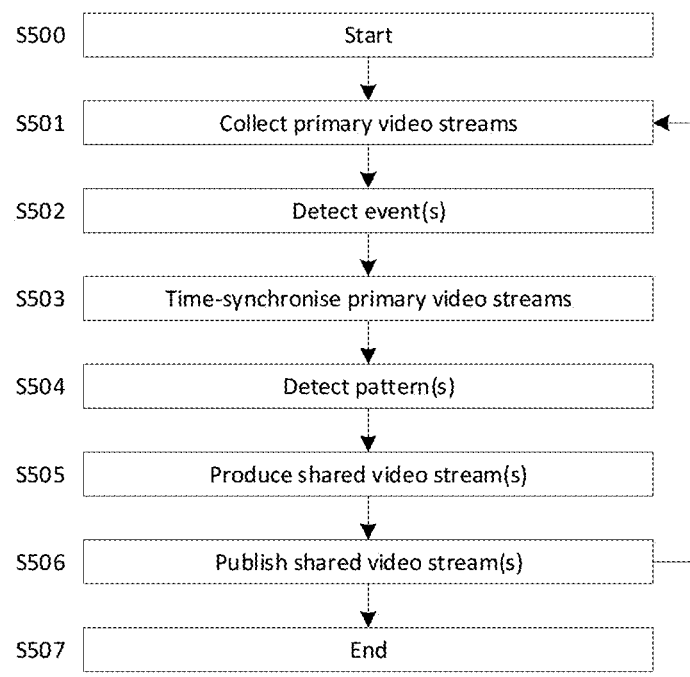
FIG. 5 illustrates a first method, in accordance with one embodiment.

FIG. 5 illustrates a method for providing a produced digital video stream. FIGS. 6a-6f illustrates different digital video/audio data stream states resulting from the method steps illustrated in FIG. 5.

In a first step S500, the method starts.

In a subsequent collecting step S501, respective primary digital video streams 210, 301 are collected, such as by said collecting function 131, from at least two of said digital video sources 120, 300. Each such primary data stream 210, 301 may comprise an audio part 214 and/or a video part 215. It is understood that "video", in this context, refers to moving and/or still image contents of such a data stream, the data stream comprising or not comprising audio following the visible contents of the video. Each primary data stream 210, 301 may be encoded according to any video/audio encoding specification (using a respective codec used by the entity providing the primary stream 210, 301 in question), and the encoding formats may be different across different ones of said primary streams 210, 301 concurrently used in one and the same video communication. It is preferred that at least one, such as all, of the primary data streams 210, 301 is provided as a stream of binary data, possibly provided in a per se conventional data container data structure. It is preferred that at least one, such as at least two, or even all of the primary data streams 210, 301 are provided as respective live video recordings. One or several primary data streams 210, 301 can alternatively or additionally be provided as existing digital video resources, or digital video resources being constructed on the fly (but not recorded using a camera) in connection with the collecting. For instance, a primary video stream 210, 301 can be a digital video stream being constructed as a series of images based on (consecutive over time) rendering of 3D data or a per se static document.

It is noted that the primary streams 210, 301 may be unsynchronised in terms of time when they are received by the collecting function 131. This may mean that they are associated with different latencies or delays in relation to each other. For instance, in case two primary video streams 210, 301 are live recordings, this may imply that they are associated, when received by the collecting function 131, with different latencies with respect to the time of recording.

It is also noted that the primary streams 210, 301 may themselves be a respective live camera feed from a web camera; a currently shared screen or presentation; a viewed film clip or similar; or any combination of these arranged in various ways in one and the same screen.

Figure 6A:
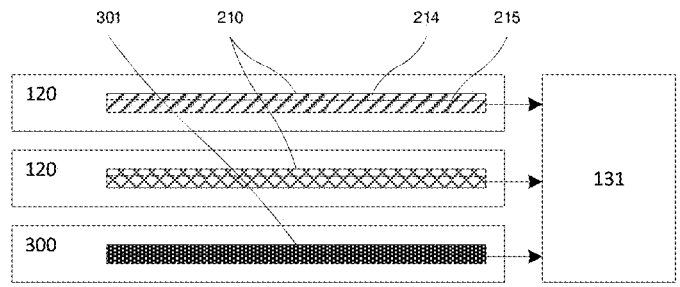
FIGS. 6a-6f illustrate subsequent states in relation to the different method steps in the method illustrated in FIG. 5, in accordance with one embodiment.
Figure 6B:
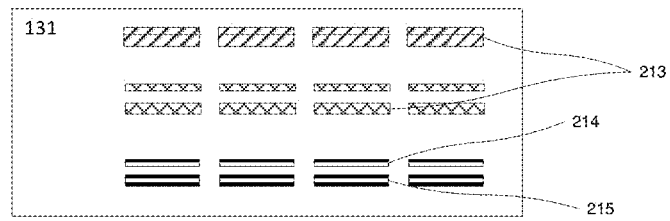

The collecting step S501 is shown in FIGS. 6a and 6b. In FIG. 6b, it is also illustrated how the collecting function 131 can store each primary video stream 210, 301 as bundled audio/video information or as audio stream data separated from associated video stream data. FIG. 6b illustrates how the primary video stream 210, 301 data is stored as individual frames 213 or collections/clusters of frames, "frames" here referring to time-limited parts of image data and/or any associated audio data, such as each frame being an individual still image or a consecutive series of images (such as such a series constituting at the most 1 second of moving images) together forming moving-image video content.

Figure 6C:
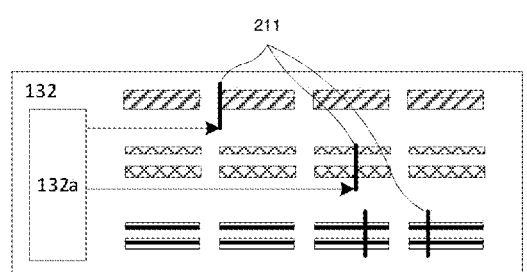

In a subsequent event detection step S502, performed by the event detection function 132, said primary digital video streams 210, 301 can be analysed, such as by said event detection function 132, for instance said AI component 132a, to detect at least one event 211 selected from a first set of events. This is illustrated in FIG. 6c.

It is preferred that this event detection step S502 may be performed for at least one, such as at least two, such as all, primary video streams 210, 301, and that it may be performed individually for each such primary video stream 210, 301. In other words, the event detection step S502 preferably takes place for said individual primary video stream 210, 301 only taking into consideration information contained as a part of that particular primary video stream 210, 301 in question, and particularly without taking into consideration information contained as a part of other primary video streams. Furthermore, the event detection preferably takes place without taking into consideration any common time reference 260 associated with the several primary video streams 210, 301.

On the other hand, the event detection preferably takes into consideration information contained as a part of the individually analysed primary video stream in question across a certain time interval, such as a historic time interval of the primary video stream that is longer than 0 seconds, such as at least 0.1 seconds, such as at least 1 second.

The event detection may take into consideration information contained in audio and/or video data contained as a part of said primary video stream 210, 301.

Said first set of events may contain any number of types of events, such as a change of slides in a slide presentation constituting or being a part of the primary video stream 210, 301 in question; a change in connectivity quality of the source 120, 300 providing the primary video stream 210, 301 in question, resulting in an image quality change, a loss of image data or a regain of image data; and a detected movement physical event in the primary video stream 210, 301 in question, such as the movement of a person or object in the video, a change of lighting in the video, a sudden sharp noise in the audio or a change of audio quality. It is realised that this is not intended to be an exhaustive list, but that these examples are provided in order to understand the applicability of the presently described principles.

Figure 6D:
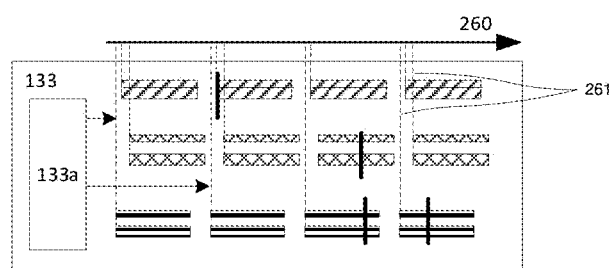

In a subsequent synchronising step S503, performed by the synchronisation function 133, the primary digital video streams 210 may be time-synchronised. This time-synchronisation may be with respect to a common time reference 260. As illustrated in FIG. 6d, the time-synchronisation may involve aligning the primary video streams 210, 301 in relation to each other, for instance using said common time reference 260, so that they can be combined to form a time-synchronised context. The common time reference 260 may be a stream of data, a heartbeat signal or other pulsed data, or a time anchor applicable to each of the individual primary video streams 210, 301. The common time reference can be applied to each of the individual primary video streams 210, 301 in a way so that the informational contents of the primary video stream 210, 301 in question can be unambiguously related to the common time reference with respect to a common time axis. In other words, the common time reference may allow the primary video streams 210, 301 to be aligned, via time shifting, so as to be time-synchronised in the present sense. In other embodiments, the time-synchronisation may be based on known information about a time difference between the primary video streams 210, 301 in question, such as based on measurements.

As illustrated in FIG. 6d, the time-synchronisation may comprise determining, for each primary video streams 210, 301, one or several timestamps 261, such as in relation to the common time reference 260 or for each video stream 210, 301 in relation to another video stream 210, 301 or to other video streams 210, 301.

Figure 6E:
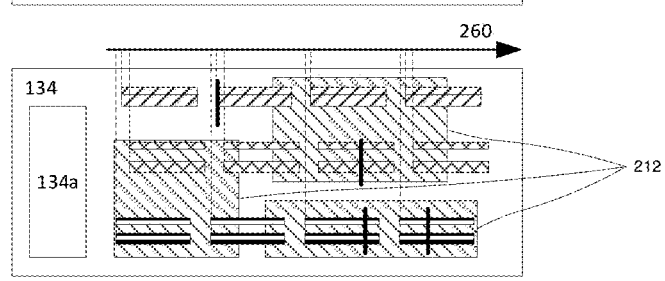

In a subsequent pattern detection step S504, performed by the pattern detection function 134, the hence time-synchronised primary digital video streams 210, 301 can be analysed to detect at least one pattern 212 selected from a first set of patterns. This is illustrated in FIG. 6e.

In contrast to the event detection step S502, the pattern detection step S504 may be performed based on video and/or audio information contained as a part of at least two of the time-synchronised primary video streams 210, 301 considered jointly.

Said first set of patterns may contain any number of types of patterns, such as several participants talking interchangeably or concurrently; or a presentation slide change occurring concurrently as a different event, such as a different participant talking. This list is not exhaustive, but illustrative.

In some embodiments, detected patterns 212 may relate not to information contained in several of said primary video streams 210, 301 but only in one of said primary video streams 210, 301. In such cases, it is preferred that such pattern 212 is detected based on video and/or audio information contained in that single primary video stream 210, 301 spanning across at least two detected events 211, for instance two or more consecutive detected presentation slide changes or connection quality changes. As an example, several consecutive slide changes that follow on each other rapidly over time may be detected as one single slide change pattern, as opposed to one individual slide change pattern for each detected slide change event. Other examples include the movement of a shown entity or person; and the recognition of an uttered vocal phrase by a participant user.

It is realised that the first set of events and said first set of patterns may comprise events/patterns being of predetermined types, defined using respective sets of parameters and parameter intervals. As will be explained below, the events/patterns in said sets may also, or additionally, be defined and detected using various AI tools.

In a subsequent production step S505, performed by the production function 135, a digital video stream is produced as an output digital video stream 230 based on consecutively considered frames 213 of the possibly time-synchronised primary digital video streams 210, 301, and further based on said detected events 211 and/or said detected patterns 212. The produced digital video stream 230 may or may not be a "shared" video stream in the sense that it is provided to more than one of the participant clients 121. The production can also involve producing different output digital video streams 230 for different participant clients 121 and/or external consumers 150.

As will be explained and detailed in the following, the various embodiments of the present invention allow for the completely automatic production of video streams, such as of one or several output digital video streams 230.

For instance, such production may involve the selection of what video and/or audio information from what primary video stream 210, 301 to use to what extent in such output video stream 230; a video screen layout of an output video stream 230; a switching pattern between different such uses or layouts across time; and so forth.

Figure 6F:
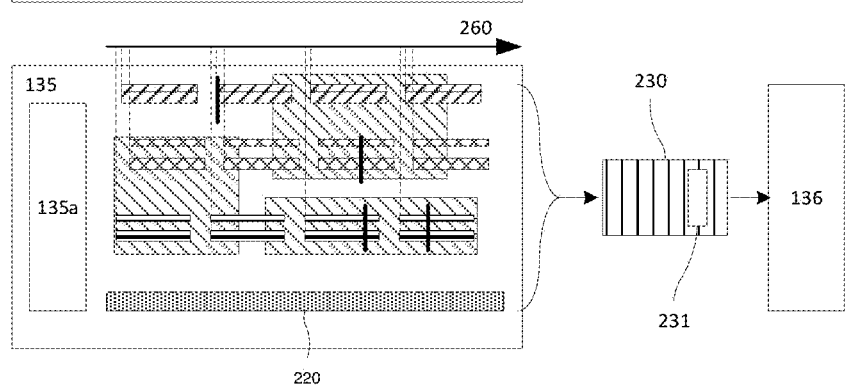

This is illustrated in FIG. 6f, that also shows one or several additional pieces of time-related (that may be related to the common time reference 260) digital video information 220, such as an additional digital video information stream, that can be time-synchronised (such as to said common time reference 260) and used in concert with the time-synchronised primary video streams 210, 301 in the production of the output video stream 230. For instance, the additional stream 220 may comprise information with respect to any video and/or audio special effects to use, such as dynamically based on detected patterns; a planned time schedule for the video communication; and so forth.

In a subsequent publishing step S506, performed by the publishing function 136, the produced output digital video stream(s) 230 is or are continuously provided to one or several consumers 110, 121, 150 of the produced digital video stream as described above. The produced digital video stream may be provided to one or several participant clients 121, such as via the video communication service 110.

In a subsequent step S507, the method ends. However, first the method may iterate any number of times, as illustrated in FIG. 5, to produce the output video stream 230 as a continuously provided stream. Preferably, the output video stream 230 is produced to be consumed in real-time or near real-time (taking into consideration a total latency added by all steps along the way), and continuously (publishing taking place immediately when more information is available, however not counting any deliberately added latencies or delays, see below). This way, the one or several output video streams 230 may be consumed in an interactive manner, so that each output video stream 230 may be fed back into the video communication service 110 or into any other context forming a basis for the production of a primary video stream 210 again being fed to the collection function 131 so as to form a closed feedback loop; or so that each output video stream 230 may be consumed into a different (external to system 100 or at least external to the central server 130) context but there forming the basis of a real-time, interactive video communication.

As mentioned above, in some embodiments at least two, such as at least three, such as at least four, or even at least five, of said primary digital video streams 210, 301 are provided as a part of a shared digital video communication, such as provided by said video communication service 110, the video communication involving a respective remotely connected participant client 121 providing the primary digital video stream 210 in question. In such cases, the collecting step S501 may comprise collecting at least one of said primary digital video streams 210 from the shared digital video communication service 110 itself, such as via an automatic participant client 140 in turn being granted access to video and/or audio stream data from within the video communication service 110 in question; and/or via an API 112 of the video communication service 110.

Moreover, in this and in other cases the collecting step S501 may comprise collecting at least one of said primary digital video streams 210, 301 as a respective external digital video stream 301, collected from an information source 300 being external to the shared digital video communication service 110. It is noted that one or several used such external video sources 300 may also be external to the central server 130.

In some embodiments, the primary video streams 210, 301 are not formatted in the same manner. Such different formatting can be in the form of them being delivered to the collecting function 131 in different types of data containers (such as AVI or MPEG), but in preferred embodiments at least one of the primary video streams 210, 301 is formatted according to a deviating format (as compared to at least one other of said primary video streams 210, 301) in terms of said deviating primary digital video stream 210, 301 having a deviating video encoding; a deviating fixed or variable frame rate; a deviating aspect ratio; a deviating video resolution; and/or a deviating audio sample rate.

It is preferred that the collecting function 131 is preconfigured to read and interpret all encoding formats, container standards, etc. that occur in all collected primary video streams 210, 301. This makes it possible to perform the processing as described herein, not requiring any decoding until relatively late in the process (such as not until after the primary stream in question is put in a respective buffer; not until after the event detection step S502; or even not until after the event detection step S502). However, in the rare case in which one or several of the primary video feeds 210, 301 are encoded using a codec that the collecting function 131 cannot interpret without decoding, the collecting function 131 may be arranged to perform a decoding and analysis of such primary video stream 210, 301, followed by a conversion into a format that can be handled by, for instance, the event detection function. It is noted that, even in this case, it is preferred not to perform any reencoding at this stage.

For instance, primary video streams 220 being fetched from multi-party video events, such as one provided by the video communication service 110, typically have requirements on low latency and are therefore typically associated with variable framerate and variable pixel resolution to enable participants 122 to have an effective communication. In other words, overall video and audio quality will be decreased as necessary for the sake of low latency.

External video feeds 301, on the other hand, will typically have a more stable framerate, higher quality but therefore possibly higher latency.

Hence, the video communication service 110 may, at each moment in time, use a different encoding and/or container than the external video source 300. The analysis and video production process described herein in this case therefore needs to combine these streams 210, 301 of different formats into a new one for the combined experience.

As mentioned above, the collecting function 131 may comprise a set of format-specific collecting functions 131a, each one arranged to process a primary video stream 210, 301 of a particular type of format. For instance, each one of these format-specific collecting functions 131a may be arranged to process primary video streams 210, 301 having been encoded using a different video respective encoding method/codec, such as Windows® Media® or Divx®.

However, in some embodiments the collecting step S501 comprises converting at least two, such as all, of the primary digital video streams 210, 301 into a common protocol 240.

As used in this context, the term "protocol" refers to an information-structuring standard or data structure specifying how to store information contained in a digital video/audio stream. The common protocol preferably does not, however, specify how to store the digital video and/or audio information as such on a binary level (i.e. the encoded/compressed data instructive of the sounds and images themselves), but instead forms a structure of predetermined format for storing such data. In other words, the common protocol prescribes storing digital video data in raw, binary form without performing any digital video decoding or digital video encoding in connection to such storing, possibly by not at all amending the existing binary form apart from possibly concatenating and/or splitting apart the binary form byte sequence. Instead, the raw (encoded/compressed) binary data contents of the primary video stream 210, 301 in question is kept, while repacking this raw binary data in the data structure defined by the protocol. In some embodiments, the common protocol defines a video file container format.

Figure 7:
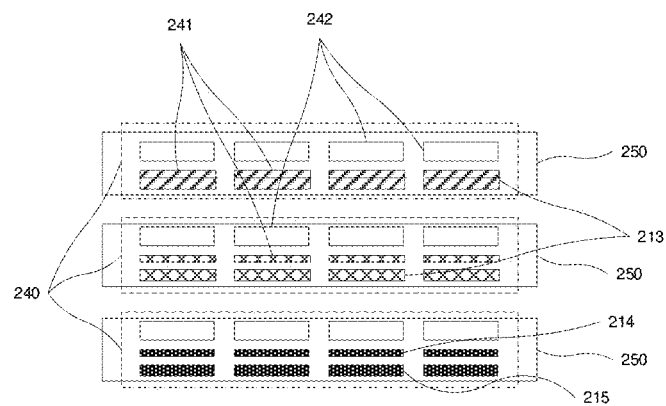
FIG. 7 illustrates, conceptually, a common protocol, in accordance with one embodiment.

FIG. 7 illustrates, as an example, the primary video streams 210, 301 shown in FIG. 6a, restructured by the respective format-specific collecting function 131a and using said common protocol 240.

Hence, the common protocol 240 prescribes storing digital video and/or audio data in data sets 241, preferably divided into discreet, consecutive sets of data along a timeline pertaining to the primary video stream 210, 301 in question. Each such data set may include one or several video frames and also associated audio data.

The common protocol 240 may also prescribe storing metadata 242 associated with specified time points in relation to the stored digital video and/or audio data sets 241.

The metadata 242 may comprise information about the raw binary format of the primary digital video stream 210 in question, such as regarding a digital video encoding method or codec used to produce said raw binary data; a resolution of the video data; a video frame rate; a frame rate variability flag; a video resolution; a video aspect ratio; an audio compression algorithm; or an audio sampling rate. The metadata 242 may also comprise information on a timestamp of the stored data, such as in relation to a time reference of the primary video stream 210, 301 in question as such or to a different video stream as discussed above.

Using said format-specific collecting functions 131a in combination with said common protocol 240 makes it possible to quickly collect the informational contents of the primary video streams 210, 301 without adding latency by decoding/reencoding the received video/audio data.

Hence, the collecting step S501 may comprise using different ones of said format-specific collecting functions 131a for collecting primary digital video streams 210, 301 being encoded using different binary video and/or audio encoding formats, in order to parse the primary video stream 210, 301 in question and store the parsed, raw and binary data in a data structure using the common protocol, together with any relevant metadata. Self-evidently, the determination as to what format-specific collecting function 131a to use for what primary video stream 210, 301 may be performed by the collecting function 131 based on predetermined and/or dynamically detected properties of each primary video stream 210, 301 in question.

Each hence collected primary video stream 210, 301 may be stored in its own separate memory buffer, such as a RAM memory buffer, in the central server 130.

The converting of the primary video streams 210, 301 performed by each format-specific collecting function 131a may hence comprise splitting raw, binary data of each thus converted primary digital video stream 210, 301 into an ordered set of said smaller sets of data 241.

Moreover, the converting may also comprise associating each (or a subset, such as a regularly distributed subset along a respective timeline of the primary stream 210, 301 in question) of said smaller sets 241 with a respective time along a shared timeline, such as in relation to said common time reference 260. This associating may be performed by analysis of the raw binary video and/or audio data in any of the principle ways described below, or in other ways, and may be performed in order to be able to perform the subsequent time-synchronising of the primary video streams 210, 301. Depending on the type of common time reference used, at least part of this association of each of the data sets 241 may also or instead be performed by the synchronisation function 133. In the latter case, the collecting step S501 may instead comprise associating each, or a subset, of the smaller sets 241 with a respective time of a timeline specific for the primary stream 210, 301 in question.

In some embodiments, the collecting step S501 also comprises converting the raw binary video and/or audio data collected from the primary video streams 210, 301 into a uniform quality and/or updating frequency. This may involve down-sampling or up-sampling of said raw, binary digital video and/or audio data of the primary digital video streams 210, 301, as necessary, to a common video frame rate; a common video resolution; or a common audio sampling rate. It is noted that such re-sampling can be performed without performing a full decoding/reencoding, or even without performing any decoding at all, since the format-specific collecting function 131a in question can process the raw binary data directly according to the correct binary encoding target format.

Each of said primary digital video streams 210, 301 may be stored in an individual data storage buffer 250, as individual frames 213 or sequences of frames 213 as described above, and also each associated with a corresponding time stamp in turn associated with said common time reference 260.

In a concrete example, provided to illustrate these principles, the video communication service 110 is Microsoft® Teams®, running a video conference involving concurrent participants 122. The automatic participant client 140 is registered as a meeting participant in the Teams® meeting.

Then, the primary video input signals 210 are available to and obtained by the collecting function 130 via the automatic participant client 140. These are raw signals in H264 format and contain timestamp information for every video frame.

As mentioned, the common protocol 240 may store the data in raw binary form. It can be designed to be very low-level, and to handle the raw bits and bytes of the video/audio data. In preferred embodiments, the data is stored in the common protocol 240 as a simple byte array or corresponding data structure (such as a slice). This means that the data does not need to be put in a conventional video container at all (said common protocol 240 not constituting such conventional container in this context). Also, encoding and decoding video is computationally heavy, which means it causes delays and requires expensive hardware. Moreover, this problem scales with the number of participants.

Using the common protocol 240, it becomes possible to reserve memory in the collecting function 131 for the primary video stream 210 associated with each Teams® meeting participant 122, and also for any external video sources 300, and then to change the amount of memory allocated on the fly during the process. This way, it becomes possible to change the number of input streams and as a result keep each buffer effective. For instance, since information like resolution, framerate and so forth may be variable but stored as metadata in the common protocol 240, this information can be used to quickly resize each buffer as need may be.

The following is an example of a specification of a common protocol 240 of the present type:

| Bytes | Example | Description |
| --- | --- | --- |
| 1 byte | 1 | 0=video; 1=audio |
| 4 bytes | 1234567 | Buffer Length (int) |
| 8 bytes | 424234234 | Timestamp from the incoming audio/video buffer Measured in ticks, 1tick = 100ns. (long int) |
| 1 byte | 0 | VideoColorFormat { NV12 = 0, Rgb24 = 1, Yuy2 = 2, H264 = 3 } |
| 4 bytes | 720 | Video frame pixel height (int) |
| 4 bytes | 640 | Video frame pixel width (int) |
| 4 bytes | 25.0 | Video frame rate Number of frames per second (float) |
| 1 byte | 0 | Is audio silence? 1 = true; 0 = false |
| 1 byte | 0 | AudioFormat { 0 = Pcm16K 1 = Pcm44Kstereo } |
| 1 byte | 0 | Detected event in, if any 0 = no event 1, 2, 3, etc. = event of specified type detected |
| 30 bytes | | Reserved for future use |
| 8 bytes | 1000000 | Length of binary data in bytes (long int) |
| Variable | 0x87A879... | Raw binary video/audio data of this frame(s) |
| 4 bytes | 1234567 | Dominant speaker Port |
| 4 bytes | 1234567 | Active speaker |

The relevant format-specific collecting function 131a picks up the raw data over IP (LAN network) on a configurable predefined TCP port. Every Teems® meeting participant, as well as associated audio data, are associated with a separate port. The collecting function 131 then uses the timestamps from the audio signal (which is in 50 Hz) and down-samples the video data to a fixed output signal of 25 Hz before storing the video stream 220 in its respective individual buffer 250.

Above, the "Detected event in, if any" data is included as a part of the common protocol 260 specification. However, in some embodiments, this information (regarding detected events) may instead be put in a separate memory buffer.

In some embodiments, said at least one additional piece of digital video information 220, that may be an overlay or an effect, is also stored in a respective individual buffer 250, as individual frames or sequences of frames each associated with a corresponding time stamp in turn associated with said common time reference 260.

As exemplified above, the event detection step S502 may comprise storing, using said common protocol 240, metadata 242 descriptive of a detected event 211, associated with the primary digital video stream 210, 301 in which the event 211 in question was detected.

The event detection can be performed in different ways. In some embodiments, performed by the AI component 132*a*, the event detection step S502 comprises a first trained neural network or other machine learning component analysing at least one, such as several or even all, of said primary digital video streams 210, 301 individually in order to automatically detect any of said events 211. This may involve the AI component 132*a* classifying, in a managed classification, the primary video stream 210, 301 data into a set of predefined events and/or, in an unmanaged classification, into a dynamically determined set of events.

In some embodiments, the detected event 211 is a change of presentation slides in a presentation being or being comprised in the primary video stream 210, 301 in question.

For instance, if the presenter of the presentation decides to change the slide in the presentation he/she is giving at that time to an audience, this means that what is interesting for a given viewer can change. It may be that the newly shown slide is only a high-level picture that can best be seen briefly in a so-called "butterfly" mode (for instance, displaying in the output video stream 230 the slide side-by-side with a video of the presenter). Alternatively, the slide may contain much detail, text with small font sizes, and so forth. In this latter case, the slide should instead be presented in full-screen and perhaps during a somewhat longer time period than what is usually the case. A butterfly mode may not be as appropriate, since the slide in this case may be more interesting to a viewer of the presentation than the face of the presenter.

In practice, the event detection step S502 may comprise at least one of the following:

Firstly, the event 211 can be detected based on an image analysis of a difference between a first image of a detected slide and a subsequent second image of a detected slide. The nature of the primary video stream 220, 301 being that of showing a slide can be automatically determined using per se conventional digital image processing, such as using motion detection in combination with OCR (Optical Character Recognition).

This may involve checking, using automatic computer image processing techniques, whether the detected slide has changed significantly enough to actually categorise it as a slide change. This may be done by checking the delta between current slide and previous slide with respect to RGB colour values. For instance, one may assess how much the RGB values have changed globally in the screen area covered by the slide in question, and whether it is possible to find groups of pixels that belong together and that change in concert. This way, relevant slide changes can be detected while, for instance, filtering out irrelevant changes such as shown computer mouse movements across the screen. This approach also allows full configurability—for instance, sometimes it is desired to be able to capture computer mouse movement, for instance when the presenter wishes to present something in detail using the computer mouse to point to different things.

Secondly, the event 211 may be detected based on an image analysis of an informational complexity of said second image itself, to determine the type of event with greater specificity.

This may, for instance, involve assessing a total amount of textual information on the slide in question, as well as associated font sizes. This may be done by using conventional OCR methods, such as deep learning-based character recognition techniques.

In another example, the detected event 211 is a loss of communication connection of a participant client 121 to a digital video communication service 110. Then, the detection step S502 may comprise detecting that said participant client 121 has lost communication connection based on an image analysis of a series of subsequent video frames 213 of a primary digital video stream 210 corresponding to the participant client 121 in question.

Because participant clients 121 may be associated with different physical locations and different internet connections, it can happen that someone will lose connection to the video communication service 110 or to the central server 130. In that situation, it is desirable to avoid showing a black or empty screen in the produced output video stream 230.

Instead, such connection loss can be detected as an event by the event detection function 132, such as by applying a 2-class classification algorithm where the 2 classes used are connected/not connected (no data). In this case, it is understood that "no data" differs from the presenter sending out a black screen intentionally. Because a brief black screen, such as of only 1 or 2 frames, may not be noticeable in the end production stream 230, one may apply said 2-class classification algorithm over time to create a time series. Then, a threshold value, specifying a minimum length for a connection interruption, can be used to decide whether there is a lost connection or not.

In another example, the event is the detection of a presence or movement of a participating human user in one or several images of said primary digital video stream 210, 301. In another example, the event is the detection of a movement (such as rotation, zoom, pan, etc.) of a camera used to produce said primary digital video stream 210, 301, possibly including information about a general movement component and/or a noise movement component of such movement. The noise movement component may, for instance, be due to the camera being moved manually. Such detection of a presence/movement of a human user, and/or a detection of a movement of said camera, may be achieved using per se conventional digital image processing techniques, for instance as has been exemplified above.

As will be explained in the following, detected events of these exemplified types may be used by the pattern detection function 134 to take various actions, as suitable and desired.

As mentioned, the individual primary video streams 210, 301 may each be related to the common time reference 260 or to each other in the time domain, making it possible for the synchronisation function 133 to time-synchronise them in relation to each other.

In some embodiments, the common time reference 260 is based on or comprises a common audio signal 111 (see FIGS. 1-3), the common audio signal 111 being common for the shared digital video communication service 110 involving at least two remotely connected participant clients 121 as described above, each providing a respective one of said primary digital video streams 210.

In the example of Microsoft® Teams® discussed above, a common audio signal is produced and can be captured by the central server 130 via the automatic participant client 140 and/or via the API 112. In this and in other examples, such a common audio signal may be used as a heartbeat signal to time-synchronise the individual primary video streams 220 by binding each of these to specific time points based on this heartbeat signal. Such a common audio signal may be provided as a separate (in relation to each of the other primary video streams 210) signal, whereby the other primary video streams 210 may each be individually time-correlated to the common audio signal, based on audio contained in the other primary video stream 210 in question or even based on image information contained therein (such as using automatic image processing-based lip syncing techniques).

In other words, to handle any variable and/or differing latency associated with individual primary video streams 210, and to achieve time-synchronisation for the combined video output stream 230, such a common audio signal may be used as a heartbeat for all primary video streams 210 in the central server 130 (but perhaps not external primary video streams 301). In other words, all other signals may be mapped to this common audio time heartbeat to make sure that everything is in time sync.

In a different example, the time-synchronisation is achieved using a time synchronisation element 231 introduced into the output digital video stream 230 and detected by a respective local time-synchronising software function 125 provided as a part of one or several individual ones of the participant clients 121, the local software function 125 being arranged to detect a time of arrival of the time synchronisation element 231 in the output video stream 230. As is understood, in such embodiments the output video stream 230 is fed back into the video communication service 110 or otherwise made available to each participant client 121 and the local software function 125 in question.

For instance, the time synchronisation element 231 may be a visual marker, such as a pixel changing colours in a predetermined sequence or manner, placed or updated in the output video 230 at regular time intervals; a visual clock updated and displayed in the output video 230; a sound signal (that may be designed to be non-audible to participants 122 by, for instance, having low enough amplitude and/or high enough frequency) and added to an audio forming part of the output video stream 230. The local software function 125 is arranged to, using suitable image and/or audio processing, automatically detect respective times of arrival of each of the (or each of the) time synchronisation element(s) 231.

Then, the common time reference 260 may be determined at least partly based on said detected times of arrival. For instance, each of the local software functions 125 may communicate to the central server 130 respective information signifying said detected time of arrival.

Such communication may take place via a direct communication link between the participant client 121 in question and the central server 130. However, the communication may also take place via the primary video stream 210 associated with the participant client 121 in question. For instance, the participant client 121 may introduce a visual or audible code, such as of the above discussed type, in the primary video stream 210 produced by that participant client 121 in question, for automatic detection by the central server 130 and used to determine the common time reference 260.

In yet additional examples, each participant client 121 may perform an image detection in a common video stream available for viewing by all participant clients 121 to the video communication service 110 and relay the results of such image detection to the central server 130, in a way corresponding to the ones discussed above, to there be used to over time determine respective offsets of each participant client 121 in relation to each other. This way, a common time reference 260 may be determined as a set of individual relative offsets. For instance, a selected reference pixel of a commonly available video stream may be monitored by several, or all, participating clients 121, such as by said local software function 125, and a current colour of that pixel may be communicated to the central server 130. The central server 130 may calculate a respective time series based on consecutively received such colour values from each of a number of (or all) the participant clients 121, and perform a cross-correlation resulting in an estimated set of relative time offsets across the different participant clients 121.

In practice, the or each output video stream 230 fed into the video communication service 110 may be included as a part of a shared screen to two or more, or even every, participant client of the video communication in question, and may therefore be used to assess such time offset associated with some or all of the participant clients 121. In particular, the output video stream 230 fed to the video communication service 110 may be available again to the central server via the automatic participant client 140 and/or the API 112.

In some embodiments, a common time reference 260 may be determined at least partly based on a detected discrepancy between an audio part 214 of a first one of said primary digital video streams 210, 301 and an image part 215 of said first primary digital video streams 210, 301. Such discrepancy may, for instance, be based on a digital lip sync video image analysis of a talking participant 122 viewed in said first primary digital video stream 210, 301 in question. Such lip sync analysis is conventional as such, and may for instance use a trained neural network. The analysis may be performed by the synchronisation function 133 for each primary video stream 210, 301 in relation to available common audio information, and relative offsets across the individual primary video streams 210, 301 may be determined based on this information.

In some embodiments, the synchronisation step S503 comprises deliberately introducing a delay (in this context the terms "delay" and "latency" are intended to mean the same thing) of at the most 30 seconds, such as at the most 5 seconds, such as at the most 1 seconds, such as at the most 0.5 seconds, but longer than 0 s, so that the output digital video stream 230 is provided at least with said delay. At any rate, the deliberately introduced delay is at least several video frames, such as at least three, or even at least five or even 10, video frames, such as this number of frames (or individual images) stored after any resampling in the collecting step S501. As used herein, the term "deliberately" means that the delay is introduced irrespective of any need for introducing such a delay based on synchronisation issues or similar. In other words, the deliberately introduced delay is introduced in addition to any delay introduced as a part of the synchronisation of the primary video streams 210, 301 in order to time-synchronise them one in relation to the other. The deliberately introduced delay may be predetermined, fixed or variable in relation to the common time reference 260. The delay time may be measured in relation to a least latent one of the primary video streams 210, 301, so that more latent ones of these streams 210, 301 as a result of said time-synchronisation are associated with a relatively smaller deliberately added delay.

In some embodiments, a relatively small delay is introduced, such as of 0.5 seconds or less. This delay will barely be noticeable by participants to a video communication service 110 using the output video stream 230. In other embodiments, such as when the output video stream 230 will not be used in an interactive context but is instead published in a one-way communication to an external consumer 150, a larger delay may be introduced.

This deliberately introduced delay may be enough so as to achieve sufficient time for the synchronisation function 133 to map the collected individual primary stream 210, 301 video frames onto the correct common time reference 260 timestamp 261. It may also be enough so as to allow sufficient time to perform the event detection described above, in order to detect lost primary stream 210, 301 signals, slide changes, resolution changes, and so forth. Furthermore, deliberately introducing said delay may be enough so as to allow for an improved pattern detection function 134, as will be described in the following.

It is realized that the introduction of said delay may involve buffering 250 each of the collected and time-synchronised primary video streams 210, 301 before publishing the output video stream 230 using the buffered frames 213 in question. In other words, video and/or audio data of at least one, several or even all of the primary video streams 210, 301 may then be present in the central server 130 in a buffered manner, much like a cache but not (like a conventional cache buffer) used with the intention of being able to handle varying bandwidth situations but for the above reasons, and in particular to be used by the pattern detection function 134.

In some embodiments said pattern detection step S504 comprises taking into consideration certain information of at least one, such as several, such as at least four, or even all, of the primary digital video streams 210, 301, the certain information being present in a later frame 213 than a frame of a time-synchronised primary digital video stream 210 yet to be used in the production of the output digital video stream 230. Hence, a newly added frame 213 will exist in the buffer 250 in question during a particular latency time before forming part of (or basis for) an output video stream 230. During this time period, the information in the frame 213 in question will constitute information in the "future" in relation to a currently used frame to produce a current frame of the output video stream 230. Once the output video stream 230 timeline reaches the frame in question 213, it will be used for the production of the corresponding frame of the output video stream 230, and may thereafter be discarded.

In other words, the pattern detection function 134 has at its disposal a set of video/audio frames 213 that have still not been used to produce the output video stream 230, and may use this data to detect said patterns.

The pattern detection can be performed in different ways. In some embodiments, performed by the AI component 134a, the pattern detection step S504 comprises a second trained neural network or other machine learning component analysing at least two, such as at least three, such as at least four, or even all, of said primary digital video streams 120, 301 in concert to automatically detect said pattern 212.

In some embodiments, the detected pattern 212 comprises a speaking pattern involving at least two, such as at least three, such as at least four, different speaking participants 122, each associated with a respective participant client 121, to the shared video communication service 110, each of said speaking participants 122 possibly being viewed visually in a respective one of said primary digital video streams 210, 301.

The production step S505 preferably comprises determining, keeping track of and updating a current production state of the output video stream 230. For instance, such a state can dictate what, if any, participants 122 are visible in the output video stream 230, and where on the screen; if any external video stream 300 is visible in the output video stream 230, and where on the screen; if any slides or shared screens are shown in full-screen mode or in combination with any live video streams; and so on. Furthermore, such a state can dictate any cropping or virtual panning/zooming of any one of the primary digital video streams 210, 301 to be used at any one instance. Hence, the production function 135 can be viewed as a state machine with respect to the produced output video stream 230.

To generate the output video stream 230 as a combined video experience to be viewed by, for instance, an end consumer 150, it is advantageous for the central server 130 to be able to understand what happens on a deeper level than merely detecting individual events associated with individual primary video streams 210, 301.

In a first example, a presenting participant client 121 is changing a currently viewed slide. This slide change is detected by the event detection function 132 as described above, and metadata 242 is added to the frame in question indicative of a slide change having happened. This happens a number of times, since the presenting participant client 121 turns out to skip a number of slides forward in rapid succession, resulting in a series of "slide change" events detected by the even detection function 132 and stored with corresponding metadata 242 in the individual buffer 250 for the primary video stream 210 in question. In practice, each such rapidly forward skipped slide may be visible for only a fraction of a second.

The pattern detection function 134, looking at the information in the buffer 250 in question, spanning across several of these detected slide changes, will detect a pattern corresponding to one single slide change (that is, to the last slide in the forward-skipping, the slide remining visible once the rapid skipping is finished), rather than a number or rapidly performed slide changes. In other words, the pattern detection function 134 will note that there are, for instance, ten slide changes in a very short period of time, why they will be handled as a detected pattern signifying one single slide change. As a result, the production function 135, having access to the patterns detected by the pattern detection function 134, may choose to show the final slide in full-screen mode in the output video stream 230 for a couple of seconds, since it determines this slide to be potentially important in said state machine. It may also choose not to show the intermediately viewed slides at all in the output stream 230.

The detection of the pattern with several rapidly changing slides may be detected by a simple rule-based algorithm but may alternatively be detected using a trained neural network designed and trained to detect such patterns in moving images by classification.

In a different example, that may for instance be useful in case the video communication is a talk show, panel debate or similar, it may be desirable to quickly switch visual attention between, on the one hand, a current speaker, while, on the other hand, still giving the consumer 150 a relevant viewing experience by producing and publishing a calm and smooth output video stream 230. In this case, the event detection function 132 can continuously analyse each primary video stream 210, 301 to at all times determine whether or not a person being viewed in that particular primary video stream 210, 301 is currently speaking or not. This may, for instance, be performed as described above, using per se conventional image processing tools. Then, the pattern detection function 134 may be operable to detect particular overall patterns, involving several of said primary video streams 210, 301, said patterns being useful for producing a smooth output video stream 230. For instance, the pattern detection function 134 may detect a pattern of very frequent switches between a current speaker and/or patterns involving several concurrent speakers.

Then, the production function 135 can take such detected patterns into consideration when taking automated decisions in relation to said production state, for instance by not automatically switching visual focus to a speaker who only speaks for half a second before again going silent, or to switch to a state where several speakers are displayed side by side during a certain time period when both are speaking interchangeably or concurrently. This state decision process may in itself be performed using time series pattern recognition techniques, or using a trained neural network, but can also be based at least partly on a predetermined set of rules.

In some embodiments, there may be multiple patterns detected in parallel and forming input to the production function 135 state machine. Such multiple patterns may be used by different AI components, computer vision detecting algorithms, and so forth, by the production function 135. As an example, permanent slide changes can be detected while concurrently detecting unstable connections of some participant clients 121, while other patterns detect a current main speaking participant 122. Using all such available pattern data, a classifier neural network can be trained, and/or a set of rules can be developed, for analysis of a time series of such pattern data. Such a classification may be at least partly, such as completely, supervised to result in determined desired state changes to be used in said production. For instance, different such predetermined classifiers can be produced, specifically arranged to automatically produce the output video stream 230 according to various and different production styles and desires. Training may be based on known production state change sequences as desired outputs and known pattern time series data as training data. In some embodiments, a Bayesian model can be used to produce such classifiers. In a concrete example, information can be a priori gleaned from an experienced producer, providing input such as "in a talk show I never switch from speaker A to Speaker B directly but always first show an overview before I focus on the other speaker, unless that the other speaker is very dominant and speaking loud." This production logic then be represented as a Bayesian model on the general form "if X is true | given the fact that Y is true | perform Z". The actual detection (of whether someone is speaking loudly, etc.) could be performed using a classifier or threshold-based rules.

With large data sets (of pattern time series data), one can use deep learning methods to develop correct and appealing production formats for use in automated productions of video streams.

In some embodiments, the production function 135 may comprise information regarding what objects or human participant to show in the output video stream 230. For instance, in certain settings one or several participants 122 may not desire or be allowed to be shown to the consumer of the output video stream 230. Then, the production function 135 may produce the output video stream 230 to not show such one or several objects or human participants, based on digital image processing techniques for recognising the objects or humans in question and automatically crop primary video streams 210, 301 so as not to contain said objects or humans before being added as parts to the output video stream 230; or to take production decisions so as not to include primary video streams 210, 301 currently showing said objects or humans in the output video stream 230.

In some embodiments, the production function 130 may be arranged to introduce externally provided information, such as in the form of a primary digital video stream 300 or other type of externally provided data, in response to detected patterns in one or several of said primary digital video streams 210, 301. For instance, the production function 130 may be arranged to automatically detect, via digital processing of imagery and/or sound included in said primary video streams 210, 301, a topic of discussion or a predetermined trigger event or pattern (such as a predetermined trigger phrase). In concrete examples, this may include automatically introducing in the output video stream 230 updated text or chart information from a remote source regarding a topic currently being debated by the participant users 122. In general, the detection of such trigger event or pattern may cause the production function 130 to modify its currently used production state in any way, as a function of the type or characteristics of the detected trigger event or pattern.

In summary, using a combination of the event detection based on individual primary video streams 210, 301; the deliberately introduced delay; the pattern detection based on several time-synchronised primary video streams 210, 301 and the detected events; and the production process based on the detected patterns, makes it possible to achieve automated production of the output digital video stream 230 according to a wide possible selection of tastes and styles. This result is valid across a wide range of possible neural network and/or rule-based analysis techniques used by the event detection function 132, pattern detection function 134 and production function 135.

As exemplified above, the production step S505 may comprise producing the one or several output digital video streams 230 based on a set of predetermined and/or dynamically variable parameters regarding visibility of individual ones of said primary digital video streams 210, 301 in said output digital video stream 230; visual and/or audial video content arrangement; used visual or audio effects; and/or modes of output of the output digital video stream 230. Such parameters may be automatically determined by said production function 135 state machine and/or be set by an operator controlling the production (making it semi-automatic) and/or be predetermined based on certain a priori configuration desires (such as a shortest time between output video stream 230 layout changes or state changes of the above-exemplified types).

In practical examples, the state machine may support a set of predetermined standard layouts that may be applied to the output video stream 230, such as a full-screen presenter view (showing a current speaking participant 122 in full-screen); a slide view (showing a currently shared presentation slide in full-screen); "butterfly view", showing both a currently speaking participant 122 together with a currently shared presentation slide, in a side-by-side view; a multi-speaker view, showing all or a selected subset of participants 122 side-by-side or in a matrix layout; and so forth. Various available production formats can be defined by a set of state machine state changing rules (as exemplified above) together with an available set of states (such as said set of standard layouts). For instance, one such production format may be "panel discussion", another "presentation", and so forth. By selecting a particular production format via a GUI or other interface to the central server 130, an operator of the system 100 may quickly select one of a set of predefined such production formats, and then allow the central server 130 to, completely automatically, produce the one or several output video streams 230 according to the production format in question, based on available information as described above.

Furthermore, during the production a respective in-memory buffer may be created and maintained, as described above, for each meeting participant client 121 or external video source 300. These buffers can easily be removed, added, and changed on the fly. The central server 130 can then be arranged to receive information, during the production of the output video stream 230, regarding added/dropped-off participant clients 121 and participants 122 scheduled for delivering speeches; planned or unexpected pauses/resumes of presentations; desired changes to the currently used production format, and so forth. Such information may, for instance, be fed to the central server 130 via an operator GUI or interface, as described above.

As exemplified above, in some embodiments at least one of the primary digital video streams 210, 301 is provided to the digital video communication service 110, and the publishing step S506 may then comprise providing said one or several output digital videos stream 230 to that same communication service 110. For instance, the output video stream(s) 230 may be provided to a participant client 121 of the video communication service 110, or be provided, via API 112 as a respective external video stream to the video communication service 110. This way, the output video stream(s) 230 may be made available to several or all of the participants to the video communication event currently being achieved by the video communication service 110.

As also discussed above, in addition or alternatively one or several output video streams 230 may be provided to one or several external consumers 150.

In general, the production step S505 may be performed by the central server 130, providing said output digital video streams 230 to one or several concurrent consumers as a live video stream via the API 137.

Figure 8:
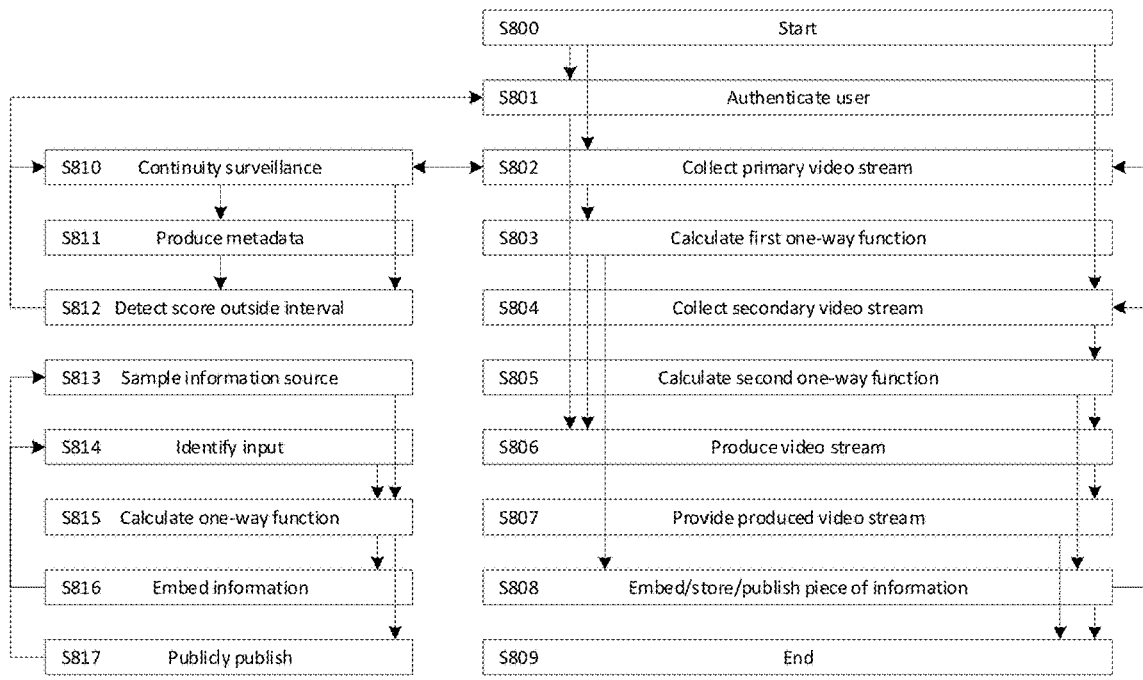
FIG. 8 illustrates a second method, in accordance with one embodiment.

FIG. 8 illustrates a method for providing an output digital video stream, which method will be described in the following with reference to what has been described above. Hence, in the method illustrated in FIG. 8 all the mechanisms and principles described above regarding digital video stream collecting, event detection, synchronising, pattern detection, production and publishing may be applied.

Figure 9:
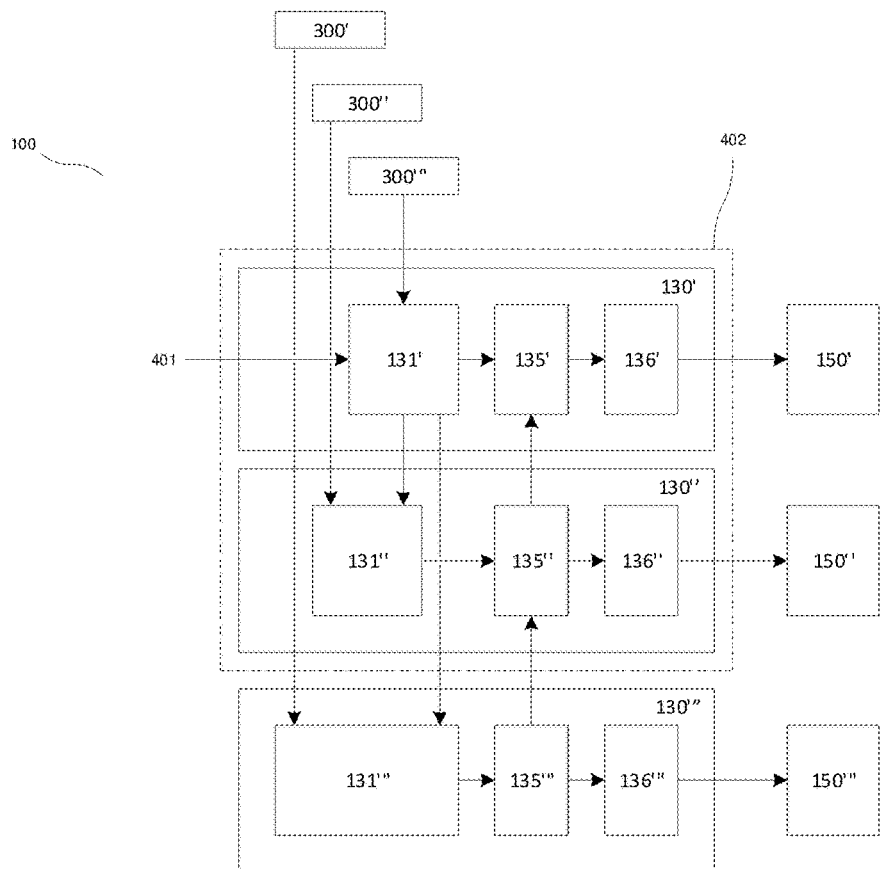
FIG. 9 illustrates a fourth system, in accordance with one embodiment.
Figure 10:
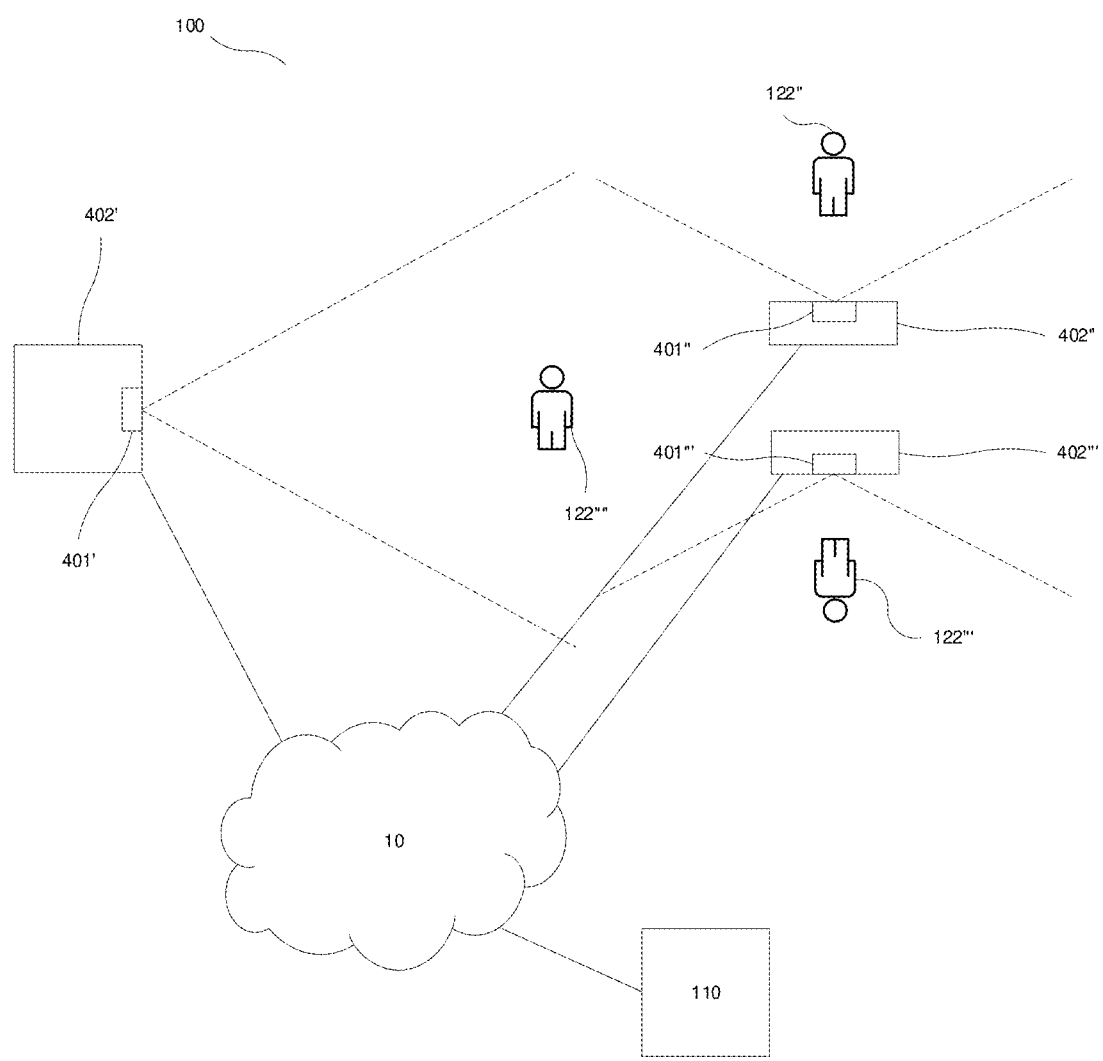
FIG. 10 illustrates a fifth system, in accordance with one embodiment.

Moreover, FIGS. 9 and 10 are respective simplified views of the system 100 configured to perform the methods illustrated in FIG. 8.

In FIG. 9, there are three different central servers 130', 130'', 130''' shown. These central servers 130', 130'', 130'''' may be one single, integrated central server of the type discussed above; or be separate such central servers. They may or may not execute on the same physical or virtual hardware. At any rate, they are arranged to communicate with each other.

In some embodiments, the central servers 130' and 130'' may be arranged to execute on one and the same piece of physical hardware 402 (illustrated by dotted rectangle in FIG. 9), for instance in the form of a discrete hardware appliance such as a per se conventional computer device. In some embodiments, such discrete hardware appliance 402 is a computer device 402' (see FIG. 10) arranged in, or in physical connection to, a meeting room, and specifically arranged to conduct digital video meetings in that room. In other embodiments, the discrete hardware appliance is a personal computer 402'', 402''', such as a laptop computer, used by an individual human meeting participant 122, 122'', 122''' to such digital video meeting, the participant 122, 122'', 122''' being present in the room in question or remotely.

Each of the central servers 130', 130'', 130''' comprises a respective collecting function 131', 131'', 131''', that may be as generally described above. The collecting function 131' is arranged to collect a digital video stream 401 from a digital camera (such as the video camera 123 of the type generally described above). Such a digital camera may be an integrated part of said discrete hardware appliance 402 or a separate camera, connected to the hardware appliance 402 using a suitable wired or wireless digital communication channel. At any rate, the camera is preferably arranged locally in relation to the hardware appliance 402.

Each of the collecting functions 131'', 131''' may collect a digital video signal corresponding to the digital video stream 401 directly from said digital camera or from collecting function 131'.

Each of the central servers 130', 130'', 130''' may also comprise a respective production function 135', 135'', 135'''. Each such production function 135', 135'', 135''' corresponds to the production function 135 described above, and what has been said above in relation to production function 135 applies equally to production functions 135', 135'' and 135'''. There may also be more than three production functions, depending on the detailed configuration of the central servers 130', 130'', 130'''. The various digital communications between the production functions 135', 135'', 135''' and other entities may take place via suitable APIs.

Moreover, each of the central servers 130', 130'', 130''' may comprise a respective publishing function 136', 136'', 136'''. Each such publishing function 136', 136'', 136''' corresponds to the publishing function 136 described above, and what has been said above in relation to publishing function 136 applies equally to publishing functions 136', 136'' and 136'''. The publishing functions 136', 136'', 136''' may be distinct or co-arranged in one single logical function with several functions, and there may also be more than three publishing functions, depending on the detailed configuration of the central servers 130', 130'', 130'''. The publishing functions 136', 136'', 136''' may in some cases be different functional aspects of one and the same publication function 136, as the case may be.

Whereas the publishing functions 136'' and 136''' are optional and may be arranged to output a different (possibly more elaborate, associated with a respective time delay) video stream than a video stream output by publishing function 136', the publishing function 136' is arranged to output one or several output digital video streams of the type generally described herein. Further generally, each of the production functions 135'' and 135''' can be arranged to process the respective incoming video streams so as to produce production control parameters to be used by the production function 135' to in turn produce said output video stream(s) according to what is described herein.

FIG. 9 also shows three external consumers 150', 150'', 150''', each corresponding to external consumer 150 described above. It is realised that there may be less than three; or more than three such external consumers 150', 150'', 150'''. For instance, two or more of the publishing functions 136', 136'', 136''' may output identical or different produced video streams to one and the same external consumer 150', 150'', 150''', and each one of the publishing functions 136', 136'', 136'' may output identical or different produced video streams to more than one of said external consumers 150', 150'', 150''''. It is also noted that at least the publishing function 136' may publish one or several produced video stream(s) back to the collecting function 131'. Furthermore, each of the publishing functions 136', 136", 136''' may be arranged to publish the respective produced video stream(s) in question to a participant client 121 of the general type discussed above.

It is realised that the consumer 150' may be a participant client 121 that also comprises the central server 130', for instance by a laptop computer 402", 402''' being arranged with the functionality of central server 130' (and possibly also central server 130") and providing a corresponding human user 122", 122''' with the enhanced, real-time output video stream on a screen of said laptop computer 402", 402''' as a part of the video communication service in which the human user 122", 122''' participates.

Moreover, FIG. 9 shows three external information sources 300', 300", 300''', each corresponding to external information source 300 described above and providing information to a respective one of said collecting functions 131', 131", 131'''. It is realised that there may be less than three; or more than three such external information sources 300', 300", 300'''. For instance, one such external information source 300', 300", 300''' may feed into more than one collecting functions 131', 131", 131'''; and each collecting function 131', 131", 131''' may be fed from more than one external information source 300', 300", 300'''.

FIG. 9 does not, for reasons of simplicity, show the video communication service 110, but it is realised that a video communication service of the above-discussed general type may be used with the central servers 130', 130", 130''', such as providing a shared video communication service to a participant client 121 using the central servers 130', 130", 130''' in the way discussed above. In some embodiments, central server 130''' constitutes, comprises or is comprised in the video communication service 110.

FIG. 10 illustrates three different exemplifying hardware appliances, namely a meeting room hardware appliance 402' comprising a digital camera 401' in turn arranged to capturing imagery showing one or more human meeting participants 122", 122''', 122'''' in a meeting locality, room or venue; and two laptop computers 402", 402''', each comprising a respective digital web camera 401", 401''' arranged to capture imagery showing a respective on of said human meeting participant 122", 122''' using the laptop computer 402", 402''' in question. It is understood that FIG. 10 shows one of many different configurations, with the purpose of illustrating the principles of various embodiments of the present invention, and that other types of configurations are possible. For instance, only some of the participants 122", 122''', 122'''' may be visible to the camera 401'; additional participant users (that are not shown in FIG. 10) may participate in the video communication service remotely; external information sources may be used; and so forth as exemplified herein. As used herein, the term "remotely" means not "locally" arranged, using the above-provided definition. Two entities arranged "remotely" one in relation to the other are preferably arranged to communicate via the open internet (WAN).

An exemplifying one of the participant users 122'''' is not visible to cameras 410", 401''', but only from camera 401'. Participant user 122" is visible to both cameras 401' and 401". Participant user 122''' is visible to both cameras 401' and 401'''.

Each of the hardware devices 402', 402", 402''' may correspond to the device 402 shown in greater detail in FIG. 9, and each of the hardware devices 402', 402", 402''' may be arranged to communicate, via the internet 10 or another digital communication network, with video communication service 110. It is noted that the video communication service 110 may then provide the shared video communication service using devices 402', 402", 402''' as participant users 121 of the general type described above. In some embodiments, the video communication service 110, such as the central server 130''' is remote in relation to the central servers 130', 130".

Turning back to FIG. 8, in a first step S800 the method starts.

In a subsequent step S801, a first participant user 122 is authenticated. There are many different ways to perform such an authentication. The authentication can comprise at least one or several of the following:

The user 122 logs in to the system 100.

The user 122 logs in to a system which is external to the system 100, for instance to a system operated by an online service vendor such as a social network or search engine operator.

The user 122 uses an existing login with a first external party to login with respect to the system 100 or to a system provided by a second external party, such as using a login token provided by the first external party.

The user 122 uses a username/password combination to be authenticated with respect to the system 100 or to a system provided by an external party.

The user receives a one-time password and uses this to be authenticated with respect to the system 100 or to a system provided by an external party.

The user 122 is biometrically measured with respect to a fingerprint, a palm, an iris, a 2D or 3D face profile, a voice profile, or similar, to be authenticated with respect to the system 100 or to a system provided by an external party.

Generally, the authentication can include at least one, at least two or even all three of the general authentication factor types "something you have", "something you know" and "something you are".

Something the user 122 "has" can be a mobile device, such as a smartphone or a laptop that may or may not be the client device 121 used by the user 122 to access the video communication service 110. Hence, the mobile device can be used to receive a one-time password to be entered into a graphical user interface or via a microphone, or the mobile device can be hardware-tied to a piece of information used in the authentication, such as via a secure circuit of the mobile device. A smartcard, a USB drive or other communication-enabled separate device can also be used as something that the user 122 has. The verification that the user 122 "has" the device can be by the device receiving a piece of information, such as a PIN, and the user 122 entering the information into the system 100 or into the external system. In other embodiments, the device the user 122 "has" can be arranged to communicate directly, such as electronically, digitally, using a wire and/or wirelessly, or even using an audio channel at outside-of-human-hearing-frequencies, with the client 121. Such direct communication can be active only in connection to the authentication, but can also be active also thereafter, and be used in the below-discussed continuity surveillance.

Something the user 122 "knows" can be a PIN, a password or passphrase. It can also be a response to a question that may be difficult to answer for other persons than the user 122.

Something the user 122 "is" can be a biometric measure of the user 122, such as a fingerprint, a facial recognition pattern, an iris scan pattern, a DNA signature, or the like.

It is realized that there are many different known ways to authenticate the user 122. Herein, the terms a "way to authenticate", a "manner of authentication", a "type of authentication", and similar, are used as synonyms.

The authentication can generally be in relation to the system 100 or to a different system provided by an external party. In some embodiments, it is not important in relation to what party the user 122 is authenticated; instead, an interesting aspect may in such cases instead be the reliability of the authentication in itself in terms of the authentication being a reliable proof of the actual identity of the user 122, and the fact that the authentication can be retroactively verified.

Namely, the authentication in relation to the system 100 or any externally provided system can produce an authentication token, in the following denoted a first authentication token. The token itself can have any suitable format, such as a hash value or a cryptographic signature. Then, such a token can be configured so that it can used to retroactively validate the authentication, so that a party having access to the first authentication token can securely validate, using available tools, that the user 122 was indeed authenticated or indeed has an active and valid authentication. In a concrete example, a Webauthn device is used for the authentication, such as the Yubikey®. It is a compact personal key that operates over a standard protocol, using asymmetric cryptographical techniques, producing unique digital tokens that are immediately validated by an authentication server, but also may be preserved for later verification. In another concrete example, a third-party authentication part, such as Google®, performs the authentication and in response provides an authentication token, such as an access token according to the Oauth standard.

As used herein, "authenticated", "authentication", or the like, means that some party (such as an operator of the system 100) has verified the identity of somebody, such as the identity of the user 122.

In a collecting step S802, that can be subsequent or concurrent in relation to step S801, one or several real-time first primary digital video streams 210, 301 is or are continuously collected. In the case illustrated in FIGS. 9 and 10, the video stream 210, 301 is stream 401, continuously collected from any one of the cameras 401', 401", 401''', by collecting function 131' (and/or 131", 131''', in the case of collection of the external information source 300).

In particular, a first primary video stream can be captured to visually show the first user 122. A second primary video stream can be captured, in a step S804, to visually show a second user. The first and second users can be two different ones of users 122', 122" and 122''' as shown in FIG. 10. Even if each user 122', 122", 122''' can be visible in one or several primary video streams, the first and second primary video streams are different video streams, preferably captured using different physical cameras. Generally, a stream can be said to visually show an object, a user, or the like, when the stream includes information that represents one or more images depicting the object, etc.

That the first primary digital video stream is a "real-time" stream means that it is provided from a capturing camera to the collecting function 131 in question without any delay, and without any time-consuming image processing before reaching the collecting function 131. For instance, any data processing and/or communication between the capturing of the image frames of the camera sensor until the corresponding digital video stream is stored in the collecting function 131 may be less than 0.1 s, such as less than 0.05 s.

As mentioned above, the first primary digital video stream 210, 301 may be continuously captured by a camera 410', 401", 401''' arranged locally in relation to a participant client 121 consuming the output video stream, such as the device 402, 402', 402", 402''' itself.

Moreover, the first primary digital video stream 210, 301 may be continuously captured by a camera 401', 401", 401''' arranged to capture imagery showing a participant user 122", 122''' of the device 402", 402''' (participant client 121) in question.

The first primary video stream is captured so that it comprises a first primary authentication video part. As used herein, a "video part" refers to a part of a video stream, comprising image and/or audio data, spanning at least over a certain time period, e.g. including one or several consecutive video frames and/or corresponding audio contents, of the video stream. Such a video part can be limited to only very short time periods, such as one single video frame. In some embodiments, however, the video part is at least 1 second and/or at least 10 video frames. It is preferred that the video part is configured to allow the unambiguous retroactive detection of a piece of information, such as information regarding the first authentication token information, stored as a part of the video stream.

Namely, the first primary authentication video part is captured to fulfil at least one of two different criteria: The first criterion is that it visually shows the step of authenticating. The second criterion is that it comprises information visually and/or audibly representing the first authentication token.

That the first primary authentication video part is captured to visually show the step of authenticating means that the video part contains enough visual information to allow a third party to retroactively and unambiguously deduce, based on the video part, that the authentication of the user 122 really took place, what type of authentication was used and the outcome of the authentication (that the user 122 was affirmatively authenticated). For instance, the video part can comprise footage of the user 122 holding up her smartphone with its screen visible, the user 122 receiving a one-time password, entering the one-time password into an on-screen graphical user interface of the smartphone or a different device and receiving an authentication confirmation onto the graphical user interface, where all steps of the authentication process, including any information used, are clearly verifiable using visual inspection of the first primary authentication video part. This may include that a screen of the smartphone is clearly shown in the video part, by the user 122 holding the screen up to the camera of the device 121 during the authentication to show the necessary steps performed during the authentication. Instead of a one-time password, a QR or bar code can be received by a smartphone of the user 122, and the screen of the smartphone showing the QR or bar code can be shown to in the video part. In a different example, the authentication takes place in a graphical user interface presented using a display screen of the client device 121, and the display screen is dumped, recorded or copied to form a part of the video part. In other examples, the first primary authentication video part can itself form part of the authentication process and therefore show the authentication of the user 122. For instance, the user 122 can be provided with a one-time password from some authenticating entity, that the user 122 provides, orally and/or visually, to the camera of the device 121, and that the device 121 performs a verification of the one-time password or relays it to some authentication entity that can verify it. The veracity of the one-time password should then be retroactively verifiable by any party viewing the first primary authentication video part containing the one-time password.

That the first primary authentication video part comprises information visually and/or audibly representing the token can mean that the token can be shown to the camera of device 121, for instance on the screen of the user's 122 smartphone or on a piece of paper in turn being placed in view of the device'2 121 camera, and that the visual appearance of the information forms part of the first primary authentication video part; or that the user 122 speaks the token, such as in the form of a verbally delivered code or passphrase, and that the sound of the speaking is captured and forms a part of the video part. Again, it is preferred that the token is configured to be deduced unambiguously by a third party retroactively. In alternative embodiments, the token information can be embedded into the first primary authentication video part, by the first primary authentication video part being modified, such as digitally modified, by for instance digitally adding the token information in the form of a QR code, a bar code, a sequence of alphanumeric characters, or the like, in a visibly readable manner in the video part. Such addition can be in the form of a readily readable overlay, a watermark, or in any other suitable manner, and can be performed by the participant client 121 or any other part of the system 100 that can access and modify the first primary video stream before it is used to produce the produced video stream. The information shown can be the token itself or some other piece of information that can be used to unambiguously find the token, such as via association, calculation or similar.

Generally, the authentication can result in the first user 122 audibly and/or visually providing a piece of authentication information, such as a one-time password having been provided to the first user 122, so that the piece of authentication information (for instance the one-time password itself, as discussed above, or an authentication result, a resulting token or some other type of proof of authentication) forms part of the first primary authentication video part.

It is hence realized that information, in the form of information unambiguously representing the token or unambiguously showing that the step of affirmative authentication took place with respect to the user 122, is caused to be present in the first primary authentication video part either by a camera and/or microphone, used to capture the first primary video stream comprising the video part, physically capturing the information during the capture of the primary video stream; and/or that information is added to the already-recorded primary video stream as a modification or overlay after the capture before the first primary video stream is used in the production of the produced video stream.

In a subsequent step S803, an output of a first one-way function is calculated, using as direct or derivative input the first primary video stream. In a step S805, an output of a corresponding second one-way function can also be calculated, using as direct or derivative input the second primary video stream.

The term "one-way function" is per se well-known in the art, meaning a function the input value of which is, in practice, impossible to determine based only upon the corresponding function output value, and which is substantially one-to-one in the sense that in the practical applications described herein, two different input values will in practice always result in two different output values. Examples include many hash functions which are conventional as such, such as SHA hash functions, such as SHA-1, SHA-2 and SHA-3, as well as MD5.

In various embodiments, such one-way functions are collision-free. Furthermore, they can be cryptographic hash functions in the sense described at https://en.wikipedia.org/wiki/Cryptographic_hash_function.

Each one-way function described herein can be the same or different one-way functions (that is, the same or different one-way functions can be used in different contexts and situations).

As the term is used herein, that an output of a one-way function is calculated using a certain piece of information, such as a video stream, "as direct or derivative input", means that the result (output) of the one-way function is caused to unambiguously depend on the certain piece of information in a direct or indirect manner. Sometimes the phrase "calculating a function" is used, and sometimes "calculating an output of a function", but it is understood that these mean the same thing.

For instance, some or all pixel values of one or several frames of a video stream can be used directly as input to the one-way function, or (more realistically) a hash value of such data can be used as input to the one-way function. However, in more complex embodiments, the certain piece of information can be used as input to another one-way function (that in turn can be the same or a different one-way function), the output of which can form the input to a one-way function to produce the end result. This way, "chains" of one-way functions can be formed, the chains in some cases being very long. One property of such a calculation chain is then that, in order to correctly calculate a final output of a downstream-most one-way function, the following information is required:

The data fed into an upstream-most one-way function;
all the one-way functions used in the chain; and
any additional input information being inserted into one or several of the one-way functions along the chain.

In other words, a "derivative" input can be derived along a chain of functions, such as one-way functions, the chain comprising two or more functions being calculated serially and possibly over time. Such chains of one-way function can both be branched and joined.

Of course, a "derivative" input can also be derived using a non-one-way function, such as a conventional integral, summing or difference function, or the like.

Correspondingly, an output of a one-way function can be "direct or derivative" in the sense that the output may be the output value of the one-way function itself, or a value being determined in a repeatable and unambiguous manner based on such direct output value, for instance via a chain of additional one-way functions and/or other calculations.

Furthermore, the output of the first one-way function can be calculated using the first primary authentication video part as direct or derivative input. Concretely, the output of the first one-way function can be calculated in a way so that the result output of the first one-way function cannot be calculated without having access to any sub-part of the first primary authentication video part that is sufficient to be able to verify the affirmative authentication of the first user 122 as described above.

In a subsequent step S806, a produced video stream is automatically produced based on the first primary video stream and the second primary video stream. The automatic producing is based on automatic production decisions of the type explained and exemplified above, for instance based on the automatic detection of events and/or patterns, using a deliberately introduced delay and/or based on predetermined and/or dynamic production parameters. Concretely, the automatic production can be performed based at least on one of a defined production parameter; an automatic image processing of the first and/or second primary video streams; and an automatic audio processing of the first and/or second primary video streams.

In a subsequent step S807, the produced video stream is provided to a recipient user, that in turn may be the first user, the second user, a different user being party to the same video communication service 110 and/or an external user 150.

Any or all of the primary video streams and the produced video stream can be stored for future reference, in that case preferably in a persistent and permanent manner, such as on a hard drive, a flash drive, a non-volatile memory storage, or the like. The storing can be in a way that allows full retroactive replication of each of the video streams, in other words not using any lossy compression algorithm or similar. This will allow the retroactive verification, using any relevant output of one or several one-way functions, such as the first one-way function of the informational integrity of the stored data, and in particular the verification of the authentication of the first user 122.

In some embodiments, the first user and the second user participate in an interactive video session, using the video communication service 110. Then, the produced video stream showing the first user is provided to the second user and a corresponding produced video stream showing the second user is shown to the first user. The two produced video streams can be one and the same, showing both the first user and the second user, or be different. In case of a different produced video stream, they can each be independently produced in the general way discussed above, possibly including into the second primary video stream a second primary authentication video part comprising proof of the second user being affirmatively authentication in a way corresponding to what has been described above with respect to the first primary authentication video part. Each of the production of the two produced video streams can take place in a separate central server 130; in a device 121 operated by the first user; and/or in a device 121 operated by the second user.

Hence, that the produced video stream is "provided" to the recipient user can mean that the first primary video stream is used by a producing entity to produce the video stream which is thereafter sent to (provided to) a device of the recipient user; or that the first primary video stream is first sent to the device of the recipient user that produces the video stream which is thereafter shown to (provided to) the recipient user.

In general, the provision of the respective produced video streams to the first and/or second users can be made in the context of, and form part of, an interactive video communication service having the first user and the second user as participants in the general manner discussed above.

In a step S808, which is performed after the calculation of the first and second one-way functions, a piece of information representing a direct or derivative output of the first one-way function is embedded into the produced video stream as a visual and/or audible representation of the piece of information in question; stored (preferably persistent and permanently with the meaning as discussed above); and/or publicly published. A corresponding piece of information representing a direct or derivative output of the second one-way function can be treated in a similar manner. It is realized that one and the same piece of information can represent a direct or derivative output of both the first one-way function and of the second one-way function.

That the piece of information is "embedded" into the produced video stream means that the produced video stream is modified as compared to a produced video stream without the piece of information embedded. The modification can take place as a result of the production and/or postproduction and can be a digital modification. For instance, the embedded piece of information can be digitally added in the form of a QR or bar code, or a sequence of alphanumeric characters in a visibly readable manner in the video part, coding for the piece of information. The addition can be in the form of a readily readable overlay, a watermark, or in any other suitable manner. The information shown can be the piece of information itself or some other piece of information that can be used to unambiguously find the piece of information representing a direct or derivative output of the first one-way function in question, such as via association, calculation or similar. The embedding can also be audible, so that an audio part of the video stream is modified to retroactively be able to extract the embedded piece of information from the produced video stream. Examples include an audio watermark or a computer-generated voice or signal representing the embedded piece of information. The embedding can be visible/audible or hidden. The embedding can also be in metadata of, or associated with, the video stream.

The corresponding applies when embedding information into a primary video stream, but then the embedding is always performed before the primary video stream is used to produce a produced video stream, so that the primary video stream with the embedded information is used as a "primary video stream" in the sense discussed above.

In general, the piece of information representing the authentication token can be embedded as a visual and/or audible part of the first primary video stream within a defined time period from the step of authentication and/or re-authentication (see below), such as at the most one minute, such as at the most ten seconds, such as at the most one second, the time period being defined in terms of a timeline of the primary video stream.

That the piece of information is "stored" means that it is stored on some suitable storage medium, such as in a database, for future access. The storing can be as a part of, together with or separate from the video stream. The storing is preferably persistent and permanent, such as on a conventional hard drive, a flash drive, a non-volatile memory storage, or the like. The storing can be in a way that allows full retroactive replication of each piece of information, in other words not using any lossy compression algorithm or similar.

That the piece of information is "publicly published" means that it is published in such a way so that it is readily available to a wide enough audience, and with sufficient persistence over time, so that a third party is more likely than not to be able to verify the time of publication (such as to a granularity of at the most one day or even at the most one hour) and the contents of the piece of information or document exactly as they were at the date and time of publication, even if some time, such as several years, has passed after the publication.

For instance, the piece of information can be published as a public social media post or on a publicly inspectable blockchain. The public publishing can be in a format so that the piece of information itself, as well as a publication timestamp thereof, is accessible online. In general, the public publishing takes place on and using a publicly available publication channel.

In a subsequent step S809, the method ends. However, as is illustrated in FIG. 8, the process can be repeated iteratively over time; capturing any primary video streams, producing one or several produced video streams and processing the piece of information.

As mentioned above, the first primary video stream captures imagery of the first user 122, and in particular it may capture imagery showing the first user 122 being authenticated. It is possible that a different camera also captures a primary video stream comprising imagery of the first user 122. For instance, in case the first primary video stream is captured by camera 401" showing the first user 122" being authenticated, the other camera 401' also shows the first user 122" being authenticated.

In some embodiments, the authentication in step S801 can further comprise capturing (for instance by camera 401') an image or a video showing both the first user 122" and a camera 401" used to capture the first primary video stream. In other words, the camera 401" is in the field of view of camera 401'. Then, this additional captured image or video (by camera 401') can be processed and used in a way corresponding to the first primary authentication video part, in other words a one-way function can be calculated having as direct or derivative input the captured image or video, and an output of the one-way function can be embedded into the produced video stream, stored and/or publicly published. In a way corresponding to what has been discussed above, using chaining and similar techniques, the captured image or video can be combined with the first primary authentication video part into one and the same one-way function (such as the below-described joint one-way function), so that one single one-way function output represents both the captured image or video and the first primary authentication video part. Hence, in such cases there are two different but concurrently captured primary video streams (from cameras 401' and 401" in the present example) covering the authentication of the user 122: the first primary video stream captured by camera 402" comprising the first primary authentication video part and the primary video stream captured by camera 402' showing both the user 122 and the camera 402" as the first primary authentication video part was captured.

In some embodiments, parts of the first primary video stream may be captured prior to a moment in time, along a timeline of the first primary video stream, where the production of the produced video stream commences. In other embodiments, the first primary video stream may be captured during a part of the first primary video stream that is currently not used (and/or will in fact never be used) as an input to the produced video stream. This may be the case, for instance, in so-called "lobby" or "waiting room" functionality, where a user can check or log in to the meeting, check audio and video and so forth, before being let into the meeting. This may also be the case for "green room" or "breakout room" functionality, and similar.

In such cases, the first primary authentication video part can be a part of the first primary video stream during such times along a timeline of the first primary video stream, for instance during a time which is before a part of the primary video stream that is used for the automatic production of the produced video stream. In other words, the step of authenticating and/or information representing the token may be shown in, or form part of, the first primary video stream in a part of the first primary video stream that is not used to produce the produced video stream, and may as a result not be shown to any other participant user of the video communication service 110 than possibly the user 122 being authenticated. However, it is noted that the first one-way function is still calculated to depend on the information in the first primary authentication video part so that the authentication is verifiable at a later point in time.

In some embodiments, metadata is provided, such as received, identified, created, deduced or similar, in relation to one or several of the primary and/or produced video streams described herein, and stored, for instance in step S808. Such metadata can be of the general type described above. Such metadata can be associated with any one of the primary and/or produced video streams described herein, and in particular with the first primary video stream and/or any produced video stream. Such metadata can have different forms, and may be provided at any point, such as in connection to a certain event; intermittently; continuously; and/or upon request from some part of the system 100.

In some cases, the first authentication token, or derivative information of the first authentication token being useful to unambiguously deduce the first authentication token, is or forms part of such metadata.

In some cases, a current authentication status, such as information regarding a latest perform authentication, a current continuity score and/or a trustworthiness measure, of the first user 122 is or forms part of such metadata.

The method can comprise a step S810 performing a continuity surveillance. The continuity surveillance can be based at least on automatic image processing of the first primary video stream and/or audio processing of the first primary video stream and/or analysis of sensor data pertaining to the physical camera capturing the first primary video stream, to determine to what extent the first user has been continuously visibly and/or audibly (that is, hearable) present in the first primary video stream since the step of authenticating. The continuity surveillance can relate to monitoring of the first user's presence in the video stream, e.g. in terms of visibility of the user and/or audibility of audio generated by and/or in relation to the first user. The continuity surveillance can alternatively or additionally be based on detection of an ongoing or active communication between a device held by the user and the participant client 121 of the user 122, the device having been used as a something the user "has" authentication factor as described above.

This can comprise one or several of at least the following:
Analysing consecutive frames of the primary video stream to determine the continued and continuous presence of the first user 122 in the image frames, such as using shape-following image processing as the first user 122 moves around, in particular to determine whether the first user 122 disappears from the first primary video stream. Continuous presence can then affect the continuity score to be improved.
Analysing a visual appearance of the first user 122, including a facial look, a facial recognition, hair style, clothing, posture, size, body shape and so forth, to determine that the appearance does not change in an unexpected manner over time. The absence of such change can then affect the continuity score to be improved.
Analysing a fit between the visual appearance and/or physical movement of the first user 122 and a physics model, detecting any unexpected movements of the first user 122. A good fit can then affect the continuity score to be improved.

Analysing a voice of the first user 122, possibly in connection to detecting visual lip movement of the first user 122 to perform a lip-sync analysis to determine who is talking, the analysis detecting whether the voice of the first user 122 changes in an unexpected way. Absence of such change can then affect the continuity score to be improved.

Monitoring a communication between the client 121 and said "has"-factor device to detect a communication activity, frequency and/or status, detecting if one or several defined thresholds for the communication have been surpassed. Such communication can be using any suitable wired or wireless communication protocol, such as a short-range wireless protocol such as NFC, Bluetooth or any other wireless protocol having a normal range of less than 20 meters, but is preferably automatically conducted by the client 121 and the factor device without the user 122 having to do anything once the two devices have been paired. Surpassing such thresholds can then affect the continuity score to be worsened.

Measuring and analyzing, using suitable digital image processing algorithms, general properties of the first video stream including one or several of lighting conditions, background, direction, zoom, pan and focus. Large and/or frequent detected changes in one or several such general properties can then affect the continuity score to be worsened.

Detecting, using suitable digital image processing algorithms, events or patterns shown in the first video stream, such events or patterns possibly being of the general types discussed above. The detection of predetermined such events or patterns, or events or patterns that are surprising according to some defined measure, can then affect the continuity score to be worsened. For instance, an event can be that an object, such as a pet, temporarily covers the image of the authenticated user 122.

Measuring and analyzing a movement of the camera, e.g. by measuring an acceleration and/or rotation of the camera (as measured by a MEMS sensor, an accelerometer, a gyroscope or similar physically connected to the camera); by measuring a translation and/or zoom occurring in the image depicted by the camera (as measured using a in corresponding digital image algorithm). Larger and/or more frequent detected camera movements can then affect the continuity score to be worsened.

This continuity surveillance can produce, in a step S811, a stream or flow of metadata points, reflecting a current status of the continuity surveillance and its result. This metadata can then be stored for later reference, and/or it can be used as input to the various joint one-way functions discussed below.

In general, the continuity surveillance can take place in the client 121, such as device 402", of the user 122, but it can also take place in a central server 130, such as in the video communication service 110. This is particularly true for a continuity surveillance being performed based on the contents of the first primary video stream. It is reminded that the client 121, 402" here is a piece of hardware, separate from such a central server 130 and configured to continuously capture the first primary video stream using camera 401".

For instance, the first primary video stream can be provided, in raw or processed format, to such a central server 130, from the client 121, 402". Then, the continuity surveillance can be performed in the central server 130 based on the first primary video stream as provided from the client 121, 402". In this and other cases, the continuity surveillance can be performed by the client 121, 402" itself, or the continuity surveillance can be performed using a combination of computing efforts from the central server 130 and the client 121, 402", such as the client 121, 402" performing a first or cursory monitoring, automatically delegating defined more advanced or follow-up tasks to the central server 130.

An interruption of a communication connection between the central server 130 and the client 121, 402" can be detected. Upon the detection of such interruption, an ongoing continuity surveillance, or part of such continuity surveillance, performed by the central server 130 can then automatically be switched to be performed by the client 121, 402". This means that the client 121, 402" can instead perform the (part of the) continuity surveillance in question, during part of or the entire duration of the interruption.

Upon a detection of a subsequent regaining of the communication connection, the (part of the) continuity surveillance can then be switched back, from the client 121, 402" to the central server 130. Information regarding the results of the surveillance performed by the client 121, 402" can be transferred to the central server 130 for continuity.

The switch between the central server 130 and the client 121, 402" can also be based upon other parameters than the communication channel availability, such as load-balancing considerations or security settings for the video communication service 110.

In some embodiments, the system 100 prioritizes the central server 130 to perform the continuity surveillance, only delegating this task partly or completely to the client 121, 402" when so is required or desired based on defined parameters, such as said detection of the availability of the communication connection.

In case the continuity surveillance is performed at least partly by the central server 130, upon the detection of the interruption of the communication connection the continuity surveillance may also, in some embodiments, be paused by the central server 130. Then, upon a detection of a regaining of the communication connection, the central server 130 can catch up a reception of the primary video stream from the client 121, 402" and then perform the continuity surveillance retroactively using caught-up parts of the first primary video stream from a point in time, along a timeline of the first primary video stream, after the interruption. Thereafter, the central server 130 can then continue to perform the continuity surveillance of the primary stream being provided to the central server using the regained communication connection.

At least during times when the communication connection is not available, the client 121, 402" can perform a "weaving" of the first primary video stream of the type described below, including embedding into a second video frame of the first primary video stream the direct or derivative output of a one-way function in turn using as direct or indirect input a first video frame of the first primary video stream, and then iterating by using the second videos frame, including the embedding, as direct or derivative input to another one-way function, the direct or derivative output of which is embedded into a third frame, and so forth, where (if the client 121, 402" is connected to the internet) any such one-way function can use as direct or derivative input a sampled piece of information from a publicly available information source and/or (again if the client 121, 402" is connected to the internet) a direct or derivative output of any such one-way function can be publicly published.

In practical examples, the continuity surveillance can comprise calculating a continuity score, such as continuously or intermittently. The continuity score can be calculated based at least on automatic image and/or audio processing of said type, of the first primary video stream. In particular, the continuity score can be calculated as, or based on, a defined trustworthiness measure regarding whether the first user 122 has been continuously visible or otherwise present (such as based on voice information) in the first primary video stream since the step of authenticating.

The purpose of the continuity score is to determine an objective measure, based on available information, of a probability that the user 122 previously authenticated has since the authentication been continuously present in the first primary video stream (as monitored by the central server 130 and/or the client 121, 402" as discussed above), irrespectively of if the first primary video stream is used or not to produce the produced video stream. Together, the authentication itself (that is provable using the first primary authentication video part) and the continuity surveillance provides a measurable level of authenticity of the user 122 being shown in the first primary video stream. It is hence preferred that the continuity surveillance is performed without interruption from the step of authenticating onwards.

Depending on the detailed implementation, various continuity surveillance parameters can be measured, and the continuity score and/or trustworthiness measure can be calculated based on the measured parameter values. A set interval can be defined for the continuity score and/or the trustworthiness measure, and in case, in a step S812, either value is detected to fall into or outside of such a predetermined interval, the first user 122 can be re-authenticated.

Such re-authentication can be forced, such that the first user 122 is presented with a login screen or similar and so that it is impossible for the first user 122 to continue participating in the video communication service 110 before performing the re-authentication. In other embodiments, the re-authentication is optional, but the presence of the first user 122 can be downgraded in the video communication service 110 with respect to its credibility, which may in turn affect a set of rights associated with the first user 122 with respect to the video communication service 110; may be signalled to the other participant users of the video communication service 110; and/or recorded in the form of metadata of the above-mentioned type and stored for future reference.

There may be several different such intervals, and/or intervals that are dynamically calculated, and the falling outside of which can result in different defined, predetermined or parameter-controlled, consequences such as alerting the other users and/or requiring re-authentications of different defined security levels.

The re-authentication can generally be performed in the same or different way as the step of authenticating described above, and/or in the same or different way as compared to any previously performed re-authentication, but what was generally stated with respect to the original authentication of the first user 122 would also apply to the re-authentication thereof.

Once re-authenticated, the updated first primary authentication video part resulting from the re-authentication will be used as the first primary authentication video part from that point onwards, including the re-calculation of the first one-way function and so forth. Hence, by re-authentication the surveillance score and/or trustworthiness measure can instantly be improved with respect to the first user 122.

The continuity score can in general be determined based on one or several of many different types of aspects of the available information. Examples include the following:

The first user 122 disappearing, and perhaps re-appearing, from and in the first primary video stream, as monitored and detected using per se standard digital image processing techniques;

A reaction of one or several other users, apart from the first user 122, to a particular action performed by the first user 122, such as the first user 122 disappearing and reappearing, as monitored using suitable digital image processing techniques (for instance, if the first user 122 disappears and reappears, or if the first user 122 switches seats or says something unexpected, the continuity score can remain at a good level so long as the other visible participants are not detected to look startled or surprised by the action in question);

The first user 122 not having been detected to say anything since the step of authenticating;

a (change of) visual appearance of the first user 122, as monitored and detected using digital image processing techniques;

a (change of) voice fingerprint or characteristic of the first user 122, as monitored and detected using digital soundwave processing techniques;

a (change of) level of activity of the first user 122, as detected using one or several of image processing, sound processing and language processing techniques, where activity can refer to speech, movements, gestures, eye movements, pose changes, and the like;

a (change of) factual stance or opinion expressed by the first user 122, such as the first user 122 first expressing a first opinion and later opinion a second, incompatible, opinion on a factual matter or an opinion, the stance or opinion being detected using natural-language analysis, for instance using a so-called large language model;

an absolute or relative speaking time of the first user 122 in the first primary video stream and/or the produced video stream, for instance in relation to a total time or in relation to a corresponding speaking time for other users;

a muting behaviour of the first user 122, such as a time spent by the first user 122 as muted or a number of times the first user 122 has switched on a mute functionality;

a text-based interaction of the first user 122 in relation to other users, such as a number or number per time unit the first user 122 has interacted with other users using text input;

a current meeting role of the first user 122, for instance by the first user 122 switching from a role (such as normal meeting participant) with a first set of rights to a role (such as meeting administrator) with a second set of rights, the second set being more extensive than the first set;

a detected (change of) video quality, sound quality and/or a detected continuity interruption of the first primary video stream;

a change of the primary video stream showing the first user 122, from the first primary video stream to a different primary video stream (such as by the first user 122 switching from using a laptop client 121 to a cell phone client 121 when participating in the video communication service 110; and a manual request by a user 122 of the video communication service 110 to change a minimum required authentication level.

In some embodiments, the continuity score and/or trustworthiness measure is configured to automatically worsen (such as decrease) over time (the timeline here being that of the first primary video stream), reflecting the general security and relevance of authentication of the first user 122 decrease as time passes from the first authentication or any performed re-authentication. In some embodiments, the first user 122 must be re-authenticated after a set period of time in order to keep a current set of rights in the video communication service 110 or even to continue participating in the service.

In some embodiments, a second user (such as user 122" or user 122"") can be visible in the first, second and/or third primary video stream, in addition to the first user 122". Then, such an additional user 122", 122" can acknowledge the (authenticity of the) identity of the first user 122". Such acknowledgement can be performed in connection to (or even constitute) the first authentication and/or any re-authentication of the first user 122" or be performed during the continuity surveillance but not in connection with any explicit authentication or re-authentication. This can cause the continuity score and/or the trustworthiness measure to be changed to indicate a higher continuity probability or trustworthiness, in particular in case the second user 122''' or 122"" is detected to be visible in the same primary video stream as the first user 122".

Such acknowledgement can be in the form of a verbal and/or visual communication sign or phrase, such as user 122''' verbally stating "user 122" is authentic", and this phrase being interpreted by a trained neural net of the system 100 to be such an acknowledgment based on available primary video stream information. In other cases, a user 122''', 122"" can use a graphical user interface or similar to expressly validate the authenticity of the first user 122" by, for instance, activating a corresponding control, such as by pressing a button or responding to a question. Similarly, in case the third user 122''' or 122"" actively questions the authenticity of the first user 122", this can cause the continuity score and/or the trustworthiness measure to be changed to indicate a lower continuity probability or trustworthiness.

In some embodiments, the continuity score and/or the trustworthiness measure can be affected, such as increased or otherwise signalling an improved continuity probability or trustworthiness, by merely the detection that the first user 122" and a third user (such as users 122''' or 122"") are both visible in the same primary video stream, such as in the first primary stream, without the second user 122''' or 12"" having to take any active action in relation to the first user 122". Since each primary video stream is captured using one single video camera, two users 122", 122''', 122"" being shown in the same primary video streams implies that the two users 122", 122''', 122''' are physically present in the same place, such as in a meeting room. Such mutual physical presence normally makes it more difficult for the first user 122" to spoof his or her identity. Therefore, as a result of the detection of both the users being visible in the same primary video stream, the continuity score and/or trustworthiness score can be modified to reflect an improved continuity probability or trustworthiness. The detection can, again, be based on digital image processing techniques. The detection can also be combined with an active confirmation or acknowledgement by the third user 122" or 122"" that the first user 122" is authentic, the acknowledgement then possibly being of the general type discussed above.

The detection of the second user 122" or 122"" can furthermore be based at least partly on several different, such as consecutive, image frames of the primary video stream in question, detecting movement and similar of one or several of the users 122", 122", 122"" in question to decrease the risk of fraud by performing an assessment of the likelihood that the images actually constitute a live video stream of actual persons, as opposed to, for instance, still images being shown to the camera in question. Again, such analysis can, for instance, be performed using standard image processing techniques and/or using a properly trained neural network of the system 100.

This way, the continuity surveillance can be ongoing over time, producing a variable continuity score and/or trustworthiness measure, and performing re-authentications of the first user 122" when so is required and/or when so is chosen by the first user 122".

As mentioned above, the continuity score and/or trustworthiness measure can be stored as metadata, which in turn can be used and/or processed as generally described below. In some embodiments, the continuity score and/or trustworthiness measure can be visually represented, in the produced video stream. For instance, a colour, a progress bar, an icon, a symbol, a text or a number next to the depicted first user 122" can indicate a current updated continuity score and/or trustworthiness measure or status of the first user 122" for one or several other users 122''', 122"" to see as part of the produced video stream. The continuity score and/or trustworthiness score can be stored including a historic change pattern of the continuity score and/or trustworthiness score. The continuity score and/or trustworthiness score can be stored together with, or associated with, corresponding metadata indicative of one or several detected aspects of the first primary video stream and/or the produced video stream that resulted in a change of the continuity score and/or the trustworthiness measure, for retroactive inspection.

In some embodiments, each user 122 can be allowed, for instance using the user interface discussed herein, to be re-authenticated and hence (upon affirmative re-authentication) be awarded with an improved continuity score and/or trustworthiness measure. A different user can similarly be allowed to request the first user 122 to re-authenticate.

In some embodiments, a publicly available information source is sampled. As used herein, a "publicly available information source" is an information source that is sufficiently widely and persistently available so that a third person is likely to be able to retroactively verify an information state of the information source at a particular point in time. For instance, such information sources include stock market prices, weather data, tv/radio news broadcasts, sports events, public social media feeds, and so forth. As used herein, "sampling" such a publicly available information source means to read a current informational state of some aspect of the information source, such as a combination of several current stock market prices and storing information representative of the informational state. The sampled aspect is one that could not reasonably be guessed ahead of time and is therefore at least so detailed that such guesses would be futile in practise. The sampling can be performed using public APIs. The sampled information should preferably or at least likely be available via such public APIs for at least a number of years. The sampled information can be used as-is, and/or be compressed, hashed or otherwise processed using one or several one-way functions, where it is preferred that the direct or resulting derivative piece of information is configured so that it could not have been known before the time of the sampling.

In particular, an output of a source one-way function can be calculated using as direct or derivative input the sampled information.

As used herein, a "source" one-way function is generally a one-way function calculated using as direct or derivative input information sampled from an information source.

In some embodiments, an output of a joint one-way function is calculated, the joint one-way function using as input the direct or derivative output of said source one-way function, in turn being calculated using as direct or derivative input said information sampled from the publicly available information source.

As used herein, a "joint" one-way function is a one-way function using two different inputs to calculate an output.

Such a joint one-way function can also use as input the respective direct or derivative output of the above-described first and/or second one-way function, in turn being calculated based on the corresponding primary video stream and in particular (directly or derivatively) the corresponding authentication video part.

A direct or derivative output of the joint one-way function can then be publicly published, with the meaning as defined above.

The calculation of the joint one-way function can be iterative, in the sense that it is calculated repeatedly using as direct or derivative input, in each iteration, respective updated calculated values of its input values. The output of the joint one-way function can be publicly published for every iteration or only for some iterations.

In some embodiments, the joint one-way function can use as input a direct or derivative output of a previous-iteration calculation of the joint one-way function.

Figure 11:
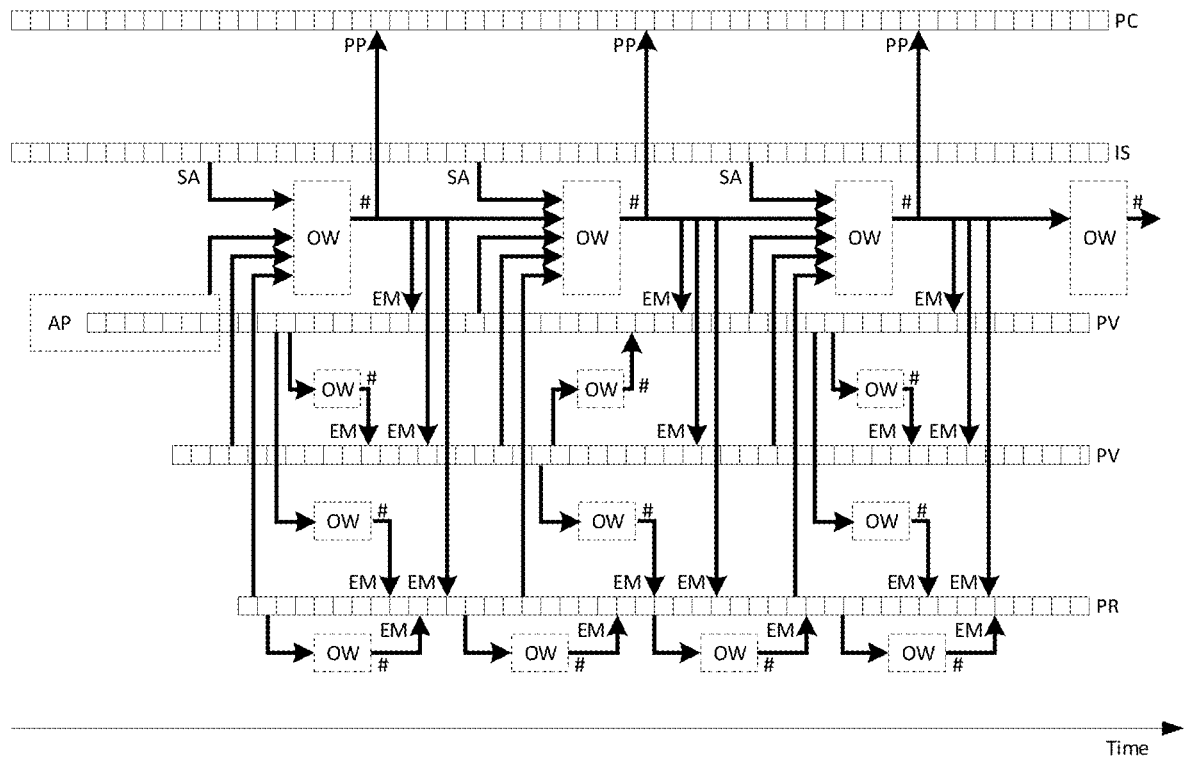
FIG. 11 illustrates interrelationships among a set of video streams, an information source and a publication channel along a time axis, in accordance with one embodiment.

FIG. 11 shows an example illustrating these principles, wherein "IS" means publicly available information source; "SA" means sampling; "EM" means embedding; "OW" means one-way function having (one or several) inputs to the left and an output to the right thereof; "#" means the result of a one-way function, such as a hash-value or similar; "PV" means a primary video stream; "AP" means an authentication part of a primary video stream; "PR" means a produced video stream; "PC" means a publicly available publication channel; and "PP" means a public publication. In FIG. 11, the horizontal axis is the time.

It is realized that FIG. 11 is simplified in order to illustrate the principles described herein. All features shown in FIG. 11 may not be necessary, and additional features as described herein can be added. For instance, each one-way function OW shown can be a concatenation or chain of any number of one-way functions. One-way functions OW being shown as having multiple inputs can be divided into two or more separate one-way functions, each using one or several of such inputs and possibly feeding into a common downstream one-way function OW.

As is illustrated for the primary video streams PV and for the produced video stream PR, a state of any primary or produced video stream can be used as direct or derivative input to a one-way function OW the direct or derivative output of which is embedded at a later point in the same video stream; and/or a state of any primary video stream(s) can be used as direct or derivative input to a one-way function the direct or derivative output of which is embedded into a produced video stream being produced based on the primary video stream(s) in question. A part of a video stream into which a direct or derivative output of a one-way function OW is embedded can be used as direct or derivative input to a subsequent one-way function OW the output value of which is affected by the embedded information.

When a part of a video stream is used as direct or derivative input to a one-way function OW, any part of the video stream can be extracted for direct or derivative input to the one-way function OW, such as a whole or part of a single frame; multiple frames; and/or audio of the video stream. The extracted part can, for instance, be hashed. Such hashing can use all the information into consideration, or only part of it (such as only using a defined set of pixels in each frame or similar). It is preferred that the information extracted and used as direct or indirect input to the one-way function is configured to depend on the state of the video stream at the point of extraction along a timeline of the video stream, the state being an instantaneous state or having a certain length in time.

In general, any information embedded into a video stream PV, PR can be caused to affect a state of the video stream PV, PR in question used as direct or derivative input to a later one-way function OW calculation, so that it is not possible to perform the later one-way function OW calculation without having access to the video stream PV, PR as affected by the embedding. This can be achieved by, for instance, using a part (such as one or several frames) of the video stream PV, PR having the embedding as direct or derivative input to a one-way function OW the results of which is then embedded at a later point into the same video stream PV, PR; and so forth.

As is also illustrated in FIG. 11, the direct or derivative output of a one-way function OW using as direct or derivative input a part of a primary video stream PV can be embedded into another primary video stream PV, and two different primary video streams PV can be cross-linked in both directions this way.

Any of the one-way function OW calculations described herein can be iteratively repeated. Among other things, this results (via the above-mentioned joint one-way function) in that a video stream PV, PR having an embedding that depends on these calculations could not have existed (with the embedding) before the latest sampling of the publicly available information source used as input to the calculation; and information used as input to the calculation could not have come into existence after the earliest public publication of the output to the calculation. This locks in each piece of information subject to the one-way function calculations between an earliest and a latest point in time, as compared to an absolute timeline, making it possible to retroactively determine, with high certainty, a point in time when the information was used as direct or derivative input to the joint one-way function and as a result both a relative order of any frames of a video stream processed this way as well as the point in time when such a video stream was created.

More concretely, for a video stream, such as any primary PV or produced PR video stream, the state of which is used as direct or derivative input to the joint one-way function and into which a direct or derivative output of the joint one-way function is embedded in a way so that the next state used as direct or derivative input to a next-iteration calculation of the joint one-way function, this means two things:

It is possible to, with a high degree of confidence, retroactively determine a relative order of states (such as frames or sets of frames) in the video stream; and It is possible to, with a high degree of confidence, retroactively determine a point in time at which the video stream was captured or produced.

Such determinations require knowledge of all information used as input to the one-way function in question, as well as knowledge of what one-way functions were used in each step. In certain embodiments, the various embodiments of invention encompass storing all such required information in a persistent manner, for future use, such as in the form of metadata of the general type discussed herein. In general, however, the output of the one-way function can be available via embeddings in video streams the veracity of which is to be verified and may therefore not need to be separately stored.

For any primary or produced video stream, a current state of the video stream can be used as direct or indirect input to the joint one-way function that is calculated at least once every minute, such as at least at once every ten seconds, such as at least once every second, such as at least every 100 video frames, such as at least every 10 video frames, such as every frame. An up-to-date state of a publicly available information source can be sampled at least once every hour, such as at least once every ten minutes, such as at least once every minute, such as at least once every ten seconds and used as direct or derivative input to the joint one-way function. An updated direct or derivative output of the joint one-way function can be publicly published at least once every hour, such as at least once every ten minutes, such as at least once every minute, such as at least once every ten seconds. A time between the sampling of a publicly available information source and a public publication of a direct or derivative output of the joint one-way function using as direct or derivative input the sampling in question can be at the most one hour, such as at the most ten minutes, such as at the most one minute, such as at the most ten seconds.

Hence, for each primary or produced video stream, information pertaining to different parts or frames of the video stream in question can be iteratively used as direct or indirect input to the joint one-way function. A maximum time between the occurrence of such part or frame and the usage thereof as direct or derivative input to the joint one-way function can be at the most ten minutes, such as at the most one minute, such as at the most ten seconds, such as at the most one second.

As understood from the above, the joint one-way function OW works as a mechanism of "weaving" information together along a timeline, internally within a video stream PV, PR (by the video stream feeding into itself at a later point along its timeline); across video streams PV, PR (by one video stream feeding into the other); and/or together with the publicly available information source IS and/or the public publication channel PC (by the publicly available information source IS feeding into the video stream or the video stream feeding into the public publication channel PC), to form an interconnected "weave" or "web" of information that is mathematically tied to the timeline. Verification of this "weave" or "web" involves retroactively inspecting the corresponding information as required, which may encompass all ingoing and outgoing information of used one-way functions OW, and in some embodiments in particular the publicly available information source IS and/or the public publication channel PC.

Such "weaving" of the primary PV and/or produced PR video streams can be devised so as to interconnect one, several or all of these video streams to each other, in the sense that at least one, such as several or even all relevant output values of the joint one-way function OW cannot be calculated without having access to at least one, or even several, parts of each of the primary PV and/or produced PR video streams.

For instance, since the first primary authentication video part AP is "weaved in" in this manner, it is possible to retroactively verify that the authentication of the first user 122 took place, how the authentication was conducted and what the results of the authentication were; and the process of continuity surveillance can also be retroactively verified if the proper associated information is "weaved in" from the first primary video stream PV. The continuity surveillance can also comprise retroactively verifying, such as one time or repeatedly over time and based on the joint one-way function OW, that the authentication of the first user 122 was really "weaved in" and therefore verifiably took place.

The joint one-way function OW can use as direct or derivative input, apart from the above-described examples, also other information that is also to be "weaved in" in the corresponding way and hence become retroactively verifiable in terms of information integrity and time.

Hence, the joint one-way function OW can be calculated using as direct or derivative input one or several of the first primary authentication video part AP; the first authentication token; an updated continuity score; a one-way function (a "third" one-way function) calculated using as direct or derivative input the produced video stream PR; and a set of metadata directly or indirectly (but unambiguously) describing a complete set of production steps used to produce the produced video stream PR based on the first primary video stream PV and the second video stream PV.

In FIG. 8, the general methodology of this "weaving" is illustrated in steps S813-S817. In step S813, one or several publicly available information sources IS are sampled. In step S814, one or several inputs are identified, in terms of parts of one or several primary PV and/or produced PR video streams. Here, the term "input" refers to a direct or derivative input to a joint one-way function OW. In step S815, the output of the joint one-way function OW is calculated using the sampled information as well as the identified information as direct or derivative inputs. It is realized that different joint one-way functions OW can be used in different iterations. In step S816, the direct or derivative output is embedded into one or several primary PV and/or produced PR video streams. In step S817, the direct or derivative output is publicly published using the public publication channel PC. This part of the method can iterate as indicated in FIG. 8. Also, the iterations across steps S813-S817 can iterate independently from the iterations across steps S801-S812, even if the information produced in, or being associated with, steps S801-S812 can be used as inputs in step S814; and even if the embedding in step S816 can be in relation to any video stream used in, or associated with, the steps S801-S812.

As mentioned above, using the various described "weaving" solutions, it is possible to retroactively verify information relevant to any primary video streams PV, any produced video streams PR and historic or ongoing user authentication. However, as also mentioned, such verification requires direct or derivative access to any information used as input to the relevant one-way functions OW. In case such information is not available, it is not possible to verify the accuracy of the corresponding output of the one-way function OW in question.

Figure 12:
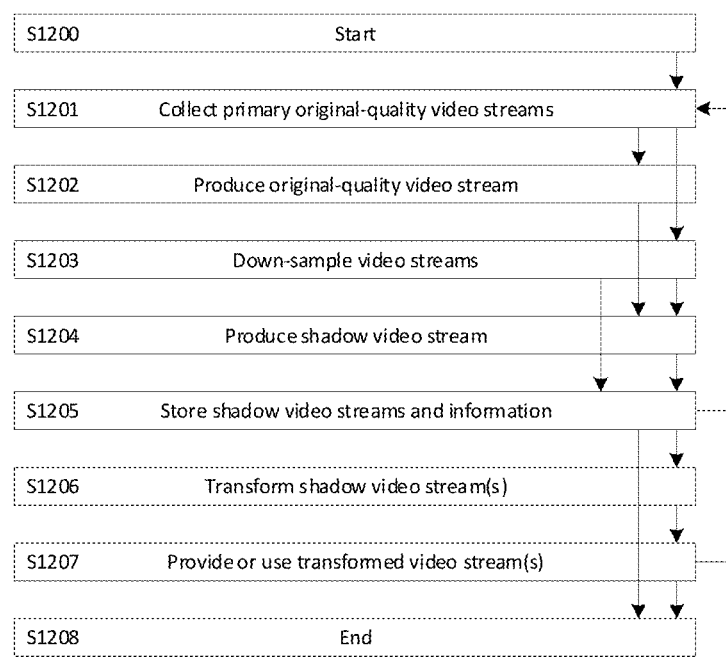
FIG. 12 illustrates a third method, in accordance with one embodiment.

FIG. 12 illustrates a method for using a down-sampled version of the primary and produced video streams as a way to verify the information without having to access the original information. In particular, the method illustrated in FIG. 12 makes it possible to avoid having to store the potentially very large amounts of information associated with high-definition video material that may be produced when using a solution according to an embodiment of the present invention. As is the case for the method illustrated in FIG. 8, the method of FIG. 12 is a method for producing a produced video stream that can be performed by a system of the type discussed above and by way of example illustrated in FIG. 9.

In a first step S1200, the method starts.

In a subsequent step S1201, the first primary video stream is captured, such as by camera 401'', the first primary video stream visually showing the first user 122, 122''. Also in this case, the second primary video stream is captured, such as by camera 401' or camera 401''', the second primary video stream visually showing the second user. As described above the second user can be user 122''' or user 122''''. Step S1201 can correspond to steps S802 and S804, and all said above in relation to these steps applies correspondingly.

In a subsequent step S1202, the produced video stream is automatically produced based on the first primary video stream and the second primary video stream, the automatic producing being based on automatic production decisions in turn being based on at least one of defined parameters; automatic image processing of the first and/or second primary video streams; and automatic audio processing of the first and/or second primary video streams. This step S1202 can correspond to step S806, and the above description applies correspondingly.

In a subsequent step S1203, performed after step S1201, the first primary video stream is down-sampled, achieving a down-sampled version of the first primary video stream herein denoted a first "shadow" primary video stream. Also, the second primary video stream is down sampled, achieving a second shadow primary video stream.

In a subsequent step S1204, a produced shadow video stream can be automatically produced based on the first shadow primary video stream and the second shadow primary video stream. It is preferred that the automatic producing of the produced shadow video stream is based on the corresponding automatic production decisions as used to produce the produced video stream and the automatic production decisions are applied in an identical manner with the only difference being that the production takes place using the down-sampled material. The produced shadow video stream can hence be produced to completely correspond to the produced video stream produced in step S1202, or at least completely correspond to a subset of the produced video stream produced in step S1202, but being qualitatively inferior in terms of for instance image quality.

It may be stated that the automatic producing of the produced shadow video stream is based on the same automatic production decisions as used to produce the produced video stream, in the sense that the production decisions themselves are the same but operating on the (down-sampled) shadow video stream information. Hence, the automatic production of the produced video stream PR can take place using a set of automatically applied production decisions, and that same (or corresponding) set of automatically applied production decisions can be used to automatically produce also the produced shadow video stream. In some embodiments, the full set of same or corresponding automatic production decisions can be used for both automatic productions, and in some embodiments no other production decisions in addition to this set of production decisions are used to produce the produced shadow video stream.

The produced video stream can be provided to a recipient user in a way corresponding to what has been described in connection to step S807.

In the following, the first and second primary video streams are denoted "original-quality" primary video streams, and the produced video stream produced in step S1202 is denoted "original-quality" produced video stream, to distinguish them from the corresponding "shadow" video streams. It is understood that everything that has been said above in relation to the various video streams, and in particular in connection to FIGS. 8-11, can still apply and be used in the context of the method illustrated in FIG. 12 both to the original-quality video streams and independently to the shadow video streams. In general, the provision and use of the corresponding shadow video streams can be performed in parallel with the other method steps.

In a subsequent step S1205, the first shadow primary video stream, the second shadow primary video stream and the produced shadow video stream are stored, preferably in a persistent and permanent manner, such as on a conventional hard drive, a flash drive, a non-volatile memory storage, or the like. The storing is in a way that allows full retroactive replication of each of the shadow video streams, in other words not using any lossy compression or cropping algorithm or similar. In addition to the shadow video streams, information identifying all the automatic production decisions used to produce the produced shadow video stream is also stored in the corresponding manner. In particular, the information stored should be sufficient for the retroactive replication of the production of the produced shadow video stream based on the shadow primary video streams. This way, the informational contents (imagery and/or audio) can be verified retroactively with respect to its contents.

In a subsequent step S1208, the method ends. As is illustrated in FIG. 12, however, the method can be iterated so as to continue to provide and down-sample the original-quality video streams to produce and store shadow video streams as long as the capturing of the primary video streams and the production of the produced video stream is ongoing.

In general, the methods described in connection with FIGS. 8 and 12 can be freely combined, and in particular the method illustrated in FIG. 12 can be used as an add-on to any embodiment according to what has been discussed above in connection to FIG. 8, the add-on securing that a corresponding primary shadow video stream is provided and stored, and a corresponding shadow video stream is produced and stored, for every primary and produced video stream, respectively, occurring in such embodiment.

In general, such an add-on can comprise down-sampling at least one of the first primary video stream and the second primary video stream, achieving the down-sampled first shadow primary video stream and/or the down-sampled second shadow primary video stream; and then performing any or all of the discussed method steps in relation to the first primary video stream, the second video stream and the produced video stream in a corresponding manner but instead using the corresponding first shadow primary video stream and/or second shadow primary video stream, whereby a corresponding produced shadow video stream is produced.

It is preferred that a retroactive visual and/or audible inspection of the produced shadow video stream is configured so that it can be used to assess an informational content of the produced shadow video stream, and that a respective informational content of the stored primary shadow video streams together with the information regarding how the automatic production was done can be used to verify that the produced shadow video stream was indeed produced in the specified manner based on the primary shadow video streams. For instance, it would normally be required for a human being to visually be able to localize and possibly identify a human participant user 122 visible in the produced shadow video stream.

Then, the authenticity of the original-quality produced video stream can be verified by visually and/or audibly comparing the original-quality produced video stream to the produced shadow stream and thereby verifying that the original-quality produced video stream indeed corresponds to the produced shadow video stream.

To achieve this goal, it is possible for the produced shadow video stream to have embedded information, as long as this embedded information does not prevent or deteriorate such visual/audible inspection or comparison. For instance, an embedding of any of the above-described types, such as a QR code, an alphanumeric addition or a watermark, can generally be used without preventing or significantly deteriorating such inspection or comparison to the original-quality produced video stream. In some embodiments, the production step of adding one or several embeddings of information not embedded into the original-quality produced video stream is specified in the production information stored in step S1205.

One example of such information embedded into the produced shadow video stream is metadata regarding the automatic production steps performed to produce the produced shadow video stream, in other words the production information stored in step S1205, or a reference or pointer to such metadata or information. This provides a self-contained produced shadow video stream that can be assessed as it is, even without independent or direct access to the production information stored in step S1205. In some cases, this information can also comprise a reference or link to the stored primary shadow video streams used to produce the produced shadow video stream, for retroactive access thereto by a third party wanting to verify the veracity of the produced shadow video stream.

In some embodiments, the produced shadow video stream is not provided to, such as shown to, the first or second users 122. In other words, the step S807 is not performed with respect to the produced shadow video stream. In some cases, the produced shadow video stream, or even all shadow video streams discussed herein, are not provided or shown to the first or second users 122, or to any human participant user of the video communication service 110, but are merely stored for future reference. Hence, if and when somebody wants to use the shadow video streams for verification purposes, the shadow video streams are of course provided to such person, but not as a part of the ongoing video communication service 110, and in particular not in real-time or near real-time as is the case for the original-quality produced video stream.

As explained above, one purpose of the produced shadow video stream is to visually and/or audibly be able to verify the informational contents of the produced shadow video stream in order to determine if they match a corresponding informational content of the original-quality produced video stream. Such information contents that a person may want to verify can comprise one or several of an identity of a person being shown in the produced shadow video stream; the language contents of a discussion being viewed in the produced shadow video stream; the identity of an object being viewed, and so forth. To reach this goal, it is normally not necessary to provide the produced shadow video stream in a quality commensurate with standard requirements for modern video content. In other words, it is normally possible to compress the original-quality video streams quite much without losing the possibility to retroactively achieve such verification.

At any rate, it is preferred that the down-sampling of the original-quality primary video streams is performed without removing more information therefrom than so that it is possible to visually identify, also in the resulting shadow video stream, the presence and identity of the first user 122 being clearly visible and identifiable in the first primary video stream.

In some embodiments, the down-sampling of each of the primary shadow video streams is a down-sampling arranged to reduce a byte size at least 10 times, or even at least 100 times. In this and in other cases, the down-sampling of the primary shadow video streams can comprise one or several of the following compression methods:

Decreasing, uniformly or selectively across an image plane, and/or along a timeline, of the shadow video stream in question, a pixel resolution of the shadow video stream as compared to the original-quality primary video stream in question, for instance to a pixel resolution in any or each pixmap dimension, and in at least one or several video frames, that is at the most half, or even at the most one-fifth, of the corresponding original-quality pixel resolution;

decreasing, uniformly or selectively across an image plane, and/or along a timeline, of the shadow video stream in question, a pixel depth of the shadow video stream as compared to the original-quality primary video stream in question, for instance to a pixel depth that is, for at least one or several image frames, at the most half, or even at the most one-fifth, of the corresponding original-quality pixel depth, and/or for instance converting at least one or several image frames of an original-quality colour video stream to a grayscale or even black/white video stream;

decreasing, uniformly or variably across a timeline of the shadow video stream in question, a frame rate of the shadow video stream as compared to the original-quality primary video stream in question, for instance to a frame rate that, for at least parts of the shadow video stream, is at the most half, or even at the most one-fifth, of the corresponding original-quality frame rate; and incorporating into at least parts of the shadow video stream in question a cropping of the shadow video stream as compared to the original-quality primary video stream in question, such as by cropping away a background, for instance where one or several users 122 and/or detected object of interest constitute the foreground in the original-quality video stream in question.

In some embodiments, the down-sampling of each or any of the original-quality primary video streams is dynamic, meaning that it can vary along a timeline of the video stream and/or across an image plane of the video stream. For instance, the down-sampling can take into consideration one or several defined parameter values of the automatic production decisions stored in step S1205 so that the down-sampling is applied differently over time, across an image plane of one or several original-quality primary video streams and/or across different original-quality primary video streams, as viewed along a timeline of the primary video stream in question.

For instance, the automatic production of the original-quality produced video stream can be based (as described above) on the automatic detection of a currently speaking user 122; a location in the primary video stream of one or several users 122; the occurrence of one or several events and/or patterns; and so forth. Then, the down-sampling can be applied so that relatively less information is compressed away from an image-frame area containing one or several speaking or non-speaking users 122 as compared to other image-frame areas, and/or the down-sampling can be applied so that relatively less information is compressed away from temporal and/or image-frame parts of the original-quality primary video stream containing higher concentrations of detected events and/or patterns. It is realized that these are only examples, and that many different dynamic compression techniques can be applied. Of course, the compression can alternatively or in addition be dynamically applied irrespective of the automatic production decisions, such as using conventional variable video compression techniques.

The production of the produced shadow video stream can be performed by any suitable production function 135 of the above-described type, such as the same or different production function 135 that produces the original-quality produced video stream.

In some embodiments, at least one, some or all of the first original-quality primary video stream, the second original-quality primary video stream and the original-quality produced video stream is or are discarded, the discarding taking place after providing (such as showing) the produced video stream to the first user. In particular, in some embodiments all original-quality primary video streams can be discarded even if the original-quality produced video stream is persistently stored. To "discard" a video stream means not to store it in a persistent and permanent manner, or at least not the system 100 performing such storing, but instead deleting the video stream immediately or at a delay, the purpose of the discarding possibly being to save available storage space.

In principle, steps S1203 and S1204 can take place at a later point in time than step S1202, such as long afterwards, for instance several days afterwards. However, in order to minimize the possibility of fraud, in some embodiments step S1204, in other words the production of the corresponding produced shadow video stream, takes place with a time delay of at the most one minute, such as at the most ten seconds, in relation to the production of the original-quality produced video stream. This can in particular be true in the preferred case in which the shadow video streams are "weaved in" in the general manner described above.

In general, all the shadow video streams can be "weaved" together in a way corresponding to what has been described above in connection with the "weaving" of the original-quality video streams, using joint one-way functions OW, sampling of publicly available information sources IS to be used as input information, publicly publishing output information using publicly available publication channels PC and embedding EM output information into shadow video streams. Such "weaving" of the shadow video streams can be devised so as to interconnect one, several or all of the primary and/or produced shadow video streams to each other; to interconnect one, several or all of the primary and/or produced original-quality video streams to each other; and/or to interconnect one, several or all of the primary and/or produced shadow video streams to one or several of the primary and/or produced original-quality video streams, with the corresponding meaning of the word "interconnect" as above with respect to "weaving together" different video streams.

In particular, embedding into a later frame of a shadow video stream a piece of information being the direct or derivative output of a one-way function calculated using a previous frame of the shadow video stream as direct or derivative input verifiably preserves a relative order between the previous and later frames. Incorporating into a frame of a shadow video stream a direct or derivative output of a one-way function calculated using a direct or derivative sampled public information source as input verifiably puts the shadow video stream after a sampling time along a timeline. Publicly publishing a direct or derivative output of a one-way function calculated using as direct or derivative input a frame of a shadow video frame verifiably puts the shadow stream before the time of public publication.

In some embodiments, a cryptographic fingerprint of a primary video stream, in the form of a direct or derivative output of a one-way function calculated using as direct or derivative input a frame of the primary video stream is embedded into a shadow video stream, such as into a shadow video stream corresponding to the primary video stream. The opposite can also be true (embedding a digital fingerprint of the shadow video stream into the primary video stream). This verifiably locks in the primary video stream in relation to the shadow video stream along a timeline.

Concretely, a first shadow one-way function can be calculated to correspond to the above-described first one-way function. Hence, the first shadow one-way function can be calculated using as direct or derivative input the first shadow primary video stream. Correspondingly, a second shadow one-way function can be calculated using as direct or derivative input the second shadow primary video stream to correspond to the second one-way function described above. The first shadow one-way function can be calculated using as direct or derivative input a first shadow authentication video part of the first shadow primary video stream, corresponding to the first primary authentication video part and showing the step of authenticating and/or a representation of the information representing the first authentication token in the corresponding manner as described above, but in corresponding down-sampled video. Then, for each of a respective piece of information representing a direct or derivative output of the first shadow one-way function and the second shadow one-way function, at least one of embedding into the produced shadow video stream a visual and/or audible representation of the piece of information; storing the piece of information; and publicly publishing the piece of information can be performed. What has been said above with respect to the first authentication video part and its subsequent use in the method can correspondingly be applied also to the first shadow authentication video part but using shadow video streams instead of original-quality video streams.

Going one step further, the same or a different (but similar) publicly available information source IS as discussed above can be sampled, and a second source one-way function, corresponding to or actually being the above-described source one-way function (that in turn can be denoted the "first" source one-way function) can be calculated using this sampling as input. Then, a second joint one-way function OW can be calculated, corresponding to or actually being the joint one-way function OW described above (that in turn can be denoted the "first" joint one-way function), using as input a direct or derivative output of the second source one-way function; a direct or derivative output of the first shadow one-way function; and a direct or derivative output of the second shadow one-way function.

Finally, a direct or derivative output of the second joint one-way function OW can be publicly published in the manner described above, using a public publication channel PC. In case the first and second joint one-way functions OW are the same, only one public publishing is of course required for that particular iteration.

In order to be able to retroactively verify that an original-quality primary video stream was indeed used to produce the corresponding primary shadow video stream, the method can comprise one or several of the following:

Embedding into one or several of the original-quality primary video streams a direct or derivative output of the first or second shadow one-way function having been calculated based on the primary shadow video stream corresponding to the original-quality primary video stream in question. The embedding then takes place after the down-sampling of the original-quality primary video stream in question and can also comprise unambiguous information regarding how the embedding into the original-quality primary video stream was performed in a way so that it can be reversed in order to perform said verification (that uses the original-quality primary video stream before the embedding).

Embedding into one or several produced original-quality video streams a direct or derivative output of one or several of the first and second shadow one-way functions.

Embedding into one or several of the shadow primary video streams a direct or derivative output of the corresponding first or second one-way functions (having been calculated based on the original-quality primary video stream corresponding to the primary shadow video stream in question).

As described above, the shadow video streams can be used, together with information regarding how the automatic production was performed, to verify that an available original-quality produced video stream is legitimate, including that the first user 122 visible in the original-quality produced video stream has been duly authenticated. This is achieved, inter alia, by visually/audially inspecting the original-quality produced video stream and comparing it to the corresponding informational contents in the produced shadow video stream. In particular, using the various techniques to "weave" the various video streams, the verification Is made stronger, in particular with respect to the relative and absolute timing of various parts and aspects of the original-quality produced video stream. One advantage achieved by this approach is that the potentially large original-quality primary video streams do not have to be stored to perform said verification.

However, the primary video stream may be desired in other scenarios, for instance to produce different produced video streams at a later point in time. In case the original-quality primary video streams are then not persistently stored, only the primary shadow video streams remain.

In such (and other) cases, the method can comprise using such primary shadow video streams as regular primary video streams of the type discussed herein (in other words, as original-quality primary video streams), but in a transformed version to improve their usefulness as such primary video streams.

In general, step S1205 can comprise the storing, such as in the form of metadata of the various types discussed herein, of at least one piece of context-relevant information about the first primary video stream and/or the second primary video stream, such context-relevant information not being derivable from the shadow primary video stream corresponding to the primary video stream to which it pertains, and in particular not being derivable from one or both of the first shadow primary video and the second shadow primary video.

Then, the method can comprise to, at a later point in time, such as at least one hour, at least one day or even at least one week, use this stored context-relevant information stored to transform at least part of at least one of the first primary video stream and the second primary video stream, thereby achieving a first transformed primary video stream and/or a second transformed primary video stream.

In this context, the terms "transform", "enhance" and "up-sample" can be used interchangeably, and correspondingly "transformed", "enhanced" and "up-sampled".

Then, a transformed or enhanced produced video stream can be produced based on the first enhanced primary video stream and/or the second enhanced primary video stream. This production can generally take place in any of the ways of automatically producing a produced video stream as described herein.

The stored context-relevant information can comprise metadata descriptive of one or several events (as defined above) or patterns (as defined above) detectable in the first and/or second primary video stream.

The stored context-relevant information can comprise metadata descriptive of one or several things, persons or phenomena being visually shown and/or audibly heard in the first and/or second primary video stream, such as an identity of a user being visible or talking in the first and/or second primary video stream or a facial expression of such a user.

In other words, the method may comprise a step S1206, in which the first shadow primary video stream, the second shadow primary video stream and/or the produced shadow video stream is or are automatically transformed (enhanced/up-sampled) to achieve a respective transformed (enhanced/up-sampled) video stream.

In a subsequent step S1207, each such transformed video stream can be provided, such as shown, to a user 122 or be used as an original-quality primary video stream in any of the ways discussed herein. For instance, a next-generation original-quality produced video stream can be produced based on the transformed video stream in question, perhaps together with additional primary video stream(s) as described above.

In various embodiments, the transforming (enhancing/up-sampling) can include one or several of the following:

Increase an audio bitrate, a pixel resolution, a pixel depth and/or a frame rate;

introduce a de-cropping, an image element and/or an audio element, such as a background, such as based on previously stored metadata; and partly or completely animating a participant showed in the transformed video stream, the transforming possibly being based on previously stored metadata.

All these transformations result in the addition of information to the primary shadow video stream, such added information not being deducible from the primary shadow video stream itself, making it necessary to do at least one of gleaning such added information from some available information source (such as the stored context-relevant information) and making informed guesses with respect to the contents of such added information. In general, a properly trained neural network can be used to fulfil these tasks, using statistical analyses of the primary shadow video stream to predict a naturally-looking filling out of the blanks that were lost during the down-sampling resulting in the primary shadow video stream. For instance, so-called generative AI tools, such as a large language model, can be used to achieve this is an automatic way. In simpler cases, interpolation techniques can be used to insert additional pixels and/or frames in a video stream. This process can also be similar to the up-sampling of a video signal that is used by modern tv monitors, for example. The corresponding can be performed with respect to audio contents, adding frequencies so as to achieve a natural-sounding audio.

Furthermore, the transformation can use various types of available information.

For instance, audio information of the primary shadow video stream can be interpreted so as to better understand what is going on visually in the image contents, such as to understand that a depicted user 122 is currently talking or moving about. Correspondingly, imagery of the primary shadow video stream can be used to artificially improve audio, for instance such that image processing can result in an understanding of the origin of a particular sound, such as a visible object toppling over and falling on the floor.

The available information can comprise image and/or audio material related to users 122 and/or objects that are visible in the primary shadow video stream. For instance, a still image of the face of a user can be used to improve the pixel resolution of that user's 122 face in the transformed video stream. Such information can be of different types, and for instance include information regarding the body size, normal posture, typical movement pattern and voice properties of the user 122.

The above-discussed metadata can also be used as available information in the present context. In connection to the down-sampling of the original-quality primary video stream, information regarding what the video stream shows, what is happening in the video stream and so forth can be automatically and selectively extracted, using available digital audio and/or video processing techniques and/or defined parameter values, and stored as metadata in step S1205 (or form part of the metadata stored in step S808). Such metadata can comprise, for instance, the identity and/or personal properties of users 122 visible in the original-quality primary video stream; textual or parametric descriptions of a scene visible in the original-quality primary video stream, in particular parts that are cropped away or heavily compressed as a result of the down-sampling; specifications regarding events; colour information pertaining to parts of the original-quality video stream the pixel depth has been reduced or where colour information is otherwise lost; and/or patterns occurring in the original-quality primary video stream, such as that two users shake hands, that a particular user smiles or frowns, or that a particular user looks at a particular other user. Using such information, the transformation can then be used to produce a best-guess artificial improvement of the primary shadow video stream so as to achieve the transformed primary video stream as a seemingly higher-quality primary video stream. In all these examples, available information can be combined in various ways with generative techniques such as interpolation and generative AI. For instance, textual information regarding the scene can be fed into a large language model facing the task of graphically improving the shadow video stream in question.

In some embodiments, each or some shadow video streams, or metadata associated with each of some shadow video streams, can be created to comprise some image and/or audio information of better quality (pixel resolution, pixel depth, sample rate, etc.). For instance, intermittent frames, such as one out of every ten frames or similar, can be in higher quality, such as in full image quality, as compared to the rest of the frames. Then, the transformation can comprise using the higher-quality parts to artificially render an improved-quality version of shadow video stream frames having inferior quality. This can be performed using, for instance, a properly trained neural network.

It is noted that the possibility of verifying the original original-quality primary video stream using the primary shadow video stream is not affected by the transformation, since the non-transformed primary shadow video stream is still kept stored for future reference. It is also noted that any transformed shadow primary or produced video stream can be used as a primary video stream in any of the ways described herein.

In general, available information in the form of stored metadata can be determined or calculated based on at least one of the first original-quality primary video stream, the second original-quality primary video stream and the original-quality produced video stream. The metadata can furthermore comprise externally provided information, for instance personal information regarding one or several users 122 being visible in the original-quality primary video stream.

In some embodiments, the down-sampling is irreversible, requiring the transformation to add artificially deduced information to arrive at the transformed primary video stream. The transformation itself can also be an irreversible process.

Figure 13:
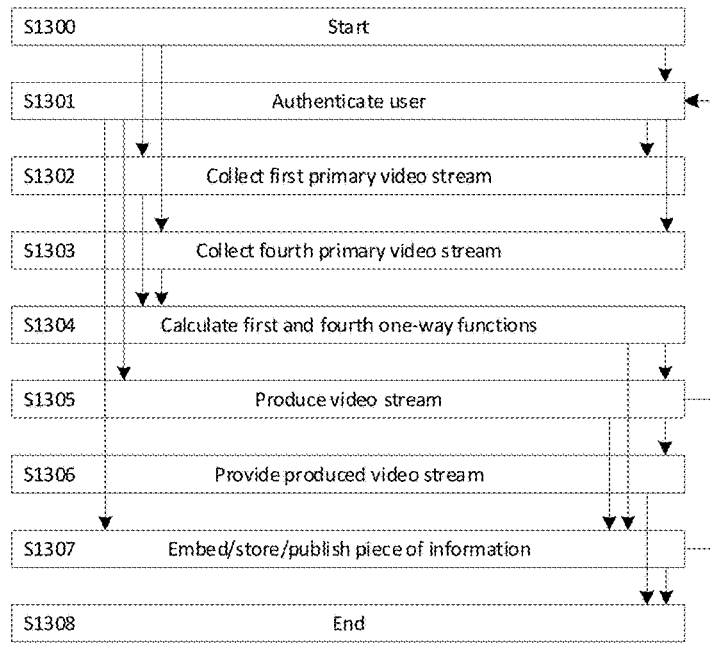
FIG. 13 illustrates a fourth method, in accordance with one embodiment.

FIG. 13 illustrates another method, which like the methods shown in FIGS. 8 and 12 is also for producing a produced video stream and can be performed by the system 100 discussed above and by way of example is illustrated in FIG. 9.

In a first step S1300, the method starts.

In a subsequent step S1301, that can correspond to step S801, the first user 122 is authenticated.

In a subsequent of concurrent step S1302, that can correspond to step S802, S804 and/or to step S1201, the first primary video stream is captured to visually show the first user 122.

Also, the second primary video stream can be captured simultaneously, partly overlapping or at a different time, to visually show the second user. Again, the first user 122 can be user 122" shown in FIG. 10, and the second user can be user 122" or 122"".

The first primary video stream can comprise the first primary authentication video part as described above, visually showing the step of authenticating and/or comprising information visually and/or can audibly represent the first authentication token resulting from the step of authentication.

In a step S1303, that can be performed partly or completely simultaneously as step S1302, a fourth primary video stream is captured. The fourth primary video stream can be similar to the first primary video stream, and what has been said above regarding the first primary video stream is correspondingly applicable also to the fourth primary video stream. The fourth primary video stream is, however, captured to visually show the first user 122 from a different point of view than the first primary video stream. For instance, the fourth primary video stream can be captured using camera 401' of FIG. 10. In general, the fourth primary video stream can be captured using a different physical camera 401', which can be referred to as a "fourth" camera, than a physical camera 401" (sometimes referred to as a "first" camera) used to capture the first primary video stream.

The fourth primary video stream further comprises a fourth primary authentication video part, that may correspond to the first primary authentication video part. Everything that has been said above in relation to the first primary authentication video part is correspondingly applicable to the fourth primary authentication video part.

Hence, the fourth primary authentication video part visually shows the step of authenticating of the first user 122 (but from a different point of view than the first primary authentication video part) and/or comprises information visually and/or audibly representing the first authentication token.

It is realized that the step of authentication visually shown in the first primary video stream and the fourth primary video stream is the same step but viewed from different points of view, and/or that the first authentication token visually represented in the first and fourth primary video stream is the same token.

In a subsequent step S1304, that can correspond to step S803, the first one-way function is calculated using as direct or derivative input the first primary video stream. In particular, the first one-way function is calculated using the first primary authentication video part as direct or derivative input.

Also, a fourth one-way function is calculated. The fourth one-way function corresponds to the first one-way function in terms of possible types and functions for the one-way function, and everything said above regarding the first one-way function is correspondingly applicable to the fourth one-way function. Hence, the fourth one-way function is calculated using as direct or derivative input the fourth primary video stream. Also, the fourth one-way function is calculated using the fourth primary authentication video part as direct or derivative input. As will be discussed below, the fourth one-way function and the first one-way function can be identical or different and can also be the same in the sense that only one one-way function is calculated using several inputs.

In a subsequent step S1305, that can correspond to step S806 or S1204, the produced video stream can be automatically produced based on the first primary video stream. The produced video can be automatically produced also based on the fourth primary video stream, which then acts as any primary video stream as described herein. Hence, the automatic production of the produced video stream can be, but does not have to be, further based on the fourth primary video stream in addition to the first primary video stream.

In a subsequent step S1306, that can correspond to step S807, the produced video stream can be provided to a recipient user that in turn may be the first user 122", the second user 122'''/122"", a different user being party to the same video communication service 110 and/or an external user 150.

In a subsequent step, that can correspond to step S808, for each of a respective piece of information representing a direct or derivative output of the first one-way function and/or the fourth one-way function, at least one of the following is performed:
  Embedding a visual and/or audible representation of the piece of information into a least one of the first primary video stream, the second primary video stream and the produced video stream PR so that the embedding depends on content in a video stream which is not the same as the video stream into which the embedding is made;
  storing the piece of information; and
  publicly publishing the piece of information is performed.
For example, a direct or derivative output of the first one-way function can be embedded into the fourth primary video stream PV and/or into the produced video stream PR; and/or a direct or derivative output of the second one-way function can be embedded into the first primary video stream PV and/or into the produced video stream PR. Such embeddings can be performed iteratively, each iteration being based on an updated version of the piece of information in question.

Everything that has been said herein in connection to how the piece of information representing the first one-way function output is used and processed applies correspondingly also to the piece of information representing the fourth one-way function output.

In some embodiments, the first one-way function and the fourth one-way function can be one and the same one-way function that is calculated using as direct or derivative input both the first authentication video part and the fourth authentication video part. In such embodiments, there will be only one piece of information per calculation of the one-way function in question that is embedded, stored and/or publicly published, this piece of information representing a direct or derivative output of that single one-way function corresponding to both the first one-way function and the fourth one-way function. Of course, this procedure can then be repeated.

In other embodiments, there are two different pieces of information that are both embedded, stored and/or publicly published. In such cases one of these two different pieces of information can be treated and processed in an identical manner as the other one, or at least each of them can be embedded, stored and/or publicly published in the same manner.

In FIG. 13, this method is described in the context of the first user 122 being authenticated. However, it is realised that the corresponding method can be used for other purposes, such as recording and producing a produced video stream of any meeting or course of events. In such a more general case, the two cameras capturing the first primary video stream and the fourth primary video stream can be arranged in one and the same physical space, but they can also be arranged in different physical spaces as long as their respective field of view covers one and the same meeting or course of events that in itself takes place in a certain well-defined physical location but where the field of views of the two cameras have no or only a small physical overlap and in practise therefore depict different users and/or objects. In practical examples, the two different cameras can capture a respective primary video stream of one and the same larger meeting, concert, trade fair, sporting event or similar, and be arranged at different places or have their field of views directed away from each other, but so that the first and fourth primary video stream depicts things happening within the same larger context (the meeting, concert, trade fair, sporting event, etc.). For instance, a participating user may be shown in the first primary video stream and thereafter in the fourth primary video stream. It is realized that in such embodiments, the method may not include the steps S1301 of authentication, and one or both of the first primary video stream and the fourth primary video stream may not include a corresponding authentication video part.

Figure 14:
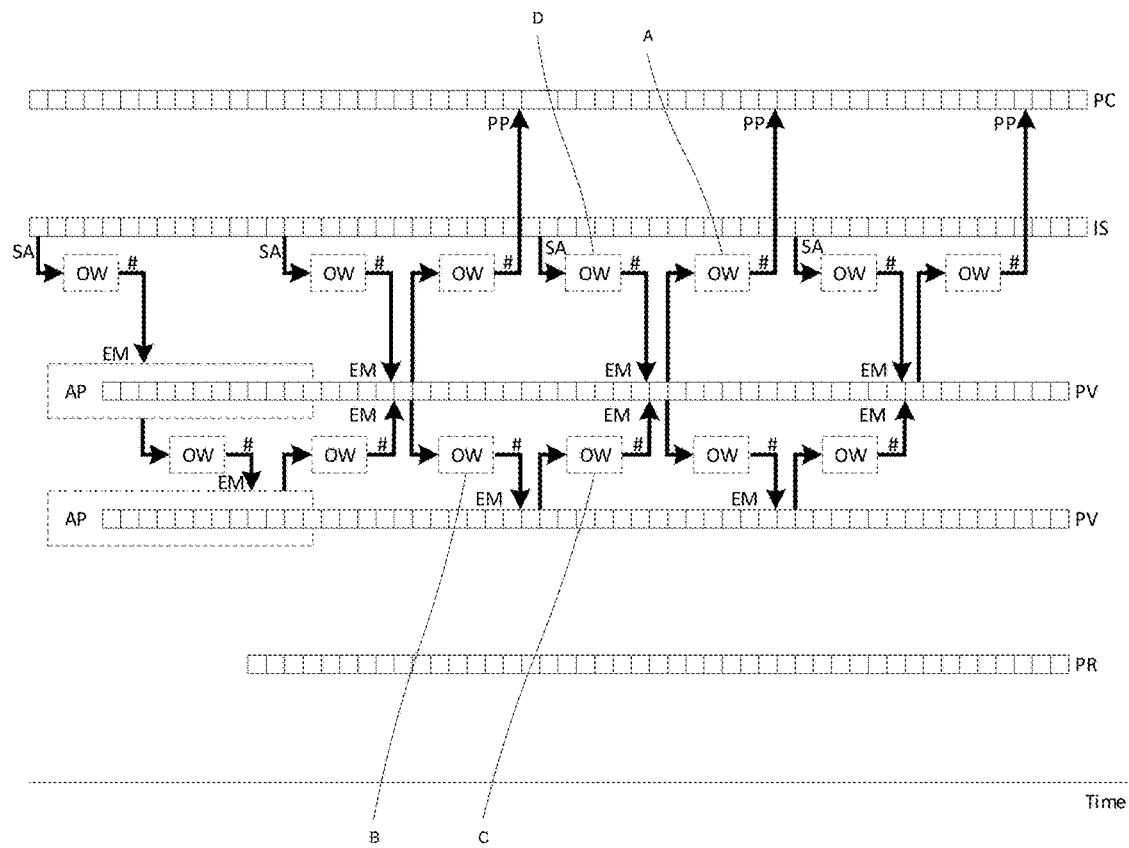
FIG. 14 illustrates interrelationships among a set of video streams, an information source and a publication channel along a time axis, in accordance with one embodiment.

FIG. 14 corresponds to FIG. 11, but FIG. 14 shows a different subset of possible information interactions illustrative of the presently described example using the first and fourth primary video streams. In FIG. 14, the upper-most primary video stream PV is the first primary video stream whereas the lower-most primary video stream PV is the fourth primary video stream, even if the reverse can also be true in some embodiments.

As is illustrated in FIG. 14, the publicly available information source IS is sampled SA, and a third source one-way function OW (such as the one-way function denoted D in FIG. 14) is calculated using the sampled information as direct or derivative input. The direct or derivative output of the third source one-way function OW can be embedded into the first and/or fourth primary video stream PV, such as during or not during its respective authentication part AP.

A third joint one-way function OW can be calculated using as input a direct or derivative output of the third source one-way function OW and a direct or derivative output of the first and/or fourth one-way function OW. A direct or derivative output of the third joint one-way function OW can be publicly published PP to the public publication channel PC. In FIG. 13, the third joint one-way function OW can, for instance, be constituted by the one-way function OW marked A. This one-way function A is calculated based on an output of the one-way function OW marked C (here being the fourth one-way function), since this information is embedded EM into the first primary video stream PV and hence affects a part of the first primary video stream PV being used as direct or derivative input to one-way function A. One-way function C is in turn being calculated using as direct or derivative input a part of the fourth primary video stream PV. Since a direct or derivative output of one-way function D is embedded EM into the first primary video stream, the one-way function A is also calculated using the output of one-way function D as derivative input, via the embedding EM and the extraction to the one-way function A of a part of the first primary video stream PV affected by said embedding EM.

It is noted that, since a direct or derivative output of the one-way function OW marked B (here being the first one-way function) is calculated using as direct or derivative input the first primary video stream PV, the one-way function C and hence the one-way function A is also calculated as derivative input the output of the one-way function B.

As is illustrated in FIG. 13, a direct or derivative output of the fourth one-way function C can be embedded EM into the first primary video stream PV. Moreover, a direct or derivative output of the first one-way function B can be embedded into the fourth primary video stream PV. Either of these embeddings EM, or both, can be repeated over time, effectively "weaving together" the first primary video stream PV with the fourth primary video stream PV in a bilateral manner. Updated information in the form of a direct or derivative output from a one-way function OW calculated based on the first primary video stream PV can be embedded into the fourth primary video stream PV at least once every ten seconds, such as at least once every second, or even once every ten video frames or even more frequently, along a timeline of the fourth primary video stream PV and at least during the authentication video part AP of the first primary video stream PV. The corresponding can be true regarding how often updated information in the form of a direct or derivative output from a one-way function OW calculated based on the fourth primary video stream PV can be embedded into the first video stream PV, along a timeline of the first primary video stream PV.

Both in FIG. 11 and FIG. 13, embeddings EM are shown as being in relation to a particular point in time of the video stream in question into which the embedding EM is performed. It is noted that such an embedding EM can be performed so as to affect the video stream into which the embedding EM is performed also going forward, at least so that a subsequent part of the same video stream which is used as direct or derivative input to a subsequent one-way function OW will depend on the embedding EM to achieve a cryptographic "chaining" effect of the above-described type. Each embedding can also be more or less short-lived and can leave the video stream in question unaffected after a certain time period or number of frames. At any rate, a next time a part of a video stream is used as direct or derivative input to a one-way function OW, the embedding EM and/or the extraction of such part of the video stream can be configured so that the embedded EM information affects the subsequent calculation of the one-way function OW. This can be true individually for each such pair of the embedding EM and the subsequent one-way function OW calculation.

Furthermore, an updated direct or derivative output of a one-way function OW using as input a direct or derivative sampling SA of a respective public information source IS can be embedded EM into the first primary video stream PV repeatedly, such as at least once every ten seconds, at least during the authentication video part AP of the first primary video stream PV; and/or such embedding can take place at least once before the step of authenticating during the authentication video part AP of the first primary video stream PV. The corresponding can apply to the fourth primary video stream PV and its authentication video part. It is realized that this aspect of FIG. 13, and any other compatible aspects, is also applicable to the first primary video stream PV of FIG. 11, and vice versa.

Furthermore, information can be repeatedly extracted, such as at least once every ten seconds, from the first primary video stream PV, and a direct or derivative output of a one-way function OW using as direct or derivative input said extracted information can be publicly published PP at the public publication channel PC. At least one such extraction can be performed after the authentication video part AP, with subsequent publication PP. The corresponding can be true for the fourth primary video stream PV.

It is possible that the first and fourth primary video streams during certain times are "weaved together" without using updated input from the public information source IS and/or without public publishing PP. The updated input and the public publishing can, for instance, be used less frequently than the "weaving together" steps, and/or during times with slow or non-existent internet connection. The corresponding can be true regarding any "weaved" single video stream and any pair or "weaved together" video streams. This way, the security enhancement process, and in particular an authentication continuity, can be achieved using local calculations on one or several locally arranged devices, such as on one or several locally interconnected clients 121 having a respective digital camera used to capture the primary video streams involved, without having to send or receive any information over the internet.

None of these extractions, embeddings EM, samplings SA and publications PP illustrated in FIGS. 11 and 13 need to be synchronized in any particular manner, as long as they are performed so that they depend on each other in the general ways described herein to achieve the discussed "weaving" effect.

It is also noted that all the extractions, embeddings EM, samplings SA and publications PP can take place in real-time, so that the extraction of information from a video stream uses the video stream in its current state (such as using a currently most recent, such as most recently captured, video frame) to extract the information; so that the embedding EM takes place with respect to a currently considered most recent (such as most recently captured) video frame or part; so that the sampling SA is a sampling of a most recently accrued state of the public information source; and/or so that the public publication PP takes place immediately.

Hence, the first and fourth primary video streams PV are tightly "weaved together", and they are also "weaved together" with both the time-developed public information source IS and the public publication channel PC.

This way, the proof of authenticity of the first user 122, being filmed from two different concurrently used viewpoints and using films that are "weaved together" is improved. Similarly, any identification of individuals, objects, events and so forth can be made with improved surety, since a viewer of the produced video stream can count on (and verify) that the informational contents of the produced video stream are accurate.

Correspondingly, when using two such "weaved together" primary video streams PV from one and the same location but not showing the first user 122 being authenticated, will provide a very reliable and verifiable documentation of events in that place, even in case the primary video streams PV are not captured to depict one and the same thing from different viewpoints, but when they instead may depict different things.

In some embodiments, the first and fourth primary video streams are recorded not only from different points of views, but also one or several of different angles; using different hardware, such as camera hardware; using different software, such as camera software; and/or operated by different entities, such as the first primary video stream PV being shot by a cell phone camera and the fourth primary video stream PV being shot by a corporate conference camera. This further increases reliability of the information shown in the produced video stream.

It is realized that there may also be at least three, or even more, cameras each showing the same user 122, location, venue and so forth, from different points of view in a way corresponding to what has been described above for the first and second primary video streams.

As mentioned, an aspect of the present invention relates to the system 100 itself. As has been described above, one or several central servers 130 in combination with one or several clients 121 are arranged to perform the above-described methods so as to produce the produced video stream.

Furthermore, an aspect of the present invention also relates to a computer program product for producing the produced video stream. Such computer program product comprises instructions arranged to, when executed in the system 100, perform the steps of the methods described herein. The execution can take place on said one or several central servers 130 and/or on one or several clients 121 as described herein.

A current authentication status, for instance information regarding a type and outcome of an authentication of the first user 122 in combination with a current updated continuity score and/or trustworthiness measure as discussed above, or a piece of information representing an updated authentication status calculated based on the continuity score and/or the trustworthiness measure, can be associated with the first user 122 and for instance stored and processed in the form of metadata as described above. Then, such current authentication status can be used by two or more users 122 of the video communication service 110 to agree on some piece of information occurring in a primary video stream or in the produced video stream. In one example, the system 100 comprises a user control, such as in a user interface of the client 121, allowing one or several users to select a current state of the video communication service 110 to constitute an "agreement" of some type. The system 100 can be configured to store metadata regarding the current updated authentication status of involved users 122 together with the fact that such an "agreement" was created, for safe retroactive verification by concerned parties. In other embodiments, the system 100 is configured not to allow such an "agreement" to be created unless one or several concerned users 122 have a current authentication status that is within a predetermined interval. In some embodiments, the creation of such an "agreement" will cause the system 100 to trigger a re-authentication of the above-described type as a prerequisite to the "agreement" to be allowed to be created. The "agreement" itself can be stored in the form of original-quality and/or shadow video streams of the types described above.

The general principles for authenticating the first user 122 in an authentication video part of a primary video can be applied in other contexts than provided by the examples described above. For instance, a user wanting to prove that he or she is the author of a message (such as a mail) or a document can record a primary video stream where the mail and/or document is composed and/or sent, where the composing or sending is shown in the same authentication video part as an authentication of the user, of the type generally described above. Then, the primary video can be used to retroactively show the legitimacy of the message or document, in particular in case the primary video stream is "weaved in" as described above, and further particularly in case two "weaved together" primary video streams from different cameras are used as also described above to simultaneously capture the composing or sending. It is understood that, for such embodiments, the primary or produced video streams do not necessarily need to be provided to any user, and in particular not in connection to the production or sending of the email etc. Instead, an automatic verification process can be used to verify the accuracy of the authentication of the composing and/or sending user.

In general, the various types of authentication of the first user 122 described herein can be performed and achieved in parallel, in one and the same video communication service 110, for two or more concurrent users.

It is understood that references to "first", "second", "third", "fourth" etc. are merely labels unless any particular order is clear from the context.

Above, preferred embodiments have been described. However, it is apparent to the skilled person that many modifications can be made to the disclosed embodiments without departing from the basic idea of the underlying invention.

For instance, many additional functions can be provided as a part of the system 100 described herein, and that are not described herein. In general, the presently described solutions provide a framework on top of which detailed functionality and features can be built, to cater for a wide variety of different concrete application wherein streams of video data is used for communication.

In general, all which has been said in relation to the presently described methods, systems and computer program products is applicable across these methods, systems and computer program products even if not explicitly mentioned.

For instance, a deliberate delay can be introduced into one or several primary video streams so as to create time to perform high-security one-way function calculations of the types generally described above and/or to calculate and process metadata of the types generally described above and/or to enhance the video quality of shadow video streams used as primary video streams as described above.

The embeddings EM, samples SA and/or public publications PP can be used in combination to retroactively calculate a delay or latency used for a particular video stream in relation to other video streams in the same video communication service 110, by inspecting associated stored timestamps. For instance, each embedding EM is in relation to a particular part of the video stream in question, that inherently has a timestamp along a timeline of the video stream. Each sample SA is performed at a particular time, and a timestamp of the sample SA may preferably be noted and stored, as a part of the sampling SA itself and/or in the form of metadata. Each public publication PP will inherently have a timestamp being part of the public publication channel PH used.

The description has been based on "video" being 2D video, comprising 2D image frames. It is, however, realized that the same or corresponding principles can be used for 3D video, comprising 3D image frames.

Generally, metadata regarding one or several primary video streams and/or one or several produced video streams can be identified, stored and/or "weaved" into one or several of said streams, as generally described above. Such metadata can comprise many different types of information pertaining to the video stream(s) as such, a context in which the video stream(s) accrued, properties of users participating in the video stream(s), and so forth. In some examples, an identify of a camera or client device capturing a particular primary video stream, such as an IP address, a MAC address, a hardware identity or fingerprint, an updated geolocation information of the camera or client device (such as GPS coordinates) can be stored/used/weaved as metadata with respect to the primary video. Correspondingly, metadata information regarding an identity of a central server or device performing an automatic production of a produced video stream can be stored/used/weaved in the general ways described above.

Hence, the invention is not limited to the described embodiments but can be varied within the scope of the enclosed claims.

The invention claimed is:

1. A method for producing a video stream, comprising:
authenticating a first user;
capturing a first primary video stream visually showing the first user, wherein the first primary video stream comprises a first primary authentication video part, the first primary authentication video part visually showing the step of authenticating and/or comprising information visually and/or audibly representing a first authentication token resulting from the step of authentication;
capturing a fourth primary video stream visually showing the first user from a different point of view than the first primary video stream, wherein the fourth primary video stream comprises a fourth primary authentication video part, the fourth primary authentication video part visually showing the step of authenticating and/or comprising information visually and/or audibly representing the first authentication token;
calculating an output of a first one-way function using as direct or derivative input the first primary video stream and calculating an output of a fourth one-way function using as direct or derivative input the fourth primary video stream, the output of the first one-way function being calculated using the first primary authentication video part as direct or derivative input and the output of the fourth one-way function being calculated using the fourth primary authentication video part as direct or derivative input; and
automatically producing the produced video stream based on the first primary video stream,
wherein the method further comprises, for each of a respective piece of information representing a direct or derivative output of the first one-way function and/or the fourth one-way function, performing at least one of:
embedding a visual and/or audible representation of the piece of information into a least one of the first primary video stream, the fourth primary video stream and the produced video stream so that the embedding depends on content in a video stream which is not the same as the video stream into which the embedding is made;
storing the piece of information; and
publicly publishing the piece of information.

2. The method of claim 1, wherein:
the automatic producing is based on automatic production decisions in turn being based on at least one of defined parameters; automatic image processing of the first primary video stream; and automatic audio processing of the first primary video stream.

3. The method of claim 1, wherein:
capturing a first primary video stream further comprises capturing a second primary video stream visually showing a second user; and
automatically producing the produced video stream further comprises automatically producing the produced video stream based on the second primary video stream, optionally based on automatic image processing of the second primary video stream, and optionally based on automatic audio processing of the second primary video stream.

4. The method of claim 3, further comprising:
calculating an output of a second one-way function using as direct or derivative input the second primary video stream, and
for a piece of information representing a direct or derivative output of the second one-way function, performing at least one of
embedding into the produced video stream a visual and/or audible representation of the piece of information;
storing the piece of information; and
publicly publishing the piece of information.

5. The method of claim 3, further comprising:
providing to the first user at least one of
the produced video stream; or
a different video stream having been automatically produced based on the first primary video stream and the second primary video stream, the automatic producing being based on automatic production decisions in turn being based on at least one of defined parameters; automatic image processing of the first and/or second primary video streams; and automatic audio processing of the first and/or second primary video streams.

6. The method of claim 5, wherein:
the provision of the respective produced video streams to the first and second users is made in the context of, and forming part of, an interactive video communication having the first user and the second user as participants.

7. The method of claim 1, wherein:
the authentication comprises capturing an image showing both the first user and a camera used to capture the first primary video stream.

8. The method of claim 1, wherein:
the authentication comprises providing a one-time password to the first user, and the first user audibly and/or visually providing the one-time password so that it forms part of the first primary authentication video part.

9. The method of claim 1, wherein:
the first primary authentication video part is a part of the first primary video stream which is before a part of the primary video stream that is used for the automatic production of the produced video stream.

10. The method of claim 1, further comprising:
performing a continuity surveillance, based at least on automatic image and/or audio processing of the first primary video stream, to determine to what extent the first user has been continuously visibly and/or audibly present in the first primary video stream since the step of authenticating.

11. The method of claim 1, further comprising:
sampling a publicly available information source and calculating an output of a first source one-way function using the sampling as input;
calculating an output of a first joint one-way function using as input a direct or derivative output of the first source one-way function and a direct or derivative output of the first one-way function; and
publicly publishing a direct or derivative output of the first joint one-way function.

12. The method of claim 3, further comprising:
sampling a publicly available information source and calculating an output of a first source one-way function using the sampling as input;
calculating an output of a first joint one-way function using as input a direct or derivative output of the first source one-way function and a direct or derivative output of the first one-way function; and
publicly publishing a direct or derivative output of the first joint one-way function, wherein:
outputs of the first joint one-way function are iteratively calculated further using as input a direct or derivative updated output of a second one-way function, in turn calculated using as direct or derivative input the second primary video stream.

13. The method of claim 11, wherein
outputs of the first joint one-way function are iteratively calculated, using as input a direct or derivative updated output of the first source one-function, a direct or derivative updated output of the first one-way function and a direct or derivative of a previous-iteration first joint one-way function.

14. The method of claim 11, wherein:
the output of the first joint one-way function is calculated further using as direct or derivative input at least one of
the first primary authentication video part;
the first authentication token;
an updated continuity score;
an output of a third one-way function calculated using as direct or derivative input the produced video stream; and
a set of metadata describing a complete set of production steps used to produce the produced video stream based on the first primary video stream and the second video stream.

15. The method of claim 3, further comprising:
sampling a publicly available information source and calculating an output of a first source one-way function using the sampling as input;
calculating an output of a first joint one-way function using as input a direct or derivative output of the first source one-way function and a direct or derivative output of the first one-way function;
publicly publishing a direct or derivative output of the first joint one-way function; and
visually and/or audibly embedding a piece of information representing a direct or derivative output of the first joint one-way function into at least one of:
the first primary video stream before it is used to produce the produced video stream,
the second primary video stream before it is used to produce the produced video stream, and
the produced video stream.

16. The method of claim 3, further comprising:
down-sampling at least one of the first primary video stream and the second primary video stream, achieving a down-sampled first shadow primary video stream and/or a down-sampled second shadow primary video stream;
performing all steps that are performed in relation to the first primary video stream, the second video stream and the produced video stream in a corresponding manner but instead using the corresponding first shadow primary video stream and/or second shadow primary video stream, whereby a corresponding produced shadow video stream is produced; and
storing the first shadow primary video stream and/or second shadow primary video stream as well as the produced shadow video stream.

17. The method of claim 1, further comprising:
sampling a publicly available information source and calculating an output of a third source one-way function using the sampling as input;
calculating an output of a third joint one-way function using as input a direct or derivative output of the third source one-way function and a direct or derivative output of the fourth one-way function; and
publicly publishing a direct or derivative output of the third joint one-way function.

18. The method of claim 1, further comprising:
embedding into the first primary video stream a direct or derivative output of the fourth one-way function; and/or
embedding into the fourth primary video stream a direct or derivative output of the first one-way function.

19. A system for producing a produced video stream, the system comprising a central server and a client, the system being arranged to perform a method according to claim 1.

20. A non-transitory computer program product for producing a produced video stream, the computer program product comprising instructions arranged to, when executed, perform a method according to claim 1.

* * * * *